US008019352B2

(12) United States Patent
Rappaport et al.

(10) Patent No.: US 8,019,352 B2
(45) Date of Patent: *Sep. 13, 2011

(54) SYSTEM, METHOD, AND APPARATUS FOR DETERMINING AND USING THE POSITION OF WIRELESS DEVICES OR INFRASTRUCTURE FOR WIRELESS NETWORK ENHANCEMENTS

(75) Inventors: Theodore S. Rappaport, Austin, TX (US); Roger R. Skidmore, Austin, TX (US); Veeraraghavan Anantha, Austin, TX (US); Eric Reifsnider, Corvallis, OR (US)

(73) Assignee: Wireless Valley Communications, Inc., Austin, TX (US)

( * ) Notice: Subject to any disclaimer, the term of this patent is extended or adjusted under 35 U.S.C. 154(b) by 1265 days.

This patent is subject to a terminal disclaimer.

(21) Appl. No.: 11/186,929

(22) Filed: Jul. 22, 2005

(65) Prior Publication Data

US 2006/0019679 A1    Jan. 26, 2006

Related U.S. Application Data

(60) Provisional application No. 60/590,518, filed on Jul. 23, 2004, provisional application No. 60/648,481, filed on Jan. 31, 2005.

(51) Int. Cl.
*H04W 24/00* (2009.01)
(52) U.S. Cl. ............... 455/456.1; 340/988; 340/996; 342/450; 342/465
(58) Field of Classification Search ............... 455/456.1; 340/988, 995; 342/450–465
See application file for complete search history.

(56) References Cited

U.S. PATENT DOCUMENTS

| | | | | |
|---|---|---|---|---|
| 5,458,123 | A | | 10/1995 | Unger |
| 5,949,335 | A | * | 9/1999 | Maynard ............... 340/572.1 |
| 5,949,988 | A | * | 9/1999 | Feisullin et al. ............. 703/2 |
| 5,963,867 | A | * | 10/1999 | Reynolds et al. ........... 455/457 |
| 6,006,021 | A | * | 12/1999 | Tognazzini ................. 703/1 |
| 6,021,316 | A | * | 2/2000 | Heiska et al. ............ 455/67.16 |
| 6,032,105 | A | * | 2/2000 | Lee et al. .................... 702/57 |
| 6,038,547 | A | * | 3/2000 | Casto ........................ 705/30 |
| 6,044,273 | A | * | 3/2000 | Tekinay ..................... 455/446 |
| 6,088,522 | A | * | 7/2000 | Lee et al. .................... 703/13 |
| 6,111,857 | A | * | 8/2000 | Soliman et al. ............. 370/254 |
| 6,162,488 | A | * | 12/2000 | Gevelber et al. ............... 427/8 |
| 6,204,813 | B1 | | 3/2001 | Wadell |
| 6,266,615 | B1 | | 7/2001 | Jin |

(Continued)

OTHER PUBLICATIONS

P. Bahl, V. Padmanabhon and A. Balachnandran, "A Software System for Locating Mobile Users: Design, Evaluation, Lessons", Microsoft Technical Report, Apr. 2000.

(Continued)

*Primary Examiner* — Lester Kincaid
*Assistant Examiner* — Diego Herrera

(57) ABSTRACT

A system and method for estimating the position of wireless devices within a wireless communication network combines measured RF channel characteristics for the wireless device with one or more predicted performance lookup tables, each of which correlates an RF channel characteristic to some higher order network performance metric and/or a position within an environmental model. Measured RF channel characteristics for wireless devices are compared against the performance lookup tables to determine the sent of lookup tables that most closely match the measured RF channel characteristics. The positions within the environmental model corresponding to the selected set of matching lookup tables are identified as possible locations for the wireless device. The performance lookup tables are uniquely constructed by site-specific location, technology, wireless standard, and equipment types, and/or the current operating state of the communications network.

29 Claims, 20 Drawing Sheets

U.S. PATENT DOCUMENTS

| | | | | |
|---|---|---|---|---|
| 6,317,599 | B1* | 11/2001 | Rappaport et al. | 455/446 |
| 6,326,987 | B2* | 12/2001 | Alexander | 715/771 |
| 6,338,031 | B1* | 1/2002 | Lee et al. | 703/13 |
| 6,356,758 | B1* | 3/2002 | Almeida et al. | 455/446 |
| 6,442,507 | B1* | 8/2002 | Skidmore et al. | 702/186 |
| 6,466,938 | B1 | 10/2002 | Goldberg | |
| 6,507,742 | B1* | 1/2003 | Lin et al. | 455/446 |
| 6,661,925 | B1 | 12/2003 | Moore | |
| 6,674,403 | B2 | 1/2004 | Gray | |
| 6,748,233 | B1* | 6/2004 | Arnold et al. | 455/522 |
| 6,785,547 | B1* | 8/2004 | Heiska et al. | 455/446 |
| 6,791,571 | B1 | 9/2004 | Lamb | |
| 6,947,708 | B2* | 9/2005 | Fattouch | 455/67.16 |
| 2002/0028681 | A1 | 3/2002 | Lee | |
| 2002/0046259 | A1 | 4/2002 | Glorikian | |
| 2002/0095486 | A1 | 7/2002 | Bahl | |
| 2002/0155843 | A1 | 10/2002 | Bahl | |
| 2004/0002364 | A1* | 1/2004 | Trikkonen et al. | 455/562.1 |
| 2004/0072577 | A1 | 4/2004 | Myllymaki | |
| 2004/0077359 | A1* | 4/2004 | Bernas et al. | 455/456.1 |

OTHER PUBLICATIONS

Wireless Valley Communications, Inc., "Siteplanner 3-16 for Windows 95/98/NT User's Manual", pp. 5-178 to 5-156, 1999.

T.S. Rappaport, et al., "Wireless Communications: Past Events and a Future Perspective", IEEE Communications Magazine, May 2002.

T.S. Rappaport, "Wireless Communications: Principles and Practice" Second Edition, Prentice Hall, 2002.

T.S. Rappaport and R. Skidmore, Slides From "Introduction to In-Building Wireless Systems", Infocast In-Building Wireless Solutions Conference and Exposition, Feb. 4, 2003.

S. Shakkottal and T.S. Rappaport, "Research Challenges in Wireless Networks: A Technical Overview", Proceeding of Fifth International Symposium on Wireless Personal Multimedia Communications, Honolulu, HI, Oct. 2002.

R. Sidmore, et al., "A Comprehensive In-Building and Microcellular Wireless Communication System Design Tool", The Bradley Department of Electrical Engineering, MPRG-TR-97-13, Jun. 1997, Master's Thesis—Unpublished by Virginia Tech for 2 Years After Submission.

R. Skidmore, et al., Russell Senate Office Building Propagation Study, Project Report for Joseph R. Loring & Associates: "Project Update", ANC Contract #ACBR96088, Prepared for Office of the Architect of the Capital, Jan. 19, 1997.

R. Skidmore, et al., Russell Senate Office Building Propagation Study, Project Report for Joseph R. Loring & Associates: "Assessment and Study of the Proposed Enhancements of the Wireless Communications Environment of the Russell Senate Office Building (RSOB) and Associated Utility Tunnels", AOC Conract #ACBR96088, Prepared for Office of the Architect of the Capital, Feb. 20, 1997.

R. Skidmore, et al., Interactive Coverage Region and System Design Simulation for Wireless Communication Systems in Multi-Floored Indoor Environments: SMT Plus im, IEEE ICUPC Proceedings, 1996.

Skidmore, et al., "Towards Integrated PSEs for Wireless Communicatiions: Experiences With the S4W and Siteplanner Projects", Mobile Computing and Communications Review, vol. 1, No. 2.

T.S. Rappaport, et al., "Radio Propagation Prediction Techniques and Computer-Aided Channel Modeling for Embedded Wireless Microsystems", MPRG Tech. Report MPRG-TR-95-08, Virginia Tech, Jul. 1995.

Company Web Page "Ericsson" www.ericsson.com, Product Name: TEMS May 27, 1999 10:25 AM.

T. Rappaport, PCS 97 Track 7; Engineering & Systems Management. Propagator; vol. 8, No. 3; Fall, 1997.

R. Skidmore & T. Rappaport; SMT Plus 1.0 User's Manual; Copyright, Aug. 1996, Virginia Tech.

Intel Technology Journal, vol. 7, Issue 3, Aug. 2003.

IT Wireless Web Article, Nov. 2003.

Article From Visionael Website, Updated Aug. 2002.

Article From the Chantry Networks Information Website, Nov. 12, 2003.

Article From the Meru Networks Information Website, Nov. 12, 2003.

Article From the Legra Networks Information Website, Nov. 12, 2003.

Article From the Trapez Networks Information Website, Nov. 12, 2003.

Brian Jenkins, "Airflow Technology—Solving the WLAN Dilemma", Airflow Networks Information Website, Jul. 2003.

Dr. Harry Bims, "Securing Enterprise WLANS", Aug. 2003.

Dr. Harry Bims, "Enabling Voice-Over WLANS", Sep. 2003.

Brian Jenkins, "High Availability for Mission-Critical WLANS", Sep. 2003, Airflow Applications Guide.

Articles From the Airespace Networks Information Website, Nov. 12, 2003.

T.S. Rappaport, et al. "Wireless Communications: Past Events and a Future Perspective", IEEE Communications Magazine, Jun. 2002.

S. Shakkottai, T.S. Rappaport, "Research Challenges in Wireless Networks: A Technical Overview", 5th International Symposium on Wireless Personal Multimedia Communications, Honolulu, HI, Oct. 2002.

R.K. Morrow, T.S. Rappaport, "Getting In", Wireless Review Magaine, Mar. 2000.

R.K. Morrow, Jr., "Site-Specific Indoor Planning", Applied Microwave and Wireless Magazine, Mar. 1999.

P. Bahl and V. Padmanabhan, "Radar: An In-Building RF-Based User Location and Tracking System", Microsoft Technical Report 589, 2000.

P. Bahl and V. Padmanabhan, "Enhancements to the Radar User Location and Tracking System", Microsoft Technical Report MSR-TR-2000-12, Feb. 2000.

P. Bahl and V. Padmanabhan, "User Location and Tracking in an In-Building Radio Network", Microsoft Technical Report MSR-TR-1999-12, 1999.

J. Zhu and G. Durgin, "Indoor/Outdoor Location of Cellular Handsets Based on Received Signal Strength", Georgia Tech Propagation Group Technical Report PG-TR-040618-JZ, Aug. 2004.

J. Zhu and G. Durgin, How to Locate an Indoor Cellular User With Received Signal Strength Information, IWCT 2005, Jun. 2005.

C. Nerguizian, C. Despins, and S. Aes, "Indoor Geolocation With Received Signal Strength Fingerprinting Technique and Neural Networks", ICT 2004, Fortaleza, Brazil, 2004.

K. Pahlavan, J. Akel, and X. Li, "Indoor Geolocation Science and Technology", IEEE Communications Magazine, vol. 40, No. 7, Jul. 2002.

R. Christ and R. Lavigne, "Radio Frequency-Based Personnel Location Systems", IEEE 34th Annual International Carnahan Conference on Security Technology, Oct. 2000.

Y. Chen and H. Kobayashi, "Signal Strength Based Indoor Geolocation", IEEE International Conference on Communications, May 2002.

T. Roos, et al., "A Probabilistic Approach to WLAN User Location Estimation", International Journal of Wireless Information Networks, Jul. 2002.

V. Abhijit, C. Ellis and X. Fan, "Experiences With an Inbuilding Tracking System: UHURU", PIMRC 2003.

J. Vidal, M. Najar, M. Cabrera and R. Jativa, "Positioning Accuracy When Tracking UMTS Mobiles in Delay and Angular Dispersive Channels", VTC 2001.

D. Fox, J. Hightower, L. Liao, D. Schulz and G. Borriello, "Bayesian Filtering for Location Estimation", IEEE Pervasive Computing, vol. 2, No. 3, Sep. 2003.

Article From the Aruba Networks Information Website, Nov. 12, 2003.

A. Smailagic and D. Kogan, "Location Sensing and Privacy in a Context-Aware Computing Environment", IEEE Wireless Communications, Oct. 2002.

T. Roos, P. Myllymaki, and H. Tirri, "A Statistical Modeling Approach to Location Estimation", IEEE Transactions on Mobile Computing, Mar. 2002.

\* cited by examiner

| Likely Positions | Mean Error | Weighting |
|---|---|---|
| 23,45,1.8,Floor1 | 0.5 dB | 10 |
| 24,47,1.8,Floor1 | 1.0 dB | 10 |
| 23,46,3.6,Floor2 | 1.1 dB | 8 |
| ... | | |

Figure 11b

Measured RSSI
AP1   -79 dBm
AP2   -75 dBm
AP3   -100 dBm
...

1100

Performance Table1 – RSSI
Position: 35,40,1.8,Floor1
AP1   -75 dBm
AP2   -80 dBm
AP3   -95 dBm
...

1102

Performance Table2 – RSSI
Position: 40,87,6.0,Floor3
AP1   -79 dBm
AP2   -76 dBm
AP3   -98 dBm
...

SYSTEM, METHOD, AND APPARATUS FOR DETERMINING AND USING THE POSITION OF WIRELESS DEVICES OR INFRASTRUCTURE FOR WIRELESS NETWORK ENHANCEMENTS

CROSS-REFERENCE TO RELATED APPLICATIONS

The present application is related to the following U.S. Patents: U.S. Pat. No. 6,317,599; U.S. Pat. No. 6,442,507; U.S. Pat. No. 6,493,679; U.S. Pat. No. 6,499,006; U.S. Pat. No. 6,625,454; U.S. Pat. No. 6,721,769; U.S. Pat. No. 6,850,946; U.S. Pat. No. 6,876,951; pending U.S. patent application Ser. No. 10/714,929 entitled "System and Method for Automated Placement or Configuration of Equipment for Obtaining Desired Network Performance Objectives and for Security, RF Tags, and Bandwidth Provisioning;" and pending U.S. patent application Ser. No. 10/830,446 (2004/0259555) entitled "System and Method for Predicting Network Performance and Position Location Using Multiple Table Lookups". The complete contents of these patents and applications are herein incorporated by reference. The application claims priority to U.S. Provisional Patent Application Ser. No. 60/590,518 entitled "Wireless Network Management System" filed Jul. 23, 2004, and U.S. Provisional Patent Application Ser. No. 60/648,481 entitled "System and Method for Predicting the Position of Wireless Devices" filed Jan. 31, 2005.

BACKGROUND OF THE INVENTION

1. Field of the Invention

The present invention generally relates to computerized systems used to predict and manage the network performance characteristics of wireless communication networks, and more particularly, to a method and system for determining and using the position of wireless devices and infrastructure within an environment by combining measured signal data with table lookups of corresponding positions to provide novel features that will be critical to future wireless networks.

2. Background Description

As data communications use increases, the ability to locate the position of wireless devices that are detectable by the network has quickly become an important issue for network engineers who must design, deploy, and maintain cellular telephone systems, paging systems, wireless or wired computer networks, or new wireless systems and technologies such as personal communication networks, wireless local area networks (WLANs), ultra-wideband networks, RF ID networks, ZigBee networks, and WiFi/WiMax/mesh last-mile wireless networks. Similar needs are emerging for wireless Internet Service Providers (WISPs) who need to provision and maintain wireless connections to their customers. Emergency services, network security, network troubleshooting and network quality of service are just a few of the applications of positioning technology.

The use of predictive models in designing and maintaining wireless networks is becoming a standard industry practice. Rapid engineering design, deployment, and management methods for microcell and in-building wireless systems are vital for cost-efficient build-out and on-going operation. The evolving wireless infrastructure is moving toward packet-based transmissions, and outdoor cellular may soon complement in-building Wireless LAN technology. See "Wireless Communications: Past Events and a Future Perspective" by T. S. Rappaport, et al., IEEE Communications Magazine, June 2002 (invited); and "Research Challenges in Wireless Networks: A Technical Overview, by S. Shakkottai and T. S. Rappaport at Proceeding of the Fifth International Symposium on Wireless Personal Multimedia Communications, Honolulu, Hi., October 2002 (invited).

The placement and configuration of wireless and wired equipment, such as routers, hubs, switches, cell sites, cables, antennas, distribution networks, receivers, transceivers, transmitters, repeaters, access points, or RF ID tag readers is critical from both a cost and performance standpoint. The design engineer, or a network operator, manager, or installer, whether or not technically trained, preferably should be able to predict how much interference can be expected from other wireless systems and where the interference will manifest itself within the environment, as well as locate network users or other entities. In many cases, the wireless network interferes with itself, forcing the designer to carefully analyze many different equipment configurations in order to achieve proper performance. Sometimes power cabling is only available at limited places in a building or campus, or possible equipment sites are otherwise constrained, and so decisions must be made with respect to the proper location and quantity of equipment, and their proper channel assignments and other configuration. Prediction methods which are known and which are available in the literature provide well-accepted methods for computing coverage or interference values for many cases.

Depending upon the design goals or operating preferences, the performance of a wireless communication system may involve tradeoffs or a combination of one or more factors. For example, the total area covered with adequate received or radio signal strength (RSSI), the area covered with adequate data throughput levels, and the numbers of customers that can be serviced by the system at desired qualities of service or average or instantaneous bandwidth allocations or delays are among the deciding factors used by network professionals in planning the placement of communication equipment comprising the wireless system, even though these parameters change with time and space, as well as with the number and types of users and their traffic demands.

A highly accurate method for properly determining the appropriate placement of equipment and efficient operating characteristics of a multiple-transmitter network (such as a Wireless LAN with many access points across a campus) is preferred for use in the original installation and start-up of a network. Given a reliable method for predicting the radio wave propagation environment and RF channel characteristics for any given location within the physical environment, the interaction between mobile or fixed wireless users and the communications network, the performance of any given proposed or existing communications network can be predicted. This capability enables design engineers and network architects to determine and analyze the performance of a proposed arrangement and configuration of network equipment before an investment is made to deploy the network.

The performance of a wireless communication system may be approximated by determining one or more RF channel characteristics, where RF channel characteristics refers to any measurable parameters that are typically associated with a radio channel within any communications network such as, but not limited to: path loss, the received signal strength intensity (RSSI), system noise (SNR), system interference (SIR), delay spread levels, bit error rate (BER), frame error rate (FER), packet error rate (PER), quality of service (QoS), packet throughput, packet latency, packet jitter, outage, traffic, capacity, bandwidth usage, call rate, call duration, association rate, drop call rate, block call rate, packet collision rate, handoffs, angle of arrival, power delay profile, and other well known, quantifiable characteristics. Radio frequency (RF) channel characteristics such as these are predictable using well-known techniques to those skilled in the art. Preferred methods for predicting RF channel characteristics are outlined in U.S. Pat. No. 6,317,599 entitled "Method and System for Automated Optimization of Antenna Positioning in 3-D" by Rappaport et al, and in pending U.S. patent application Ser. No. 10/830,445 entitled "System and Method for Ray Tracing Using Reception Surfaces" by Skidmore et al, both of which are hereby incorporated by reference. If there is then established a reliable transform between the RF channel characteristics and end-user transport layer performance characteristics, the end-user transport layer performance can be reliably predicted as described in pending U.S. patent application Ser. No. 10/830,446 entitled "System and Method for Predicting Network Performance and Position Using Multiple Table Lookups" by Skidmore et al.

Research efforts by many have attempted to model and predict radio wave propagation. For example, work by AT&T Laboratories, Brooklyn Polytechnic, and Virginia Tech are described in papers and technical reports entitled: S. Kim, B. J. Guarino, Jr., T. M. Willis III, V. Erceg, S. J. Fortune, R. A. Valenzuela, L. W. Thomas, J. Ling, and J. D. Moore, "Radio Propagation Measurements and Predictions Using Three-dimensional Ray Tracing in Urban Environments at 908 MHZ and 1.9 GHz," IEEE Transactions on Vehicular Technology, vol. 48, no. 3, May 1999 (hereinafter "Radio Propagation"); L. Piazzi, H. L. Bertoni, "Achievable Accuracy of Site-Specific Path-Loss Predictions in Residential Environments," IEEE Transactions on Vehicular Technology, vol. 48, no. 3, May 1999 (hereinafter "Site-Specific"); G. Durgin, T. S. Rappaport, H. Xu, "Measurements and Models for Radio Path Loss and Penetration Loss In and Around Homes and Trees at 5.85 GHz," IEEE Transactions on Communications, vol. 46, no. 11, November 1998; T. S. Rappaport, M. P. Koushik, J. C. Liberti, C. Pendyala, and T. P. Subramanian, "Radio Propagation Prediction Techniques and Computer-Aided Channel Modeling for Embedded Wireless Microsystems," ARPA Annual Report, MPRG Technical Report MPRG-TR-94-12, Virginia Tech, July 1994; T. S. Rappaport, M. P. Koushik, C. Carter, and M. Ahmed, "Radio Propagation Prediction Techniques and Computer-Aided Channel Modeling for Embedded Wireless Microsystems," MPRG Technical Report MPRG-TR-95-08, Virginia Tech, July 1994; T. S. Rappaport, M. P. Koushik, M. Ahmed, C. Carter, B. Newhall, and N. Zhang, "Use of Topographic Maps with Building Information to Determine Antenna Placements and GPS Satellite Coverage for Radio Detection and Tracking in Urban Environments," MPRG Technical Report MPRG-TR-95-14, Virginia Tech, September 1995; T. S. Rappaport, M. P. Koushik, M. Ahmed, C. Carter, B. Newhall, R. Skidmore, and N. Zhang, "Use of Topographic Maps with Building Information to Determine Antenna Placement for Radio Detection and Tracking in Urban Environments," MPRG Technical Report MPRG-TR-95-19, Virginia Tech, November 1995; S. Sandhu, M. P. Koushik, and T. S. Rappaport, "Predicted Path Loss for Roslyn, Va., Second set of predictions for ORD Project on Site Specific Propagation Prediction," MPRG Technical Report MPRG-TR-95-03, Virginia Tech, March 1995, T. S. Rappaport, et al., "Indoor Path Loss Measurements for Homes and Apartments at 2.4 and 5.85 GHz, by Wireless Valley Communications, Inc., Dec. 16, 1997; Russell Senate Office Building Study, Project Update, Roger R. Skidmore, et al., for Joseph R. Loring & Associates; "Assessment and Study of the Proposed Enhancements of the Wireless Communications Environment of the Russell Senate Office Building (RSOB) and Associated Utility Tunnels," AoC Contract # Acbr96088, prepared for Office of the Architect of the Capitol, Feb. 20, 1997; "Getting In," R. K. Morrow Jr. and T. S. Rappaport, Mar. 1, 2000, Wireless Review Magazine; and "Isolating Interference," by T. S. Rappaport, May 1, 2000, Wireless Review Magazine, "Site Specific Indoor Planning" by R. K. Morrow, Jr., March 1999, Applied Microwave and Wireless Magazine, "Predicting RF coverage in large environments using ray-beam tracing and partitioning tree represented geometry," by Rajkumar, et al, Wireless Networks, Volume 2, 1996, "Cool Cloud Wireless LAN Design Guildelines and User Traffic Modeling for In-Store Use (Part 1: System Deployment" TR November 2003, WNCG University of Texas by J. K. Chen and T. S. Rappaport, and "Cool Cloud Wireless LAN Design Guildelines and User Traffic Modeling for In-Store Use (Part 2: Traffic Statistics) by C. Na and T. S. Rappaport, November 2003. A. Verstak, N. Ramakrishnan, K. K. Bae, W. H. Tranter, L. T. Watson, J. He, C. A. Shaffer, T. S. Rappaport, "Using Hierarchical Data Mining to Characterize Performance of Wireless System Configurations", Submitted to ACM Transactions on Modeling and Computer Simulation, August 2002.

Global Positioning System (GPS) is a well-known positioning technology that is widely used. Global Positioning System relies on a wireless device receiving radio signals from one or more orbiting satellites. By correlating the received radio signals from each satellite with pre-existing knowledge of the precise location of each satellite at the instant the signals are received, the GPS device can estimate its position on the Earth in terms of a latitude, longitude, and elevation. Existing GPS systems do not rely upon a site-specific model of the environment, nor do they contemplate the use of performance lookup table lookups to correlate measured RF channel characteristics with a position.

Airespace™ provides the Airespace Control System (ACS), a wireless local area network (WLAN) management software application that includes some limited capabilities for positioning mobile client devices. The ACS uses a crude two-dimensional model of an inbuilding environment with known positions of access points. The access points can measure received signal strength intensity (RSSI) information for wireless client devices and communicate that information to the ACS. The ACS then uses a technique referred to as fingerprinting, where the measured RSSI data for the client devices is compared with predicted RSSI data at various positions. Such a technique is limited by not considering other RF channel characteristics or the current network operating condition. In addition, the technique does not utilize a mesh with one or more performance lookup tables associated with each vertex, and does not contemplate a three-dimensional environment.

Ekahau™ provides the Real-Time Locationing System (RTLS) for determining the position of mobile wireless devices within a WLAN. The RTLS utilizes a crude two-dimensional model of an in-building environment. The RTLS relies upon large quantities of measured RSSI data that has been correlated to positions within the environment. That is, in order to determine a position using RTLS, one must first physically visit the environment in question and collect extensive measured RSSI information using an actual wireless client device. This measured RSSI information is then correlated with positions within the environment. At a later date, the RTLS compares measured RSSI data received live from wireless equipment monitoring and measuring devices with the pre-measured RSSI data. Through this comparison, the position of a wireless device is determined. The Ekahau RTLS does not contemplate using predicted RF channel characteristics or performance lookup table lookups as described herein, does not consider the current network operating condition, nor does the RTLS contemplate a three-dimensional environment.

Newbury Networks™ provides the WiFi Workplace™, a software application designed to provide enhanced security and positioning capabilities for WLANs. The WiFi Workplace utilizes a crude two-dimensional model of an in-building environment. The WiFi Workplace relies upon large quantities of measured RSSI data that has been correlated to positions within the environment. That is, in order to determine a position using WiFi Workplace, one must first physically visit the environment in question and collect extensive measured RSSI information using an actual wireless client device. This measured RSSI information is then correlated with positions within the environment. At a later date, the WiFi Workplace™ compares measured RSSI data received live from wireless equipment monitoring and measuring devices with the pre-measured RSSI data. Through this comparison, the position of a wireless device is determined. Newbury Networks™ does not contemplate using predicted RF channel characteristics or performance lookup table lookups as described herein, does not consider the current network operating condition, nor does the WiFi Workplace™ contemplate a three-dimensional environment.

In addition, various systems and methods are known in the prior art with regard to the identification of the location of mobile clients roaming on a wireless network. Such systems and methods are generally referred to as position location techniques, and are well-known in the field for their ability to use the RF characteristics of the transmit signal to or from a mobile device as a determining factor for the position of the mobile device. Various papers such as P. Bahl, V. Padmanabhan, and A. Balachandran, "A Software System for Locating Mobile Users: Design, Evaluation, and Lessons," April 2000 presents various techniques for doing crude position location from signal strength measurements.

Other companies such as AirTight, Polaris Wireless, and the radio camera concept from US Wireless (now defunct), use signal strength to estimate the position of wireless users. U.S. Pat. No. 6,674,403 to Gray et. al., U.S. Pat. No. 6,664,925 to Moore et. al., U.S. Pat. No. 6,799,047 to Bahl et. al., U.S. Pat. No. 6,259,924 to Alexander, Jr. et. al., U.S. Pat. No. 6,256,506 to Alexander, Jr., et. al., U.S. Pat. No. 6,466,938 to Goldberg, and Patent application 20020028681 to Lee, et. al., deal with estimating position locations using databases of measurements. In addition, some of the present inventors have filed pending U.S. patent application Ser. No. 10/386,943 entitled "System and Method for Automated Configuration of Transceivers For Obtaining Desired Network Performance Objectives," and pending U.S. patent application Ser. No. 10/830,446 entitled "System and Method for Prediction Network Performance and Position Location Using Multiple Table Lookups.". None of the aforementioned systems, methods, or techniques contemplates the novel capabilities and features that stem from knowledge of position.

SUMMARY OF THE INVENTION

The present invention presents a network management system (NMS) empowered by site-specific simulations. The NMS provides features for creating a virtual model of a home/office/enterprise environment, calculating expected network service areas and quality of service, determining the placement and configuration of network equipment within the modeled environment, monitoring and/or controlling network equipment to maintain the integrity of the network, and/or providing the end-user diagnostic information on network performance. In the preferred embodiment of the invention, NMS users quickly input basic site-specific information describing the environment in which the network will be deployed. The site-specific information may include but is not limited to the location and radio frequency propagation characteristics of obstacles, the location of network hardware, and expected distribution of clients and their required quality of service.

The radio frequency propagation characteristics of obstacles, and other detailed technical information that is useful for managing the network, may be abstracted in order to make the NMS easier to use. For example, the user may indicate that a wall is of the obstacle class "drywall", and that classification may be interpreted as implying a 3 dB loss in signal power at 2400 MHz for signal power propagating through the wall. Detailed RF characteristics for various obstacles and/or classes of obstacles are stored in internal tables which are mapped to conveniently familiar and abstract names recognizable and meaningful for non-technical NMS users.

Once the NMS user has employed the NMS to create a virtual model of the RF environment, as discussed in the previous paragraph, the site-specific-model-enabled NMS software proceeds to use sophisticated RF propagation and RF link budget calculations to simulate the behavior of the network. Numerous characteristics which are meaningful to the NMS user may be calculated and displayed textually, numerically, or graphically, including most obviously the expected data rate and/or throughput for the network at sample locations within the area of deployment in the home or facility, but also including but not limited to received signal power, interference, noise, and various derived quantities such as signal-to-noise ratio, signal-to-interference ratio, and other derived quantities.

As the user is expected to place great value on a high degree of abstraction and simplification, the presentation of the behavior of the network will, in the preferred embodiment of the invention, be optionally available as a simple graphical plot of which areas of the deployment (e.g. which rooms in the building) will have satisfactory service, with "satisfactory" defaulted to industry norms or other desirable defaults, and configurable by the user. For example, the NMS in the current embodiment of the invention provides a simple plot of a green overlay on a floor plan of a building, where the green overlay or "fill" marks those areas of the facility where the simulated data rate provided by an 802.11g wireless network is at least 54 Mbps. Because site-specific information about the building environment is used to calculate expected network performance, the site-specific-information-enabled NMS user receives a more accurate picture of the expected network performance, a picture customized to their facility. However, it should be clear that another embodiment of the invention would have no display whatsoever, for example, in the case of a consumer appliance where the customer/user has no knowledge or interest in radio propagation or network performance characteristics.

The wireless system or network could exploit site-specific knowledge, measurement capabilities throughout the network, and simulation and computation capabilities that exploit the site-specific knowledge, to enable a network to handle new devices brought into the home, or facility, or to enable the network to handle devices removed or disabled in the home or facility, or to self-adapt/heal itself if neighboring wireless devices (where wireless devices herein are defined broadly, and could be, for example, client devices, access points, printers, toys, and even servers and switches that control wireless transmitters, receivers or transceivers) within a neighboring home or apartment interfered with the wireless system, or to self-adapt/heal itself if network usage requirements changed in the wireless system. The site-specific knowledge is valuable in providing better predictions of performance, and correlating them to measurements. Furthermore, the site-specific knowledge enhances the predictions of the cause and effect of changing networks over time. The site-specific knowledge is valuable for learning the on-going network behavior, controlling one or more devices in the network, and adapting the network, such as identifying and implementing proper handoffs, traffic allocation to various users, etc. It should be clear that the end user would never have to actually see a display of such decisions.

For example, an 802.11g wireless access point might typically have a statement printed on the product packaging, claiming that a 54 Mbps peak data rate could be expected out to a distance of 50 feet from the antenna. The 50 foot range is naturally a crude approximation based (at best) on statistical averages sampled in many different areas of many different buildings, boiled down to one value for the range. However, the site-specific-information-enabled NMS has user-specified or automatically gathered information about where the walls in the facility are located, and whether they are drywall, brick, concrete, etc.

The site-specific-information-enabled NMS also knows where the user-installed equipment is located, again due to user input or automatic determination. The NMS, in this example, could be informed by the user that the access point is located in the boardroom, and that coverage at 54 Mbps is desired in the lunchroom and in the reception area. Though the lunchroom is less than 50 feet away, the NMS could determine that due to the presence of external brick walls between the boardroom and the lunchroom (e.g. for an "L"-shaped floor plan), the lunchroom would in fact not receive 54 Mbps. Or, though some portions of the reception area were more than 50 feet away, the site-specific-information-enabled NMS could determine that due to the presence of only one light drywall between the boardroom and the reception area, the entire reception area would receive suitable coverage.

The site-specific-information-enabled NMS can also automatically plan the location of network hardware on behalf of the user. Based on the user-specified description of the RF environment, and using automatic network design algorithms described in the references of this document, described in prior art, or developed in the future, the preferred embodiment of the invention recommends the best placement of network hardware in order to achieve the performance goals of the user. For example, the user could specify that two 802.11a wireless access points were available, and that they desired 54 Mbps of peak data rate in each of several different areas of an office building; then the software could determine a configuration in which: one access point was placed in the boardroom and another halfway along a hall outside a particular "cubicle farm"; the 802.11a radio should be enabled, while the 802.11g radio could be disabled on the access points; the channel setting of the one access point should be channel 32 and that of the other access point should be 48; and the power settings of the two access points should be 10 milliwatts. As a result of the automatic planning in this example, the user would achieve their goal of 54 Mbps in the specified rooms of their building, whereas without such a plan, the access points could easily end up in less effective locations chosen by the novice wireless network user, and the access points could easily be left using their default channel, therefore sharing the same channel and interfering with each other. These problems are avoided by implementing the plan generated automatically by the site-specific-information-enabled NMS.

In addition to providing visualizations of the expected behavior of the network, and in addition to automatically planning the network layout, the site-specific-information-enabled NMS, in the preferred embodiment of the invention, also manages, configures, commands, and controls the hardware that implements the network. This can be achieved using an NMS that is on site at a server, client, access point, switch, router, etc., or an NMS that is remotely located and connected by web portal or by other means. By using the network itself, or via other communication channels (telephone modems, USB interfaces, web portal or interface, home to media gateway, operating system or other device or application capable of interacting with other devices through some form of communication network, and other channels and methods, whether on-site, locally or remotely), the NMS polls network devices in order to assess their current configuration and status, and in order to gather any network statistics or network status assessments provided by network devices.

For example, the site-specific-information-enabled NMS could request via a standard or proprietary interface that an access point relate its current configuration to the NMS, including the air interface standard(s) currently active, currently active radio channels, current transmit power on each radio channel, security settings, network identifiers and addresses employed by or assigned to the access point, user connection statistics for the access point, and/or other access point characteristics. The site-specific-information-enabled NMS can also retrieve other information from network devices, including any measurements that network devices may have made, or statistics that they may have gathered. For example, the NMS can query network devices for the channel number, signal level, transmit power, received signal strength from all visible network devices, and other characteristics of any rogue transmitters which may have been detected during routine RF scans.

The NMS compares the information polled from the network (current or historical status information and actual configuration information) to user-specified or automatically determined network configuration and performance expectations, and provides notifications (if desired) to the user of any discrepancies or problems. For example, if the user had specified that the access point be set up to broadcast on channel number I, but the access point was actually broadcasting on channel 6, the user would receive a notification about the discrepancy. As another example, the user could be notified that unexpected interference from a rogue transmitter was negatively affecting signal quality for some wireless network devices. As another example, the user could be notified that a certain percentage of the home or facility does not have adequate coverage, signal quality, or quality of service, or that a critical region of the home or facility (such as a executive conference room) does not have adequate quality of service throughout the entire region.

If desired by the user (who may not desire this level of complication in the user interface), the NMS user can also be presented with possible remedies for the discrepancies between planned and anticipated network configuration and performance, and actual network configuration and performance. Extending the previous example, the site-specific-information-enabled NMS advises the user via a pop-up window, email, alert log, or other suitable notification that the user should adjust the channel setting on the access point to channel 6 in order to remedy the configuration discrepancy. In order to simplify the user experience, and reduce the work-load for the NMS user, the preferred embodiment of the invention communicates via various methods (listed above), with network devices directly in order to automatically apply recommended remedies for network configuration discrepancies or undesirable network behavior.

For example, in addition to or in place of a notification to the user, the NMS directly commands the access point whose channel is set incorrectly, forcing the access point to transmit on the correct channel 6. As an alternative, the site-specific-information-enabled NMS could reconfigure a wireless access point to use a channel which did not suffer from interference from a nearby rogue transmitter detected by that access point, while simultaneously taking into account the presence of other (planned) transmitting network devices and their channel assignments, locations, and resulting interference consequences, and while simultaneously ensuring the quality of service within all the regions of interest in the facility or home. Any event which negatively impacts the performance of the network could be dealt with by the NMS, leveraging its knowledge of the radio propagation environment, link budgets of wireless networking hardware, and user requirements.

In the preferred embodiment of the invention, the site-specific-information-enabled NMS is an application that is executed on a host hardware platform which is readily and cheaply available to the user, including but not limited to a personal computer (PC), personal digital assistant (PDA), smart phone, network switch, router, hub, gateway, or home audiovisual media controller. For example, the site-specific-information-enabled NMS would preferably provide a desktop application for personal computers running the Microsoft Windows operating system, which could be used by double-clicking on a desktop icon. The NMS application provides a graphical user interface in order for users to input information about the environment in which the network is deployed, input information about the location and identity of network hardware, view and edit network configuration parameters, visualize network performance, and execute network configuration commands or remedies. The NMS can be located on site or be remote (e.g., connected by web portal, etc.).

Alternately, the NMS could operate without a graphical user interface (GUI), and may be implemented in a centralized or distributed manner. For example, some of the software is executed in a controller, network switch, access point, or client device, and other software is executing in other devices in the network, such as other controller, network switches, access points, and client devices, or possibly even remotely via on a web server or web portal. The NMS can rely on its own internal representation of the network and its environment, or on a representation stored on another networked device, without requiring that the user of an NMS-embedded device interact with that representation or even that the device's user be aware of the presence of the NMS. Likewise the NMS embedded in a device may take action to correct or adapt to problems on its own, by generating commands that change its behavior or that of other distributed network devices, without any involvement of the device's user.

Extending the previous example, when the user double clicks the relevant desktop icon on a personal computer running the Microsoft Windows operating system, a dialog would preferably appear presenting the user with various fields into which configuration settings could be entered, including but not limited to fields in which could be typed a channel (e.g. 6), air interface standard, transmit power, and/or other configuration parameters. The site-specific-information-enabled NMS application also provides a software agent that runs in the background on the host hardware platform, and automatically monitors the network in real time, rapidly and autonomously corrects configuration or performance problems, and notifies the user only when network problems reach a user-configurable threshold of urgency and cannot be automatically resolved. It should be understood that the software agent may alternately be distributed between a host switch or controller or web server, and accessed locally or remotely via the internet or web portal.

When the host platform is powered up, or at any time thereafter, the software agent can be configured to automatically start up and run without a graphical user interface, and the software agent can then perform all of the previously detailed network management functions which do not require a graphical interface (including but not limited to polling network devices for status and configuration, and automatically correcting improper configuration and/or performance problems based on a previously user-specified plan), thereby providing a carefree service to the user until such time as the user decides to manually use the desktop application and its graphical user interface to intervene to alter settings, check system status, or respond to alerts generated by the background software agent.

Further extending the previous example, when a personal computer running the Microsoft Windows operating system is powered up, the software agent can be automatically initiated as a background service, and at any time thereafter, via a status update request sent over the local network, the software agent could discover that an access point on the network was improperly configured to use channel 1 instead of channel 6, and then the software agent could automatically send suitable commands over the local area network to the access point, causing the access point to change its transmit channel to the correct channel 6.

The network is expected to consist of a heterogeneous mix of equipment from various manufacturers, using various air interface standards, having various network characteristics and radio characteristics, and exhibiting varying degrees of interoperability. Naturally the typical user is averse to manually optimizing the interactions between a multitude of diverse network entities. As a result, the preferred embodiment of the invention is versatile with respect to the manufacturer, air interface standard, radio transmit characteristics, and other characteristics of the network hardware it manages. The site-specific-information-enabled NMS utilizes standard management interfaces including but not limited to the Simple Network Management Protocol (SNMP), and also uses utilizes management interfaces defined by radio air interface standards including but not limited to the IEEE standards, such as the IEEE 802.11, 802.15, and 802.16 family, such as IEEE 802.16f and IEEE802.16g, as well as proprietary interfaces disclosed by individual manufacturers, to communicate with network hardware. In this way the NMS seamlessly characterizes, plans, and manages complex heterogeneous networks. For example, standardized protocols are provided in the upcoming 802.16g wireless radio air interface standard for broadband wireless access, which enable the site-specific-information-enabled NMS to directly alter the channel setting of a subscriber station on the network, regardless of which manufacturer produced the subscriber station hardware.

The use of site-specific information by the NMS is a great improvement over NMSs that depend entirely on measured network statistics. Simulations based on a site-specific description of the environment can predict and deal directly with interference. Interference can prevent network entities from gathering reliable and accurate measurements, and therefore, can defeat the efforts of a measurement-only NMS to design a network topology, or to correct network problems. Site-specific simulations, on the other hand, anticipate interference, simulate it, may plot it, plan around it, and correct it. Site-specific simulations of network performance are not limited or defeated by interference. Simulations can also adapt in real time to reported changes in network configuration, by simply updating the network model parameters of the simulation, whereas measurement-based planning methods require that the environment be re-surveyed to obtain new measurements in order to adapt to a network configuration change.

As a particular example, the classic "hidden node" problem describes a (common) situation in which network entities A and B are attempting to communicate in the face of interference from entity C. In the hidden node scenario, entity C is positioned so that it interferes with signals at the position of nearby entity B. However, entity C is too far from entity A to be detected. A measurement based system relies on entity B to solve the problem, since it is the only entity that can "see" both of the others. Unfortunately, due to interference between signals from A and C, entity B will have great difficulty accurately and reliably assessing the signals from either A or C. So, it will be difficult or impossible to properly determine a solution to the hidden node problem based on measurements. Even worse, the more activity that is present on the network, and the more that the network is strained by user loading, the more interference is present, and the less reliable measurements become. Thus, a measurement-based system has the most trouble when the network is in the most need of help A simulation, on the other hand, based on known positions of A and C, and if available of B, can immediately simulate the interference expected from the network design, and can immediately propose alternative channel or power settings to resolve the hidden node problem and restore service to network device B.

The site-specific-information-enabled network management system described above offers many benefits to the user, including improving network performance or availability in an adaptive, self-healing manner. By capitalizing on the features of the site-specific-information-enabled NMS, the user is more likely to successfully install their network. The NMS also reduces the likelihood of undesirable network equipment returns by ensuring that the network performs well and by informing the user about remedies that do not require returning the software (or by automatically remedying problems in the background). The NMS also reduces the need for customer support or other aid, by expertly correcting problems or advising the user. Problems which may be technically beyond the understanding of the user, can be automatically resolved by the site-specific-information-enabled NMS, e.g. automatic channel planning for multiple-transmitter multiple-technology multiple-air-interface-standard wireless networks so as to reduce radio interference and improve network performance. For example, a wireless network properly configured and with hardware located can easily achieve, for example, better signal strength, signal-to-interference, signal quality, throughput, or coverage in areas where service is desired, and thereby can offer a much higher data rate to network users.

Aside from business and enterprise users, home users too can benefit from a site-specific-information-enabled NMS. Home users will be expected to place the highest value on simplification, so that a minimal user interface, or no user interface at all, is highly desirable. Such a low-maintenance home NMS would be expected to be highly autonomous. Therefore, of the options described above for the NMS, the home NMS would be expected to embody those requiring the least user interface and leveraging the most possible automation. The preferred embodiment of the invention maximizes the automation provided for the creation of a virtual building model, and for designing, deploying, and maintaining the network topology and configuration.

It will be apparent to one skilled in the art that the same features and capabilities inherent in the general site-specific-information-enabled NMS, as described above, could be implemented on other platforms and at various locations in the network. In particular, the preferred embodiment of the invention implements the NMS functions detailed above, embedded in the hardware and software of network devices. For example, network management features discussed in the preceding section could be part of the functionality of a switch or controller that controls a number of wireless local area network access points (WLAN APs), or may be part of individual access points. The site-specific-information-enabled NMS may beneficially be embedded in a great variety of network devices, including but not limited to access points, WLAN client cards, cellular/PCS/3G phone handsets, personal digital assistants (PDAs), personal computers (portable and otherwise), network-enabled appliances, and network-enabled manufacturing equipment.

It would also be useful to embed the NMS in devices which would not otherwise use the network, but whose location is of interest, or in devices which are located in or move through portions of the environment which it would be useful to monitor. In some cases the NMS would be usefully installed in a dedicated device, with or without a user interface, with or without its own direct measurement capabilities, whose sole purpose was the planning and management of the network, and which might be attached to moving vehicles, carried by people working in the network environment, attached to walls of buildings, implanted into sidewalks, and so on.

The NMS described herein may be implemented remotely or controlled remotely via a wireless or wired communication interface. The NMS itself may be implemented on a host switch or other network device within a home or enterprise, but access to and from the host device could be provided over any communication protocol or pathway, including a web portal or via the Internet. This would be enabled by allowing the device hosting the NMS to have an internet or web address or other means of uniquely recognizing and addressing the device.

Network devices commonly do not have a full-fledged visual display (e.g. CRT or LCD monitor). However, network devices generally have some sort of interface, either via the network as an HTML interface, or through some sort of serial connection. Therefore, insofar as the user interface is concerned, there is no limit to the functionality provided by an embedded network management system. However, it is expected that the embedded NMS will require a minimal or nonexistent user interface, as it will be largely or wholly autonomous, so that devices in which the NMS is embedded may be deployed in the widest possible variety of situations. In this respect the embedded NMS is more similar to the software agent described above, than to the desktop centralized NMS application.

The embedded NMS takes advantage of site-specific descriptions of the network deployment environment in the same way as the centralized NMS. In the preferred embodiment of the invention, the user is provided with a user interface for a user to initially and/or periodically specify site-specific information directly to the embedded NMS via an HTML web interface, serial interface, or other direct interface. Additionally, the preferred embodiment of the invention includes a mechanism for "pushing" or communicating site-specific information from other NMSs which possess that information, onto the network device hosting the embedded NMS, so that the embedded NMS can access it. For example, the centralized site-specific-information-enabled NMS described in previous sections of this document could be used to create a 2D or 3D virtual model of an office building, including the location and RF characteristics of walls and other obstacles, and then the centralized NMS could communicate that model via the local or wide area network (wirelessly if appropriate) to other network devices on which an embedded site-specific-information-enabled NMS was operating, there to be used to implement the NMS functions described herein. New embedded-NMS devices brought into a network automatically download the site-specific data shared by other network devices, and then self-configure themselves for operation on the network. In fact, note that the embedded NMS application itself may be distributed via the network and installed on network devices automatically, so that devices new to the system may gain the ability to properly configure themselves simply by being physically hooked up to the network.

The functions provided by a site-specific-information-enabled embedded NMS include those provided by the centralized NMS, and expand on those functions. In particular, the embedded NMS can poll and present information about the network, and can autonomously request or command other network devices to alter their configuration in order to improve network performance. In many cases this activity will not require user interaction, just as the software agent of the centralized NMS can perform many network improvements autonomously. The network device can also alert users via email, paging, or other notifications, when the embedded NMS judges that user intervention is required to fix a problem, as does the software agent of the centralized site-specific-information-enabled NMS described above.

Distributing network intelligence onto many network devices has many advantages over limiting the NMS to one central host. Remote devices may not be able to communicate with the host without adjusting their own settings, and an embedded NMS provides the remote device to regain its network connection intelligently. For example, a WLAN client could lose contact with its network due to interference. An NMS embedded in that client could easily recommend a better transmit and receive frequency set for the client, based on the site-specific knowledge of the environment and on known locations of available network servers and their characteristics. Such a determination would benefit substantially from accurate information about the client's current location, which can be determined by the embedded NMS via triangulation on the received power from various nearby transmitters, or via a mesh of predicted signal values from transmitters near and far, as calculated or downloaded to the embedded NMS.

Another advantage of the embedded NMS is that confidential information on the network device need not be communicated to a central (potentially insecure) server in order to have decisions made remotely. For example, a PDA on a WLAN may possess private or otherwise sensitive information about usage patterns, the location of the PDA, and other such information. The sensitive information is useful in deciding how to configure the network parameters of the PDA, so it is leveraged by the embedded NMS without disclosure to outside entities. In this way, for example, a PDA could adjust its channel to a channel with less expected interference in the expected area where it will roam in the future, based on previously noted user habits for the network device, and on site-specific information about the network and its operational environment, without disclosing the location or extent of its future position. Furthermore, an NMS embedded on that same PDA could request or command configuration changes for other entities on the network, in order to achieve its own required services, without disclosing those requirements to other network entities.

For example, the NMS embedded in a PDA could log the PDA's past network activity and its position, and thereby anticipate that at time A the device would need access to network data resource B, while the device was in physical location C. Or, the same determination could be made by the PDA's user and entered in via a simple user interface. Then, that information about network usage requirements could be locally combined with general network intelligence received earlier as part of a distribution to all NMS's on the network. The NMS embedded on the PDA might then discover that due to the configuration of the PDA or of the network, reliable access to resource B could not be provided in location C at time A, due to the fact that two network access points D and E were interfering with each other in location C, and preventing access to any network access point which could supply a route to resource B. The NMS could then automatically correct the situation by requesting or commanding access points D and E to alter their channel configurations. The only information that would be required to disclose to access points D and E, and therefore to others monitoring network traffic, would be the necessity of a change in the radio channel they were using. The information that the PDA would be at location C, and would be looking at resource B, at time A, could remain secret, local information on the PDA alone.

Embedding the site-specific-information-enabled NMS on every network device has yet another advantage, in that it reduces network traffic. Rather than requiring that all network information be sent to a central NMS, only that information that is necessary for the central NMS to do its work need be sent. The central NMS can be updated on a more leisurely timescale because the embedded NMS can be relied on to handle or ameliorate short-term problems. In some cases no central NMS will be required at all, as long as the embedded (and therefore distributed) NMSs on each network device are allowed to cooperate or to have a hierarchy of decision-making/planning power. Each distributed embedded NMS can gather and disclose as much or as little information as it needs to, and communicate only that information needed by other devices to make their own informed decisions, while preserving the security of sensitive or private information.

Note that the processing power and memory of network devices continues to increase rapidly. On the other hand, battery technology, and battery life, are improving much more slowly. Using trial-and-error measurements, transmitting tests and negotiating settings continuously in real time, uses up battery power. It is much better to use the plentiful bandwidth and memory of network devices to solve network problems, than it is to use precious battery power to solve those problems by trial and error.

The present invention also presents a novel approach to the prediction of wireless device position. One embodiment of the present invention combines site-specific environmental models, predicted RF channel characteristics, and multidimensional lookup tables that correlate RF channel characteristics with actual positions within the environmental model.

Emerging network products and devices provide real-time or polled measurement of network behavior; such measured data pulled directly from network devices regarding other wireless devices can be used as described herein to determine the position of the measured wireless devices within a known environment. Through comparison of the actual measured data with predicted data contained within lookup tables correlated to actual positions within the environment, an accurate determination of the position of a wireless device can be performed.

There are several computer aided design (CAD) products on the market that can be used in some manner to aid positioning, but none contemplate the combination of site-specific environment modeling, prediction of RF channel characteristics, and the use of multidimensional tables providing a correlation between RF channel characteristics and other quality of service metrics as described herein.

The present invention relates to the creation of multidimensional tables providing a correlation between predicted or measured RF channel characteristics and specific locations within a known environment. That is, in accordance with one embodiment of the present invention, at any location within a known environment, the present invention may utilize predictive models to calculate one or more RF channel characteristics given known or supposed network equipment within the environment; these calculated RF channel characteristics are stored in lookup tables that correlate multiple RF channel characteristics with a position in the environment. At any given position, one or more lookup tables may exist, corresponding to multiple RF channel characteristics or other metrics derived from RF channel characteristics as described below. Received measured RF channel characteristics for wireless devices detectable by the existing network equipment are then used by this embodiment of the present invention to determine one or more possible positions for the wireless devices. This is done by correlating the measured RF channel characteristics with the appropriate lookup tables across possible positions and identifying the lookup tables that closely match the actual measured RF channel characteristics.

While prior art references describe a process of correlating measured or predicted RSSI with known positions, they do not contemplate a method of correlating site-specific environment models and one or more RF channel characteristics using one or more look-up tables for the purpose of rapidly and effectively determining or analyzing the position of a wireless device. The ability to determine the position of users or to determine wireless network performance, using one or more data from multiple complimentary look up tables, is novel. One embodiment of the present invention provides significant benefit to the field of positioning by using site-specific propagation prediction to enable the a priori determination of the RF propagation and channel environment within the facility without the need for exhaustive measurement campaigns, and then uses this prediction capability in order to build look up tables based on the site-specific predictions.

The predictive capability of one embodiment of the invention enables the correlation of multiple RF channel characteristics to a particular location or over many locations, rather than relying on a single RF channel characteristic to provide input data for estimating position. Multiple predicted RF channel characteristics, each of which having a lookup table correlating RF channel parameters to a known or estimated position, can be used with the multiple table lookup mechanism provided by this invention for ready use in carrying out position location computation and displays, or studies or analysis of location-specific data. This embodiment of the current invention allows for on-going measurement (through a network of receivers or access points, for example) or prediction (using site-specific propagation modeling) by the use of multiple tables of data that can be rapidly processed, (e.g. read, looked at, interpolated, etc.) to provide inputs to empirical or theoretical models of performance or position location. Through the use of look-up tables, it becomes possible to make very rapid estimates of wireless device position with sparse data. The device that estimates positions does not need to have sufficient calculation power to create the lookup tables, only to make relatively simple comparisons between values in the tables and values samples by measurement or prediction. This enables the position-estimating device to be relatively simple, small, and inexpensive.

One embodiment of the invention uses multiple lookup tables correlated with one or more positions within an environment, and the appropriate weighting or correlation of such multiple look up tables, as well as a mapping function which maps one or more input variables in these one or more multiple look up tables (for example, RF channel characteristics such as RSSI, SIR, SNR, delay spread, and other parameters) into a single output variable or multiple output variables (for example, network performance metrics such as throughput, FER, PER, BER, or position location of one or more users). A preferred form of the transform function identifying the mapping between one or more RF channel characteristics and the desired network performance metric or metrics of interest is given in pending application Ser. No. 09/668,145, entitled "System and Method for Design, Measurement, Prediction and Optimization of Data Communication Networks," filed by T. S. Rappaport, R. R. Skidmore, and Ben Henty, hereby incorporated by reference.

According to one embodiment of the present invention, a system is provided for allowing a communication network designer, network user, trained or untrained operator, or autonomous controller to dynamically model a wired or wireless system electronically in any physical environment, by using site-specific models of the physical environment of interest. The method includes the selection and placement of models representing various wireless or optical or baseband communication network hardware components, such as antennas (point, omnidirectional, directional, adaptive, leaky feeder, distributed, etc.), base stations, base station controllers, amplifiers, cables, RF ID tags, RF ID readers, mobile or portable transmitter, receiver or transceiver devices, splitters, attenuators, repeaters, wireless access points, couplers, connectors, connection boxes, splicers, switches, routers, hubs, sensors, transducers, translators (such as devices which convert between RF and optical frequencies, or which convert between RF and baseband frequencies, or which convert between baseband and optical frequencies, and devices which translate energy from one part of the electromagnetic spectrum to another), power cables, twisted pair cables, optical fiber cables, and the like, as well as MIMO (Multiple Input, Multiple Output) antenna systems, and allows the user to visualize, in two- or three-dimensions, the effects of their placement and movement on overall system/network performance throughout the modeled environment, while gaining many new features and services that use position location to provide a more robust or enhanced wireless network.

For the purposes of this invention, the term "transceiver" shall be used to mean any network component that is capable of generating, receiving, manipulating, responding to, passing along, routing, directing, replicating, analyzing, and/or terminating a communication signal of some type. The term "transceiver" may be used interchangeably herein with "access point", "base station", "transmitter", or other commonly used descriptive terms used for wireless devices that are capable of behaving as a transceiver as defined.

In addition, the present invention may be hosted upon and execute on any computing device capable of interacting in some fashion with a communications network. Examples of such computing devices include, but are not limited to: access points, network switch, router, hub, gateway, mesh node, network client, amplifier, base station, web portal, repeater, transceiver, sensor, probe, transmitter, receiver, modem, telephone, cordless phone, RFID tag, Zigbee transceiver, personal computer, server, laptop, personal digital assistant (PDA), cellular telephone, portable game controller, home media gateway or hub, home media controller, or any other form of network device or appliance. Such devices may also include devices which have no other inherent computing capability beyond that provided specifically in order to host the NMS, but whose position is of interest, or which are located in useful positions for the purpose of sensing, displaying, controlling, or otherwise managing the network, for example, clothing, refrigerators, automobile steering wheels, watches, eyeglasses, televisions, etc. The interaction with a communications network may involve any combination of transmitting, receiving, measuring, monitoring, listening to, interfering with, or otherwise manipulating messages or signals across the communications network.

The placement of components can be refined and fine-tuned prior to actual implementation of a system or network, wherein performance prediction modeling or measurement may be used for design and deployment; and to ensure that all required regions of the desired service area are blanketed with adequate connectivity, RF coverage, data throughput, security, proper or desired location, proper power or spectrum allocation for necessary communication, or possess other required network system performance values, such as acceptable levels of quality of service (QoS), packet error rate, packet throughput, packet latency, bit error rate, signal-to-noise ratio (SNR), carrier-to-noise ratio (CNR), signal strength or RSSI, rms delay spread, distortion, and other commonly used communication network performance metrics, known now or in the future, which may be measured or predicted and which may be useful for aiding an engineer or unskilled user in the proper installation, design, management or ongoing maintenance of a wired or wireless communications network.

In the case of an optical or baseband wired network, for example, the placement and performance of components can be visualized, in one embodiment of the invention, to ensure that proper portions of the environment are supplied with service, so that users within the environment may connect directly (with a hardwired connection) or via a wireless or infrared connection which can be provided throughout the wired network using translators, converters, wireless access points, and other communication components that facilitate frequency translation and wireless access from the wired network. The 2-D and 3-D visualization of system performance as predicted or measured using the method described herein provides network designers and maintenance personnel with tremendous insight into the functioning of the modeled wireless or wired communication system, and represents a marked improvement over previous visualization techniques.

To accomplish the above, a 2-D or 3-D site-specific model of the physical environment is stored as a CAD model in an electronic database. This model may be extensive and elaborate with great detail, or it may be extremely simple to allow low cost and extreme ease of use by non-technical persons wanting to view the physical layout of the network. The physical, electrical, and aesthetic parameters attributed to the various parts of the environment such as walls, ceilings, doors, windows, floors, foliage, buildings, hills, and other obstacles that affect radio waves or which impede or dictate the routing of wiring paths and other wired components may also be stored in the CAD model/database, such as performed using Wireless Valley SitePlanner or LANPlanner products.

A representation of the environment is preferably displayed on a computer screen for the designer or untrained user to view. Note that the network/computer controller may display the screen remotely on a device different than where the computing and prediction is performed (e.g. through Internet web browsing or dedicated video channels), or may display the screen on a monitor which is part of the computer controller which implements the prediction engine and table lookup processing, and network control signals. Furthermore, the computer controller may be distributed among different sites or computer platforms, either in the network or distributed between clients and servers, or co-located or located remotely from the actual network of interest. The designer may view the entire environment in simulated 2-D or 3-D, zoom in on a particular area of interest, or dynamically alter the viewing location and perspective to create a "fly-through" effect.

Using a mouse or other input positioning device, the user may select and view various communication hardware device models that represent actual communication system components from a series of pull-down menus. A variety of amplifiers, cables, connectors, and other hardware devices described above which make up any wired or wireless communication system or network may be selected, positioned, and interconnected in a similar fashion by the designer to form representations of complete wireless or wired communication systems. U.S. Pat. No. 6,493,679 entitled "Method and System for Managing a Real-Time Bill of Materials" awarded to Rappaport et al sets forth a preferred embodiment of the method for creating, manipulating, and managing the communication system infrastructure as modeled in the CAD software application.

In one embodiment of the present invention, the designer/user may utilize the system to perform calculations to predict the positions of detectable wireless devices within the environment. Alternatively, the computerized system may compute positions without human intervention or interaction. Position is defined as any location within a known environment that can be represented as an {x,y} or {x,y,z} coordinate of known units relative to a known or implied coordinate system. This is accomplished by comparing the measured RF channel characteristics or performance of the wireless device with predicted RF channel characteristics in lookup tables. Performance in this context refers to any form of measurable criteria and includes, but is not limited to, adequate connectivity, RF coverage, data throughput, or required network system performance values, such as acceptable levels of quality of service (QoS), packet error rate, packet throughput, packet latency, bit error rate, signal-to-noise ratio (SNR), carrier-to-noise ratio (CNR), signal strength or RSSI, desired rms delay spread, distortion, and other commonly used communication network performance metrics, known now or in the future. As each lookup table is correlated to a known position within the environmental model, the present invention determines the set of lookup tables providing the best match with the measured RF channel characteristics and performance to identify possible positions of the wireless devices.

The determination of the best match among the lookup tables can be made in a number of ways. For example, in a given position, a WLAN client might measure its received signal power from all WLAN access points within range, and its overall data throughput from any access points which recently had provided service to the client in question. A signal-power-based lookup table could be used to determine an estimated location based on the signal power sampled values, and a separate data-throughput-based table could be used to determine a second independent estimated location based on the data throughput sampled values. A measure of the confidence or reliability associated with each of the two estimates can then be generated. Various measures of confidence would be suitable, including but not limited to: a count of the number of possible locations yielded by the lookup for each table (a lookup generating fewer possible positions could be considered to be more reliable or more useful); a count of the number of individual measurements available for use in the lookup table (a lookup using more values could be considered to be more reliable, so that a lookup based on signal power measurements from three nearby access points could be considered to be more reliable than a lookup based on data throughput measurements from only one access point); a ranking might be established that preferred certain characteristics to others if available (so that a position estimate based on SIR could always be given preference over position estimates based on signal power); and other such assessments of confidence.

The method presented additionally provides a means for visualizing the predicted position of wireless devices overlaid onto and/or embedded within the site-specific model of the environment. In some embodiments, the present system extends the prior art in this area by allowing a designer a 2-D or 3-D view of position data overlaying the environment model. U.S. Pat. No. 6,317,599 entitled "Method and System for Automated Optimization of Antenna Positioning in 3-D" awarded to Rappaport et al. sets forth a preferred embodiment of the method for predicting the performance of a communications network within a site-specific model of the environment.

The following description of additional embodiments further describes the following selected aspects of systems that predict the position of wireless devices:

2D/3D site-specific database with display;

Multiple meshes (described subsequently) can be created in any polygonal form and at any elevation, with two-dimensional or three-dimensional distributions of mesh nodes, in any two-dimensional or three-dimensional regular or irregular relation to each other;

Each vertex (described subsequently) in the mesh can not only have a performance table associated with it, but can also have other data—such as a digital picture, audio file, security privileges, etc.—associated with it;

One embodiment of the current invention uses performance lookup tables correlated to an {x,y} or {x,y,z} position;

One embodiment of the current invention provides the ability to define and use performance lookup tables that correlate to a particular operating state of the network (e.g., having a certain number of users connected, bandwidth usage, time of day, current equipment configuration, special mode of operation, etc.). This allows the position calculation application to further refine the accuracy of its results by being able to account for the current operating state of the network in the calculation of the position of a wireless device.

One embodiment of the current invention provides the ability to correlate measured RF channel characteristics from wireless devices (e.g., RSSI, delay spread, SNR, packet error rate, etc.) with other information about the current operating state of the network (e.g., loading, bandwidth, equipment configurations, time of day, etc.); this then feeds into the lookup tables to further refine the set of possible locations.

One embodiment of the current invention provides the ability to correlate current network operating conditions to a different position. That is, if a certain set of measured RF channel characteristics is recorded at 3 pm, for example, it may map to a different location than if recorded at 4 pm, for example, because the network shifts to a different configuration between those two times.

One embodiment of the current invention provides the ability to use historical measured RF channel characteristics and possible information about wireless device speed (and possibly direction) to improve positioning accuracy.

One embodiment of the current invention provides the ability to host or embed the position calculation application within a non-traditional computing device, such as a WLAN access point, WLAN client device, switch, router, hub, gateway, PCMCIA card, RFID tag, sensor, telephone, cellular telephone, PDA, pen tablet, or other similar device such that the device is capable of determining the position of either itself or other wireless devices within the environment per the mechanisms discussed herein.

One embodiment of the current invention provides the ability for the position calculation application, site-specific environmental database, predicted performance lookup tables, and measurement application to all reside on either the same computing device or on separate, networked computing devices.

One embodiment of the current invention incorporates knowledge of surrounding environment, nearby network equipment, and the configuration/status of nearby network equipment can be communicated between authorized devices, enabling client and network devices that can host or communicate with the position calculation application to identify their own position. Site-specific information can be shared with new authorized wireless devices, measuring devices, measuring applications, or other such devices added to the network such as new authorized client devices.

One embodiment of the current invention incorporates site-specific data embedded in silicon/hardware, which enables more accurate decision-making and, as a result, better network performance. If the position calculation application is embedded on wireless devices or hosted on distributed computing platforms, each such wireless device or computing platform can make decisions about its own configuration and position.

One embodiment of the current invention provides site-specific information on-chip which enhances position calculation, as client devices can resolve their own location independent of the installed infrastructure.

One embodiment of the current invention enables position tracking for large numbers of client devices with minimal network overhead.

One embodiment of the current invention includes client devices that can resolve the location of rogue access points and users that may be invisible to the remainder of the network.

One embodiment of the current invention allows site-specific knowledge of environment and network infrastructure to be embedded at any network or client device.

One embodiment of the current invention includes a network device or client device that can monitor signal strength, packet delay, etc. from surrounding equipment and correlate this information with the site-specific data it has been given to calculate its own location.

One embodiment of the current invention includes a network or client device calculated position information that could be shared with others.

One embodiment of the current invention can distribute the computational load of determining position location to each network or client device, allowing position location capabilities to scale without burdening network bandwidth or sapping centralized computing resources One embodiment of the current invention allows client devices to independently determine their own location without any additional network bandwidth being consumed.

One embodiment of the current invention allows applications running on client devices to utilize the site-specific information for other purposes.

One embodiment of the current invention includes a client that can identify its own position within the environment, and therefore knows a priori the service regions within which it is roaming. The client then knows what networks or network devices it should be able to see and what services those networks or network devices offer. Therefore, the continual scanning and updating tables of available networks is not required. Instead, the client can utilize site-specific data and knowledge of position to calculate minimum transmit power required to communicate with desirable networks or network devices and maintain a certain quality of service. This negates the need for clients to utilize maximum power levels during association, and allows clients to more intelligently regulate their transmit power levels. Furthermore, clients can utilize site-specific data and knowledge of position to more intelligently initiate handoffs. Clients can also detect if they are actually within a significant broad coverage region of a given network or network device or simply within a sliver coverage zone, in order to preferentially associate with networks and devices able to provide a consistent connection over the widest possible area One embodiment of the current invention includes a client device that can identify its own position within the environment as well as the position and observable details of other detectable wireless devices within the environment. The client device may display that information to a user or convey that information either proactively, on request, or at regular intervals via a communication link to some other device, in accord with established security and authorization protocols governing access to such information

BRIEF DESCRIPTION OF THE DRAWINGS

The foregoing and other objects, aspects and advantages will be better understood from the following detailed description of a preferred embodiment of the invention with reference to the drawings, in which:

FIG. 11 further depicts the preferred method for the identification of possible positions used in the present invention;

DETAILED DESCRIPTION OF THE PREFERRED EMBODIMENTS OF THE INVENTION

Using the present method, it is now possible to quickly and accurately determine the positions of detectable wireless devices within a known environment, and to further use position knowledge to provide enhanced capabilities for wireless and combined wired/wireless networks. The present invention is a significant advance over the prior art through its use of a novel method of using one or more performance look up tables to map RF channel characteristics into actual positions within an environmental model, and through its exploitation of this novel position estimation method to provide enhanced quality of service, power management, security, and interference detection and mitigation, and autonomous or adaptive network configuration in wireless networks.

Figure 1:
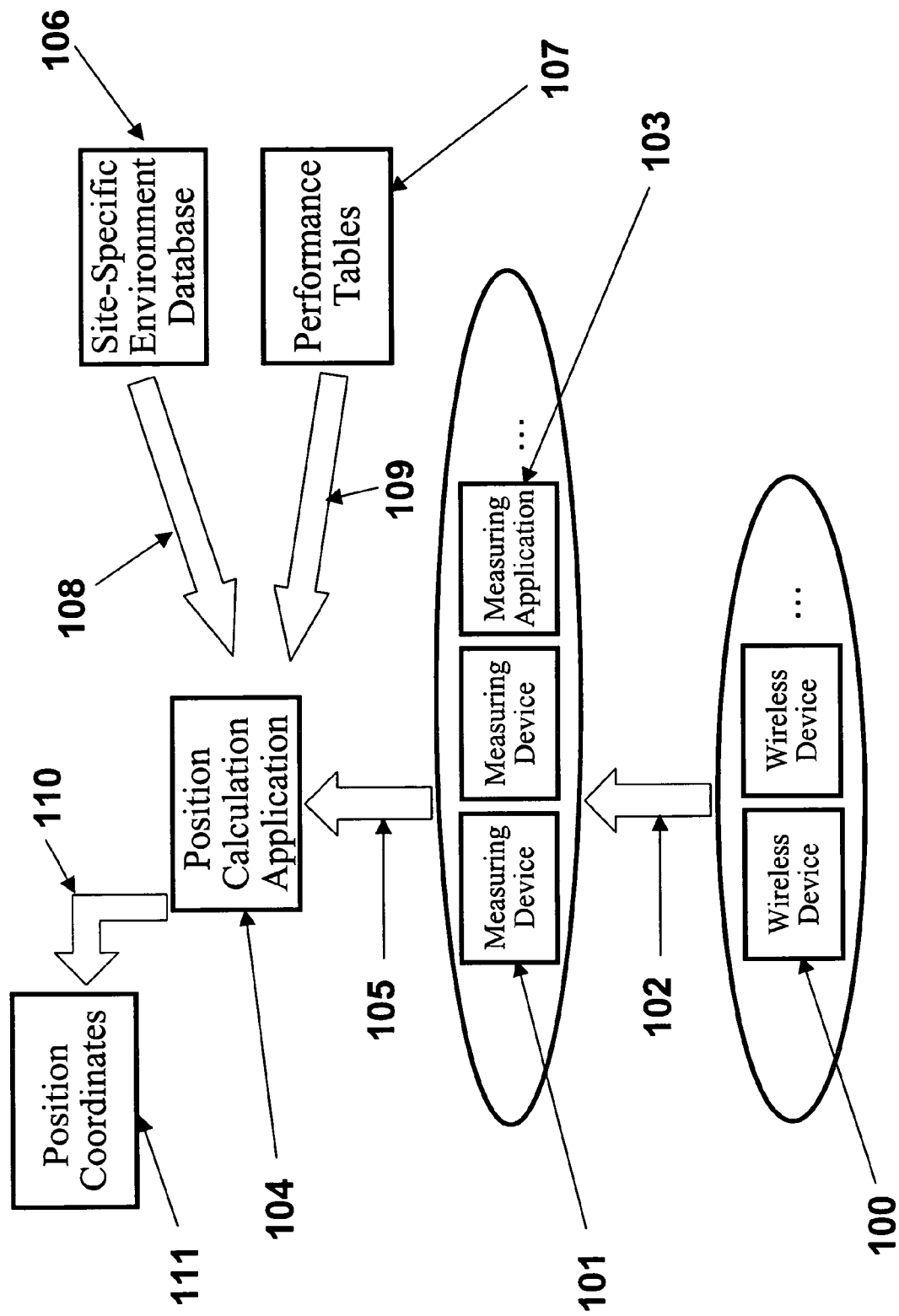
FIG. 1 depicts a typical network configuration.

Referring now to FIG. 1, there is depicted the logical representation of a wireless communication network as it relates to the present invention. In FIG. 1, one or more wireless devices 100 exist within a wireless network. In this context, a wireless device could be any active or passive transceiver capable of transmitting, radiating, repeating, reflecting, refracting, diffracting, or otherwise manipulating or affecting a wireless signal in such a way as to be detectable by another wireless device or to affect the wireless communications of another wireless device. For example, in the context of a WLAN, a wireless device 100 may be a wireless network client, an access point, a rogue access point, or some other potentially interfering transceiver. In other wireless networks or technologies, examples of a wireless device 100 may include but are not limited to RFID tags, Zigbee transceivers, cellular telephones, cordless phones, ultra-wideband transceivers or repeaters, mesh networking transceiver, beacon transmitters, wireless cameras or security cameras, wireless meter reading or thermostat control devices, or any other such devices known now or in the future. One skilled in the art can see how the concept of a wireless device may extend to other wireless technologies in the scope of this description.

Also within the wireless network are measuring devices 101. Measuring devices are wireless devices capable of detecting ("measuring") the RF channel characteristics of other wireless devices 100, and conveying the measured RF channel characteristics to one or more other devices or applications. For example, in the context of a wireless network, a measuring device 101 may be an access point, a sensor or probe, a wireless network client, or some other receiving or listening device capable of detecting and interpreting wireless transmissions. In other wireless technologies, examples of a measuring device 101 may include but are not limited to RFID tag readers, mesh networking transceivers, wireless security cameras, Zigbee transceivers, cellular base stations, cordless phone base stations, or any other such devices known now or in the future. One skilled in the art can see how the concept of a wireless device may extend to other wireless technologies in the scope of this description.

The measuring devices 101 detect and measure the RF channel characteristics (also referred to as performance) of the wireless devices 100 by receiving the radio signals 102 either transmitted from, reflected by, or manipulated by the wireless devices 100. The measurable RF channel characteristics may include, but are not limited to, received signal strength intensity (RSSI), throughput, BER, PER, FER, system noise (SNR), system interference (SIR), delay spread levels, power delay profile, packet jitter, quality of service (QoS), packet error rate, and packet latency. In addition, it may be possible for the measuring devices 101 to determine the current configuration of the wireless devices 100 being measured, such as the current transmit power, channel, orientation, antenna configuration, current access point or carrier association, and other device configuration information. This determination of the current configuration of the wireless devices 100 being measured may be achieved through assumption given knowledge of the wireless device 100, may be conveyed to the measuring device 101 from the wireless device 101 in some form of notification message, or may be derived through analysis of the radio signals 102 received from the wireless device 100. One skilled in the art will see that other RF channel characteristics known now or in the future may also be measurable within the context of the present invention.

Depending on the type of measuring device in question, each measuring device 101 may store measured RF channel characteristics for each wireless device 100 for a certain period of time, may only retain the last measurement, may only report the most current measurement, may retain a certain number of measurements for each wireless device or for a certain number of wireless devices, or may not keep any stored measurements at all.

There may also exist a measuring application 103 whose purpose is to aggregate the RF channel characteristics being measured by the measuring devices 101. In this situation, the measuring application 103 has an established communication connection with each measuring device 101 in question through which the measuring device 101 sends the measured RF channel characteristic data for each wireless device 100. The communication connection between the measuring application 103 and the measuring device 101 may take the form of a wireless or wired communication path and use any form of communication protocol known now or in the future. For example, in the context of a WLAN, the measuring application 103 may communicate with measurement devices 101 using the Simple Network Management Protocol (SNMP), Extendable Markup Language (XML), or any other similar networking protocols. The measuring application 103 receives the RF channel characteristic data and typically stores the information or forwards it to another application. Depending on the type of measuring application, the measuring application 103 may store one or more measured RF channel characteristics for each wireless measuring device 101 and each wireless device 100 for a certain period of time or may only store and report the most current measurement, or may not keep any stored measurements at all.

In addition, there may exist an actual or implied interconnection hierarchy among the measuring devices 101 and/or measuring applications 103 that defines how measured RF channel characteristics are communicated or shared. That is, the measuring devices 101 and/or measuring applications 103 may have established communication pathways between or among themselves such that measured RF channel characteristics per wireless device 100 is communicated between themselves. Alternately, a measuring device 101 or measuring application 103 may forward measured RF channel characteristics it has received from a separate measuring device or measuring application to another measuring device or measuring application 103. In other words, the measuring devices 101 and measuring applications 103 themselves may have the ability to communicate with one another to facilitate the exchange of RF channel characteristics per wireless device 100 as needed. While this data sharing is typically done in a hierarchical fashion where certain measurement devices 101 or measuring applications 103 act as aggregators of measurements 102 from other devices 101 and applications 103; those measurement devices 101 or measuring applications 103 that serve as aggregators then likewise may pass received measurement information to other devices or applications further up in the hierarchy.

As another example, it may be necessary for one measuring device 101 to communicate measured RF channel characteristics to a second measuring device (or to a measuring application 103) where no direct communication path exists between the two. In this situation, the measuring device 101 may forward the measured RF channel characteristics to a third measuring device (or separate measuring application 103) who in turn communicates the measured RF channel characteristics to the desired destination. Through this process, any interconnection of communication paths between one or more measuring devices 101 and/or measuring applications 103 may exist in any given network to allow for the communication of measured RF channel characteristics from any given measuring device 101 and any other measuring device 101 or measuring application 103.

Measuring applications 103 may be instantiated on a wide variety of computing or networking platforms. While in the preferred embodiment of the present invention the measuring application 103 is instantiated on a network switch or network server, the actual form of computing or networking platform may vary depending on the wireless technology being measured. For example, in the context of a WLAN, measuring applications 103 may be instantiated on platforms that include but are not limited to access points, network switches, network routers, network hubs, network gateways, network servers, personal computers (PCs), personal digital assistants (PDAs), network client computers, handheld terminals, or other similar devices. For other wireless networking technologies, likely platforms for hosting a measuring application 103 include but are not limited to RFID tag readers, network servers, PCs, PDAs, base stations, network switches, network routers, network hubs, network gateways, cellular phones, or other computing platforms known now or in the future. One skilled in the art can see how the measuring application 103 could be instantiated on various computing and networking platforms within the context of the present invention.

Note that as mentioned previously, a measuring device 101 may be a mobile, portable, or other wireless device 100. Likewise, a measuring application 103 may itself be instantiated on a measuring device 101, or a portable, mobile, or other wireless device 100. For example, a measuring application 103 may be instantiated as a software application residing on or embedded within a wireless client device 100, where the presence of the measuring application 103 allows the wireless client device 100 to act as a measuring device 101 either as needed, at regular intervals, or under other certain conditions, such as a user or other controlling entity initiating the measuring application and providing instruction.

In the preferred embodiment of the invention, there exists a position calculation application 104 instantiated as a software application on a computing device that is capable of communicating with one or more measuring devices 101 and/or measuring applications 103. The position calculation application 104 either queries for, polls for, or receives via alerts or other mechanism, RF channel characteristics per wireless device 100, per measuring device 101. The RF channel characteristics are typically conveyed to the position location application 104 via some communication pathway 105, which may be any form of wired or wireless connection capable of carrying some type of communication protocol. Examples of communication protocols used by the preferred embodiment of the invention include but are not limited to TCP/IP, SNMP, XML, or SOAP. One skilled in the art can see how different communication protocols could be used within the context of the present invention.

The hardware device upon which the position calculation application is instantiated may be a separate computer (such as a personal computer or PC), a network switch, base station, router, hub, gateway, access point, repeater, fixed or mobile client device, or any other such computing or networking device.

There also exists a site-specific environment database 106 and associated performance lookup tables 107. The site-specific environment database 106 provides the environmental model of the physical region within which the measuring devices 101 and wireless devices 100 exist, while the performance lookup tables 107 provide a correlation between predicted RF channel characteristics for wireless devices 100 and one or more physical positions within the site-specific environment database 106. The position calculation application 104 compares the measured RF channel characteristics for wireless devices 100 received through the communication interface 105 with the measuring network devices 101 and/or the measuring network applications 103 with the predicted performance lookup tables 107. Through this comparison, a set of possible locations at which the wireless devices 100 must be located within the context of the site-specific environment database 106 is derived as detailed below.

The set of possible locations is typically identified by the position calculation application 104 is typically in the form of position coordinates 111. Position coordinates 111 identify unique positions relative to some computerized model of the environment within which the wireless devices 100 exist. Position coordinates 111 may take the form of {x,y,z}, {x,y, Floor}, {x,y,elevation}, {x,y}, {latitude,longitude,elevation}, {latitude, longitude}, or any other similar coordinate indicator sufficient for identifying a unique location within a 2D or 3D space. While the examples provided are in the form of Cartesian coordinates, other coordinate systems such as spherical and cylindrical coordinate system could be used as well to identify positions. In the preferred embodiment of the invention, the position coordinates 111 are relative to the coordinate system and geometry provided by the site-specific environment database 106.

Position coordinates 111 may be conveyed to other devices or applications through some from of wireless or wired data connection 110. This allows the position calculation application 104 to act as a separate distinct application whose primary purpose is to simply communicate position coordinates 111 via some communication link 110 to other applications who in turn utilize the position coordinates 111 in some fashion.

In a preferred embodiment of the invention, the position calculation application 104, site-specific database 106, and performance lookup tables 107 may co-exist on the same computing device. However, it is quite possible that all three could exist on separate computing devices, or that any two could be instantiated on a device separate from the third. In this case, some form of communication pathways 108, 109 are instantiated between the position calculation application 104 and the site-specific environment database 106 and performance lookup tables 107. These communication pathways 108, 109 are typically standard wired or wireless network communication methods and protocols. Note that the position location application 104, site-specific environment database 106, and performance lookup tables 107 could all be instantiated on wireless devices 100, measuring devices 101, or alongside or integrated with measuring applications 103.

The position calculation application 104 may store historical records of RF channel characteristics. If so, this database may co-exist on the same computing platform as the position calculation application 104 or may be instantiated elsewhere on the network.

Systems in accordance with the present invention may use 2-D or 3-D computer aided design (CAD) renditions of a part of a building, a building, or a collection of buildings and/or surrounding terrain and foliage. However, any information regarding the environment is sufficient, including 2-D or 3-D drawings, raster or vector images, scanned images, or digital pictures. The site-specific information is utilized by the present invention to enable visualization and relatively precise positioning of the communications infrastructure in modeling radio wave performance in the environment, and to provide a model of the environment sufficient for performing visualizations that show the user measurements and/or predictions of network performance or position location information.

In accordance with one aspect of an embodiment of the invention, there is provided digital site-specific information regarding terrain elevation and land-use, building positions, tower positions, as well as geometries, height, and the internal layout of the walls, doors, ceilings, floors, furniture, and other objects within buildings, where the digital information may be in separate data formats or presentations, including two- or three-dimensional raster or vector imagery, and are combined into a single, two- or three-dimensional digital model of the physical environment. Alternately, a series of 2-D images may be collected to represent the 2-D or 3-D environment. The resulting two- or three-dimensional digital model combines aspects of the physical environment contained within the separate pieces of information utilized, and is well suited for any form of display, analysis, or archival record of a wireless communication system, computer network system, or may also be used for civil utilities planning and maintenance purposes to identify the location of components, as well as their costs and specifications and attributes.

While many examples and figures herein depict an indoor environment, these are provided simply for example and are not in any indicative of a limitation in the present invention. The present invention is capable of operating within or upon any modeled physical environment, whether indoors or outdoors, involving any finite number of buildings, terrain, foliage, vehicles, people, animals, equipment, furniture, meteorological conditions, or other manmade or natural obstructions.

Figure 2:
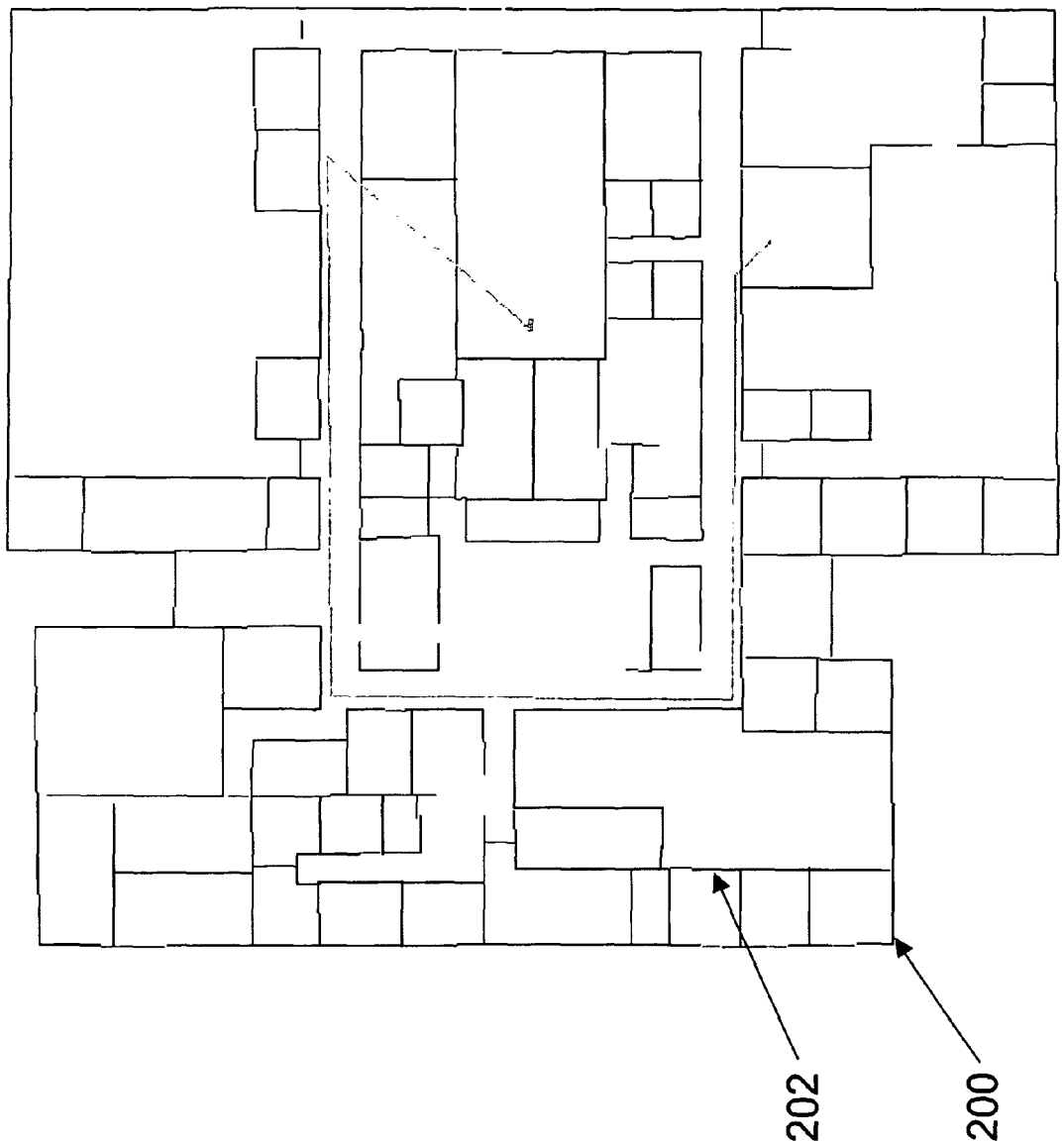
FIG. 2 depicts a sample environmental model.

Referring now to FIG. 2, there is depicted an example environmental model. The site-specific environmental model depicted in FIG. 2 is of the floor plan 200 of a building. The depicted environmental model 200 contains graphical representations of walls 202, doors, windows, and other commonly found things within a building.

Figure 3:
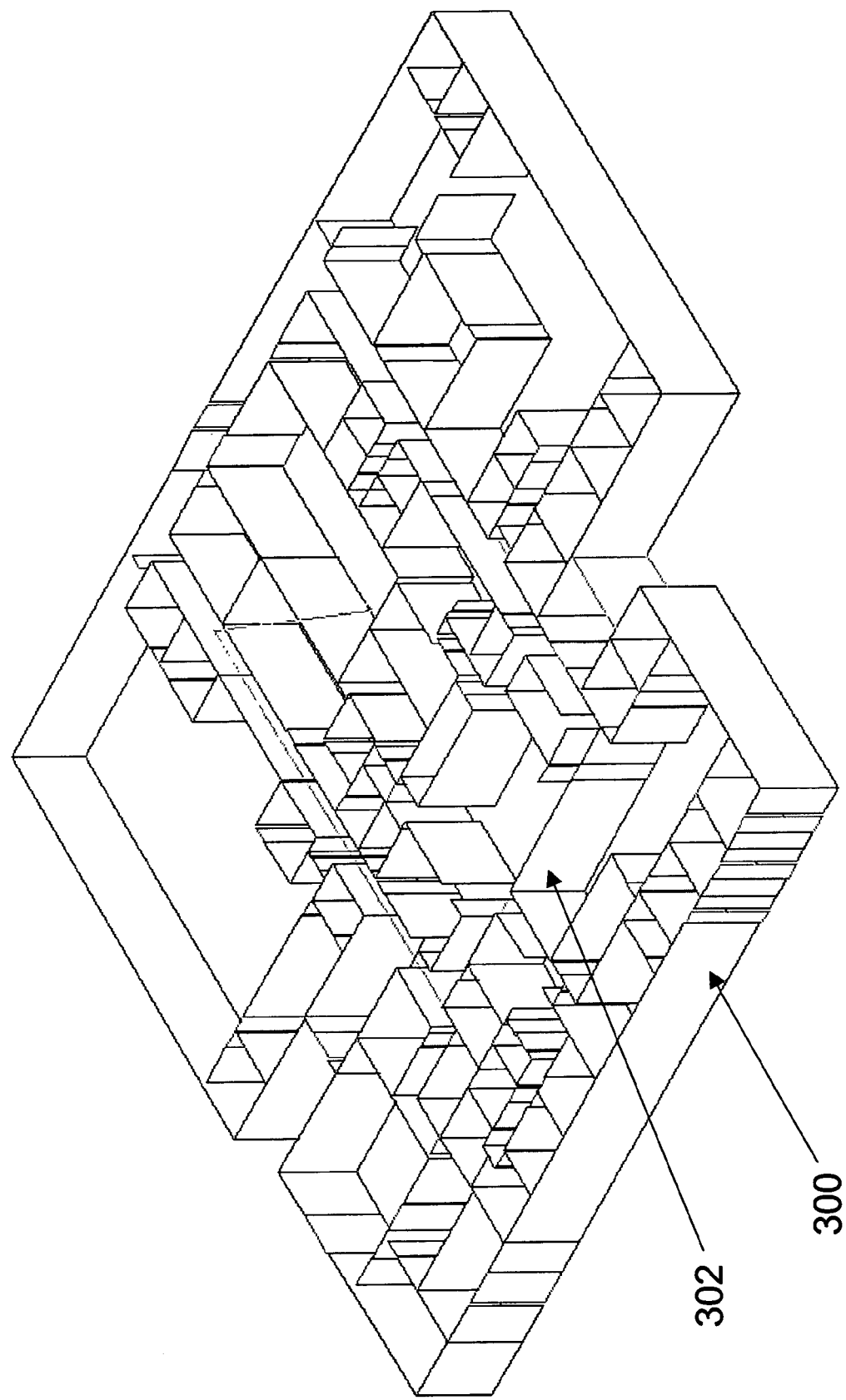
FIG. 3 depicts a three-dimensional environmental model.

Referring now to FIG. 3, there is depicted another example environmental model. The site-specific environmental model depicted in FIG. 3 is of the floor plan 300 of a building. The depicted environmental model 300 contains graphical representations of walls 302, doors, windows, and other commonly found things within a building. In this example, the site-specific environmental model is three-dimensional in nature.

Many forms of obstruction or clutter that could impact or alter the performance or physical layout of a communications network can be represented within systems made in accordance with the present invention. The electrical, mechanical, aesthetic characteristics of all obstructions and objects within the modeled environment may also be input and utilized by systems made in accordance with the invention. Such data is beneficial for improving the accuracy of performance predictions in wireless networks. For example, for wireless communication system design, the relevant information for each obstruction includes but is not limited to: material composition, size, position, surface roughness, attenuation, reflectivity, absorption, and scattering coefficient. For example, outside walls may be given a 10 dB attenuation loss, signals passing through interior walls may be assigned 3 dB attenuation loss, and windows may show a 2 dB RF penetration loss, depending on their physical characteristics.

An embodiment in accordance with one aspect of the present invention also enables a user to specify other physical, electrical, electromagnetic, mechanical, and aesthetic characteristics of any surface or object within the two- or three-dimensional model. These characteristics include but are not limited to: attenuation, surface roughness, width, material, reflection coefficient, absorption, color, motion, scattering coefficients, weight, amortization data, thickness, partition type, owner and cost. In addition, information that is readily readable or writeable in many widely accepted formats, can also be stored within the database structure, such as general location data, street address, suite or apartment number, owner, lessee or lessor, tenant or ownership information, model numbers, service records, maintenance records, cost or depreciation records, accounting records such as purchasing, maintenance, or life cycle maintenance costs, as well as general comments or notes which may also be associated with any individual surface or building or object or piece of infrastructure equipment within the resulting two- or three-dimensional model of the actual physical environment.

Note that all of these types of data specified in the preceding paragraphs typically reside in a computer CAD application which has the ability to iteratively or autonomously compute alternative communication network configurations of all network equipment, based on preset or user-specified design or operating points. However, these data records may also be digitized and passed between and/or stored at individual pieces of hardware equipment in the network for storage or processing at each particular piece of equipment.

Estimated partition electrical properties loss values can be extracted from extensive propagation measurements already published, which are deduced from field experience, or the partition losses of a particular object can be measured directly and optimized instantly in accordance with one embodiment of the present invention combined with those methods described in the U.S. Pat. No. 6,442,507 which is herein incorporated by reference.

Although FIG. 2 and FIG. 3 depict a floor plan of a building, the site-specific environmental model 106 is not limited to indoor environments. Any indoor, outdoor, or campus environment can be represented within the present embodiment of the invention, including, but not limited to: one or more floors of a building, one or more multi-story buildings, one or more campuses of buildings, terrain, foliage, and other obstructions. FIG. 2 and FIG. 3 simply depict a single floor of a building for simplicity. The preferred methods for constructing the site-specific environmental model are given in U.S. Pat. No. 6,721,769 entitled "Method and System for a Building Database Manipulator" by Rappaport et al, and in pending U.S. patent application Ser. No. 09/954,273 entitled "Method and System for Modeling and Managing Terrain, Buildings, and Infrastructure" by Rappaport et al.

Figure 4:
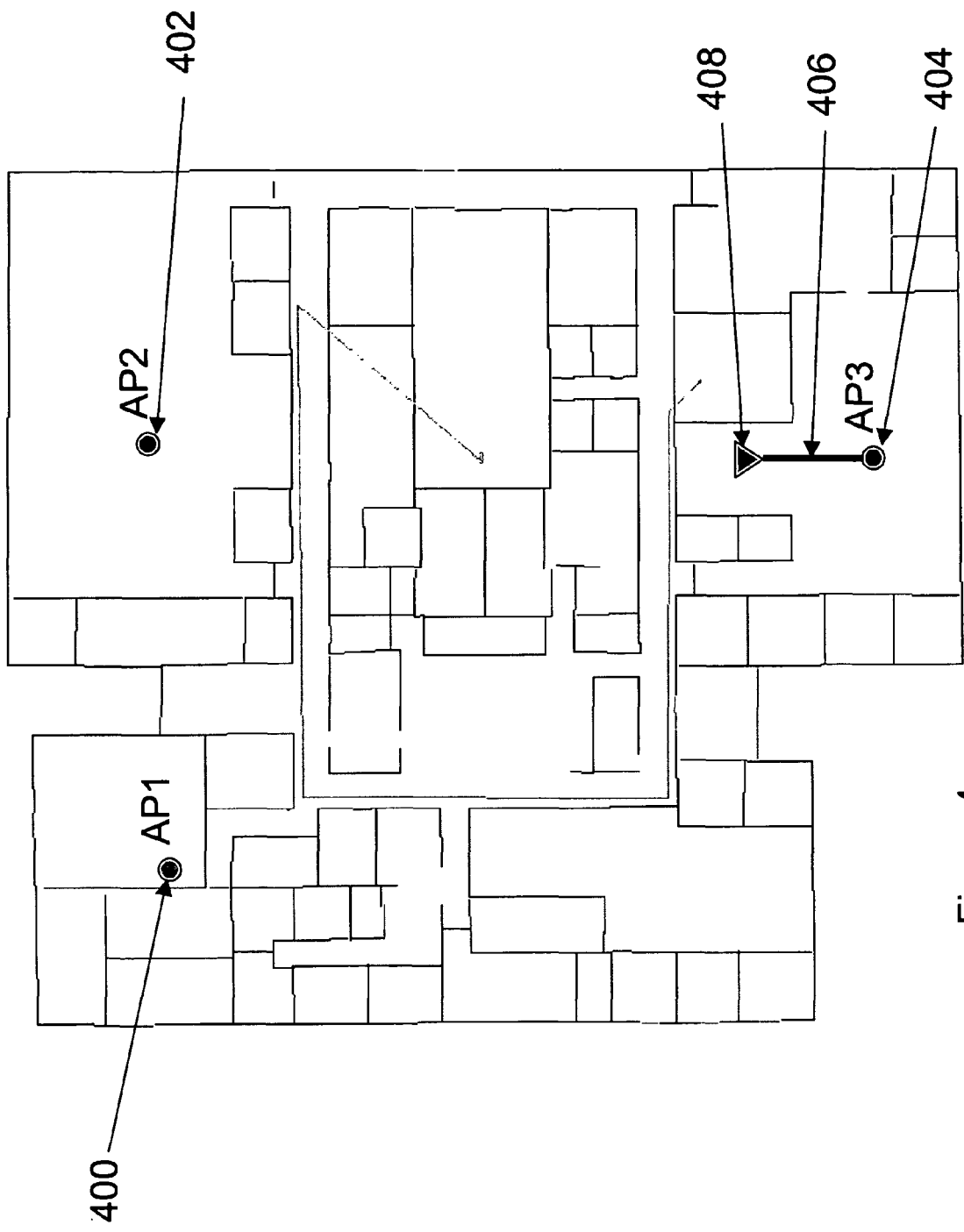
FIG. 4 depicts an environmental model within which representations of network equipment can been placed.

Referring FIG. 4, once the appropriate site-specific model of the environment has been specified, any desired number of hardware components, communications infrastructure, mobile or portable or fixed wireless devices, or equipment can be positioned, configured, and interconnected in the site-specific environmental model. The communications network is site-specifically modeled within an embodiment of the invention by manual or automatic means, whereby the actual physical components used to create the actual physical network are modeled, placed and interconnected graphically, visually, and spatially within the site-specific database model in order to represent their proposed or actual true physical placements within the actual physical environment. This provides a site-specific model of a network of interconnected components within the database model, where such interconnection may be wired or wirelessly connected, using optical, baseband, or RF carrier frequencies.

Associated with at least some of the communication network components (sometimes referred to as infrastructure equipment or hardware) within the database model are infrastructure information, which may be in the form of data records, memory data, files, or text entries which contain the infrastructure information that is uniquely associated with every individual component in space within the modeled environment. That is, three different pieces of the same type of equipment within a network that is modeled within a city using an embodiment of this invention would have three distinct sets of infrastructure information records. The infrastructure information records are stored as either a linked list of textual or numeric information to the graphically represented components, or as data structures that are in some manner tagged or linked to the specific components within the database format.

The infrastructure information for each actual physical component may be represented in a site-specific manner within the environmental model of the physical environment, and such infrastructure information is preferably embedded within the environmental model as described above. The embedding of infrastructure information for actual components may be done either prior to, during, or after the site-specific placement of the modeled components within the database model.

The infrastructure information includes but is not limited to graphical objects representing the actual physical locations of infrastructure equipment used in the actual communication system, as well as data describing the physical equipment brand or type, a description of physical equipment location (such as street address, suite or apartment number, owner or tenant, latitude-longitude-elevation information, floor number, basement or subterranean designation, etc.), equipment settings or configurations, desired or specified performance metrics or performance targets for the equipment whereby such desired or specified data are provided by the user or the prediction system, desired or specified performance metrics or performance targets for the network which the equipment is a part of, whereby such desired or specified data are provided by the user or the prediction system, measured performance metrics or network metrics as reported by the equipment, predicted alarm event statistics or outage rates, actual measured alarm event statistics or outage rates, alarm threshold settings or alarm metrics as reported by the equipment or the user or the prediction system, equipment orientation, equipment specifications and parameters, equipment manufacturer, equipment serial number, equipment cost, equipment installation cost, ongoing actual equipment upkeep costs and records, predicted ongoing equipment upkeep costs, equipment use logs, equipment maintenance history, equipment depreciation and tax records, predicted or measured performance metrics, equipment warranty or licensing information, equipment bar codes and associated data, information regarding methods for communicating with the physical equipment for the purposes of remote monitoring and/or alarming, alarm records, malfunction records, periodic or continuous performance or equipment status data, previous or current physical equipment users or owners, contact information for questions or problems with the equipment, information about the vendors, installers, owners, users, lessors, lessees, and maintainers of the equipment, and electronic equipment identifiers such as radio frequency identifiers (RF Ids or RF Tags), internet protocol (IP) addresses, bar codes, or other graphical, wired, or wireless address or digital signature.

The "equipment" or "component" above refers to any actual physical object or device, which may be mechanical or electrical or arterial in nature, or any architectural or structural element of a distributed network, including but not limited to wiring, piping, ducting, arteries, or other distributed components or infrastructure.

While one embodiment of the present invention considers the site-specific database model, adaptive control capabilities, and asset management of a wired or wireless communication network as a preferred embodiment, it should be clear to one of ordinary skill in the art that any infrastructure equipment of a distributed nature, such as structured cabling, piping, or air conditioning could be controlled in such an adaptive manner. Some preferred methods for embedding the infrastructure information within a site-specific environmental model and providing adaptive control is detailed in U.S. Pat. No. 6,493,679, entitled "Method and System for Managing a Real Time Bill of Materials," awarded to T. S. Rappaport et al, pending application Ser. No. 09/764,834, entitled "Method and System for Modeling and Managing Terrain, Buildings, and Infrastructure" filed by T. S. Rappaport and R. R. Skidmore, and pending application Ser. No. 10/386,943, entitled "System and Method for Automated Configuration of Transceivers for Obtaining Desired Network Performance Objectives" filed by T. S. Rappaport and R. R. Skidmore, which are hereby incorporated by reference.

The resulting combined environmental and infrastructure model, wherein the modeled infrastructure and the associated infrastructure information for each component having been embedded in the environmental model in a site-specific manner, and also embedded in each piece of actual equipment, may then be stored onto any variety of computer media. The combined model is understood to include detailed cost data and maintenance data, as well as specific performance attributes and specific operating parameters of each piece of network hardware, some or all of which may be required for useable predictions and simulations and iterative control of the network. At any point in time, the combined environmental and infrastructure model may be retrieved from the computer media, displayed or processed in a site-specific manner with actual locations of components and component interconnections shown within the environment on a computer monitor, printer, or other computer output device, and/or edited using a computer mouse, keyboard or other computer input device known now or in the future. Furthermore, the combined model may also be embedded in software, or implemented in one or more integrated circuits, for real time or near real-time implementation in a hardware device, portable computer, wireless access point, or other remotely located device.

The editing above may involve changing any of the infrastructure or environmental information contained in the model, including any equipment or operating parameters of particular pieces of hardware that may be altered by the control of the computer CAD application of one embodiment of this invention. Such changes may happen whether the combined model is implemented in chip, embedded software, or standalone form.

Furthermore, the combined environmental and infrastructure models stored on computer media may contain models of infrastructure equipment that are capable of communicating and exchanging data with the CAD computing platform in real-time. For example, one embodiment of the invention may store desired network operating performance parameters that are communicated to certain pieces of actual equipment, and if the equipment ever measures the network performance and finds the performance parameters out of range, an alarm is triggered and reported to the system for display, storage, processing, and possible remote retuning of pieces of equipment by the invention to readjust the network to move performance back into the desired range. The preferred method of this communication is described in pending U.S. patent application Ser. No. 10/714,929 entitled "System and Method for Automated Placement or Configuration of Equipment for Obtaining Desired Network Performance Objectives and for Security, RF Tags, and Bandwidth Provisioning," by Rappaport et al, which is hereby incorporated by reference. Accessing and utilizing this communication link between the site-specific model of the communication network and the physical equipment can be performed by a variety of means, one of which is detailed in pending application Ser. No. 09/954,273, which is herein incorporated by reference.

The placement of infrastructure equipment may include cables, routers, antennas, switches, access points, and the like, which would be required for a distributed network of components in a physical system. Important information associated with some or all pieces of infrastructure equipment that are modeled by and maintained within an embodiment of the invention using the described database format includes physical location (placement of the equipment within the database so as to site-specifically represent its actual physical placement) as well as data such as equipment vendors, part numbers, installation and maintenance information and history, system or equipment performance and alarm data and history, as well as cost and depreciation information of the specific components and subsystems.

FIG. 4 depicts an example site-specific environmental model 106 with overlaid network equipment. In FIG. 4, three measuring devices 101 have been identified within the site-specific environmental model. These three measuring devices 400, 402, 404 are identified graphically within the site-specific environmental model, and have their relevant configuration information also associated with them either within the site-specific environmental model or through a separate database file. In the case of measuring device 404, the device in question has a separate antenna 408 connected via a cable 406. The three modeled measuring devices 400, 402, 404 have counterparts in the actual environment that are capable of measuring RF channel characteristics from detectable wireless devices 100 and reporting the measured RF channel characteristics to the position calculation application 104 as described above.

Figure 5:
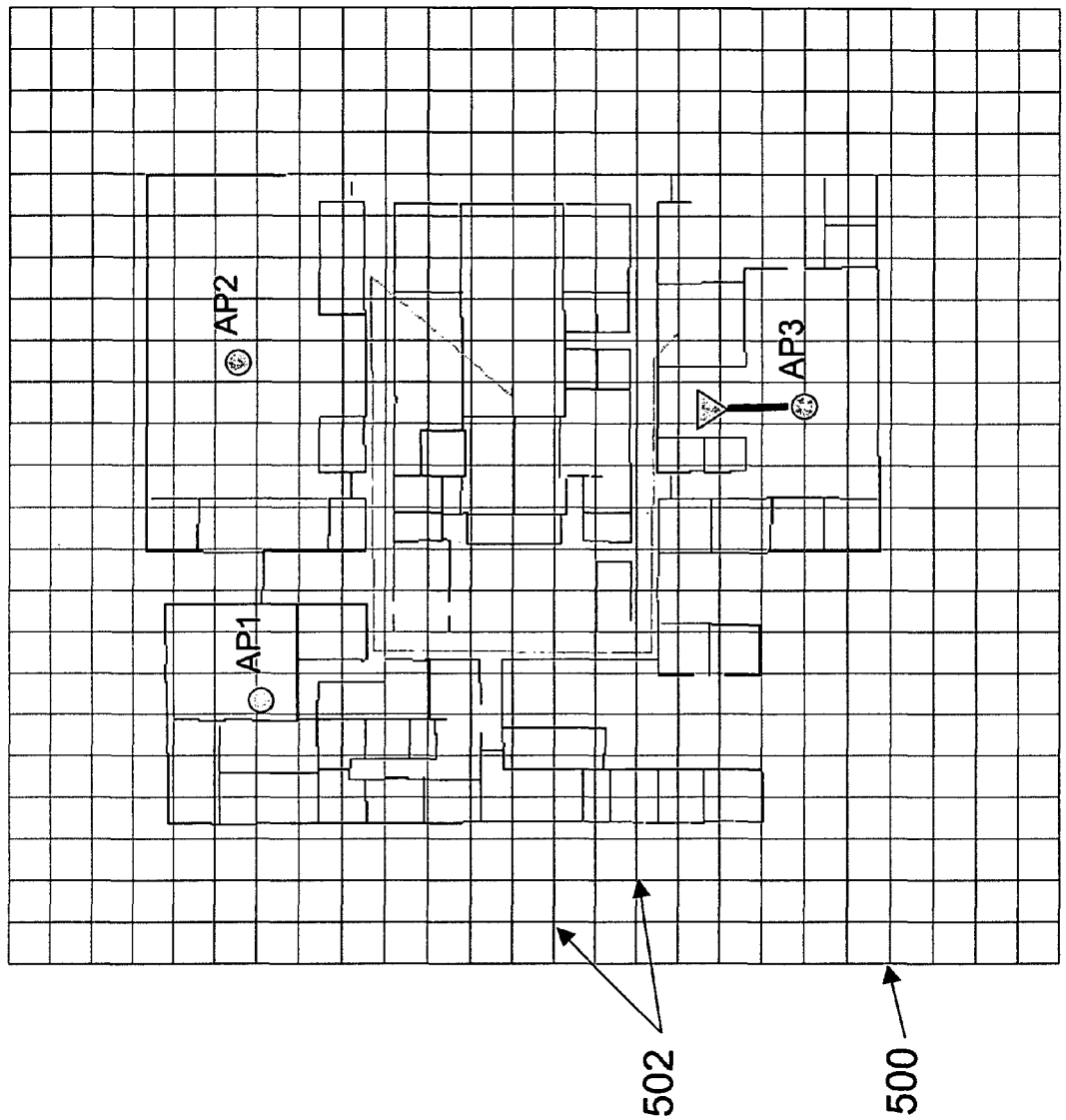
FIG. 5 depicts an environmental model containing network equipment that has been overlaid with a mesh of vertices.

FIG. 5 depicts the same site-specific environmental model from FIG. 4 overlaid with a mesh 500, where a mesh is defined as a collection of vertices that relate to the site-specific representation of the environment, and may be arranged in a wide array of configurations, such as a regular, irregular, sparse, or dense collection of vertices. The vertices in a mesh may or may not overlap. The mesh 500 as shown in FIG. 5 is shown as a grid of regularly spaced vertices, which is used in the preferred embodiment of the invention. Each vertex 502 represents a particular position or region within the site-specific environmental model. Each vertex may be represented by some form of {x,y} or {x,y,z} coordinate with known units, and may represent a particular point or may be the center, edge, or some location within a region representing an area or volume. For example, a vertex may actually represent a 1 m×1 m area on a 2D floorplan, or a 1 m×1 m×1 m volume in a 3D model. It is clear that the proper size of the region represented by a vertex could be user specified and would be different within a floor plan of a building or a city model. Although Cartesian coordinates are indicated and used in the preferred embodiment of the invention, one skilled in the art could see that any combination of coordinate system representation and units could be utilized. In the preferred embodiment of the invention, a user may select the bounds of the mesh as well as the spacing between the vertices. One skilled in the art could see that a mesh consisting of irregularly spaced vertices or a sparsely filled mesh of vertices could be used also.

While the mesh 500 shown in FIG. 5 is rectangular in shape, one skilled in the art could easily see how a mesh in the form of any closed polygon of any geometry or number of vertices could be utilized just as easily in the context of the present invention.

Note that the site-specific environment database 106 may also correlate a given {x,y} or {x,y,z} position coordinate with additional information regarding the position itself. For example, each position may be correlated with a database that provides a textual description of the area in which the position is located. This enables an embodiment of the present invention to present additional information to the user in the form of textual descriptions of the area in which the wireless device is determined to be. For example, the position calculation application 104 could determine a wireless client to be at position {23, 45}. The site-specific environment database 106 may have access to a database that correlates the position {23, 45} with the textual description of "Lobby". This then enables an embodiment of the present invention to not only graphically convey the coordinate position of the wireless device, but to also convey further information regarding the position to a user.

Although the given example uses textual descriptors of a position coordinate, one skilled in the art can see how other data of any sort, whether textual or graphical in nature, can be correlated with a given position coordinate in the context of the present invention. For example, a given vertex in the mesh may have a digital photograph taken of the corresponding area in the actual physical environment, a recorded audio file describing the location or recorded at the location, security privileges or procedure associated with the location, or any other such information. The preferred method of correlating a given coordinate position with additional textual or graphical information is given in pending application Ser. No. 10/015, 954 entitled "Textual and Graphical Demarcation of Location and Interpretation of Measurements" filed by T. S. Rappaport et al. which is herein incorporated by reference.

Figure 6:
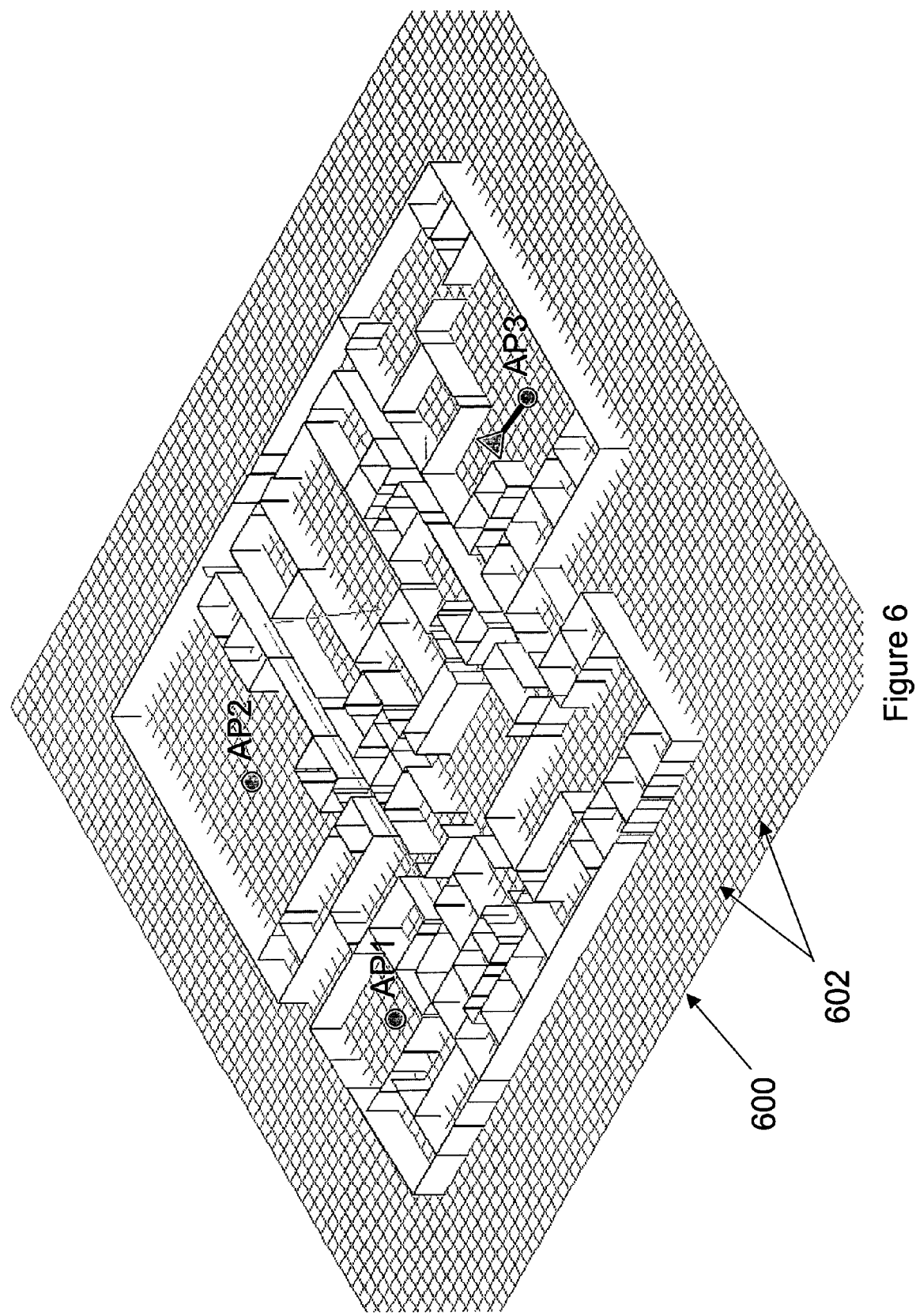
FIG. 6 depicts a three-dimensional environmental model containing network equipment that has been overlaid with a mesh of vertices at a certain elevation.

FIG. 6 depicts a three dimensional perspective of the same site-specific environmental model shown in FIG. 5. One can see that the mesh 600 exists at a particular elevation. Each vertex 602 represents a particular position within the site-specific environmental model. Each position may be represented by some form of {x,y} or {x,y,z} coordinate with known units. Although Cartesian coordinates are indicated and used in the preferred embodiment of the invention, one skilled in the art could see that any combination of coordinate system representation and units could be utilized. In the preferred embodiment of the invention, a user may select the bounds of the mesh as well as the spacing between the vertices. One skilled in the art could see that a mesh consisting of irregularly spaced vertices or a sparsely filled mesh of vertices could be used also. Note that set of one or more coordinate positions can be positioned on a mesh as in accordance with one aspect of the present invention.

Figure 7:
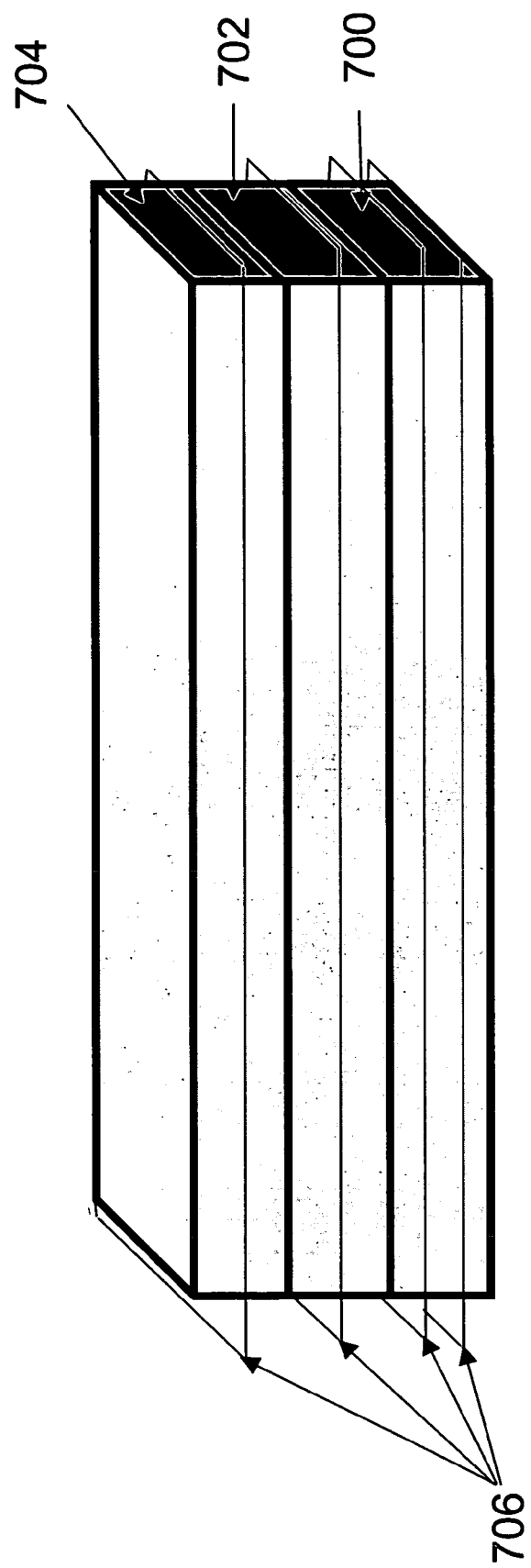
FIG. 7 depicts a three-dimensional environmental model that has been overlaid with multiple meshes of vertices at various elevations.

Meshes can be created at any elevation, orientation, or vertical or horizontal offset from a surface (e.g., floor, ceiling, ground, or any other defined surface) that is desired. For example, FIG. 7 depicts a three dimensional perspective of a site-specific environmental model of a multi-story building 700. In FIG. 7, the first 700, second 702, and third 704 floors of the building are shown from an angled perspective. Multiple meshes 706 have been created at various elevations. Although a building environment is shown for simplicity in FIG. 7, the site-specific environmental database may take the form of any indoor or outdoor environment.

One embodiment of the present invention uses radio wave propagation prediction techniques to determine RF channel characteristics at each available vertex within each mesh. These results are stored in performance lookup tables for each vertex within each mesh, where each table contains a correlation between the position of the vertex in question within the environmental model and one or more predicted RF channel characteristics. There are many well-known techniques for predicting radio wave propagation within a site-specific environment model, and one skilled in the art can recognize that any such technique can be applied at this stage in the method of the invention in order to derive one or more RF channel characteristics. Preferred methods for predicting RF channel characteristics are outlined in U.S. Pat. No. 6,317, 599 entitled "Method and System for Automated Optimization of Antenna Positioning in 3-D" by Rappaport et al, and in pending U.S. patent application Ser. No. 10/830,445 entitled "System and Method for Ray Tracing Using Reception Surfaces" by Skidmore, et al, both of which are hereby incorporated by reference.

Alternately, in addition to or in place of predicting RF channel characteristics, measured RF channel characteristics can be collected 104. There are many well-known techniques for measuring RF channel characteristics in the industry. One method for measuring RF channel characteristics used in some embodiments of the present invention is outlined in U.S. Pat. No. 6,442,507 entitled "System for Creating a Computer Model and Measurement Database of a Wireless Communication Network" by Skidmore et al. The invention may also utilize measurements made and collected from a variety of receivers, such as disclosed in patent application Ser. No. 09/632,803, entitled "System and Method for Efficiently Visualizing and Comparing Communication Network System Performance," filed by Rappaport, et. al., or may alternatively use measurement and/or control techniques as described in patent application Ser. No. 09/764,834, entitled "Method and System for Modeling and Managing Terrain, Buildings, and Infrastructure" filed by T. S. Rappaport and R. R. Skidmore, or may use measurement systems and techniques as disclosed in patent application Ser. No. 10/015,954, entitled "Textual and Graphical Demarcation of Location, and Interpretation of Measurements" filed by Rappaport, et. al., as well as other patent applications by Wireless Valley Communications, Inc., all hereby incorporated by reference.

Note that as disclosed in the prior art, measurement devices may be able to simultaneously or alternately make RF channel measurements and network performance measurements; e.g., a wireless transceiver (a WLAN card or cellphone, for example) can probe the network with an application-specific transmission, and record the performance of its transmission in the network, thereby collecting throughput and other network performance data, while also being able to measure RF channel data such as RSSI or SNR. In such cases, the RF channel data and the network performance data is placed into tables of data that are then correlated with a position within the environment and processed using table look-ups as described herein.

Once RF channel characteristics have been predicted or measured, lookup tables for each defined measuring device are created that correlate the predicted RF channel characteristics with each available vertex within each mesh. That is, each available vertex in each mesh has one or more RF channel characteristic lookup tables associated with it. Each lookup table contains one or more predicted or measured RF channel characteristics for wireless devices 100 as would be detected if each wireless device 100 were located at the given location, as measured by measuring devices 101 or as predicted. Note that separate lookup tables may be formed per type of wireless device or wireless technology. For example, the lookup table representing wireless PDAs on a WLAN may be a very different, distinct lookup table as that for a cellular telephone or RFID tag even if the devices in question were all within the same physical environment. This is due to the changing RF channel characteristics for the different wireless technologies being used by each wireless device, as well as the different transmit and receive capabilities of the wireless devices and measuring devices themselves.

For example, a distinguishing aspect of this invention is that a particular performance lookup table at a particular vertex for a wireless network may contain a correlation, mapping, or relationship between access point association, RSSI, and delay spread. Such a performance lookup table defines the RF channel characteristics within the environment at the specific position or location/region corresponding to its associated vertex, and provides a means for comparing any measured access point association, RSSI, and delay spread to determine how closely it matches the contents of the particular lookuptable at the particular vertex (location/region). If the measured RF channel characteristics closely match the particular performance lookup table at the particular vertex, the wireless device for which the RF channel characteristics were measured may be deemed to be at or close to the position within the environment corresponding to the particular vertex to which the performance lookup table has been associated. It should be clear that a particular environment may be modeled with any finite number of performance tables, and table contents may vary widely and have different attributes and values for a particular environment.

Figure 8:
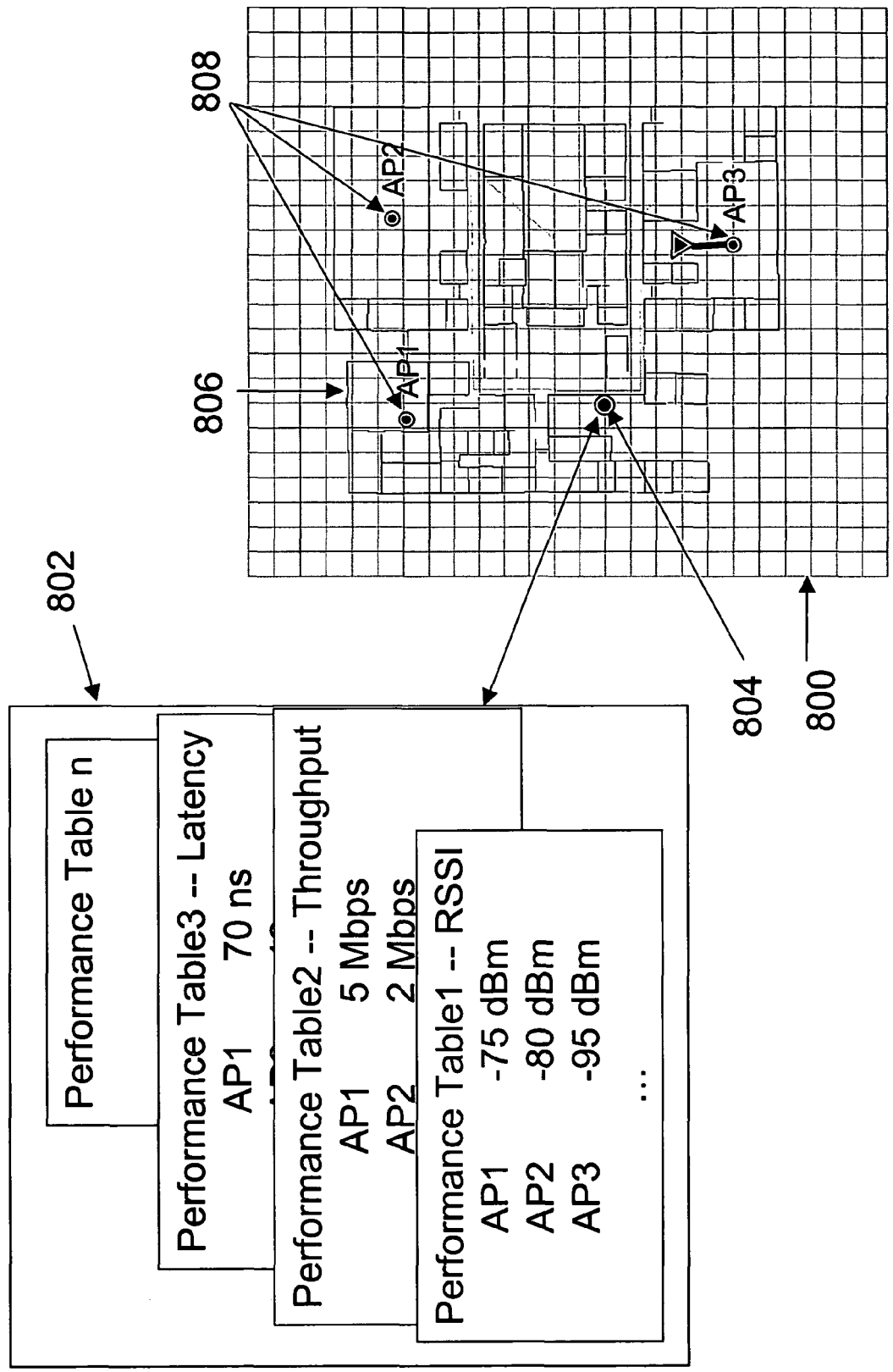
FIG. 8 depicts the correlation of one or more performance lookup tables with individual vertices within a mesh.

This is depicted graphically in FIG. 8. In FIG. 8, there is shown the site-specific environmental model of a floor of a building 806 with three measuring devices 808—AP1, AP2, and AP3—identified. A mesh 800 is defined for the site-specific environmental model. At each available vertex 804 in the mesh, one or more performance lookup tables 802 have been generated. Each performance lookup table 802 contains RF channel characteristic information per measuring device 808. Note that although the performance lookup tables shown in FIG. 8 are identified as multiple lookup tables associated with a given vertex, one embodiment of the present invention provides the means to combine the separate performance lookup tables into a single multidimensional lookup table as defined in pending U.S. patent application Ser. No. 10/830,446 entitled "System and Method for Predicting Network Performance and Position Location Using Multiple Table Lookups" filed by Skidmore et al. which is herein incorporated by reference.

In the preferred embodiment of the invention, the performance lookup tables 804 are created by using radio wave propagation techniques discussed previously to predict what RF channel characteristics each measuring device 808 would detect if an actual wireless device 100 were to be located at the position within the site-specific model represented by the vertex. Referring to FIG. 8, there are shown a variety of performance lookup tables 802 giving RF channel characteristics for each measuring device 808 in terms of RSSI, throughput, and packet latency. Other types of performance lookup tables are available as well, including but not limited to BER, PER, FER, system noise (SNR), system interference (SIR), delay spread levels, power delay profile, packet jitter, quality of service (QoS), and packet error rate. Any finite number of such performance lookup tables, or any finite number of multidimensional performance lookup tables, may be associated with any given vertex on any given mesh. Through this mechanism, any vertex within the mesh is clearly defined in terms of the expected RF channel characteristics at the corresponding position within the environment.

Note that the performance lookup tables are created using a specific configuration of equipment. That is, the predictive algorithms or measurement data used to form the lookup tables at each vertex in the mesh use the known positions and configurations for measuring devices 808. If the position and/or configuration of a measuring device 808 were to change, one or more performance lookup tables at mesh vertices may likewise need to be updated. The position calculation application considers the actual position and configuration of measuring devices compared to the original position and configuration used to generate the performance lookup tables in order to provide a more accurate position estimate. This process is given in more detail below.

Figure 9:
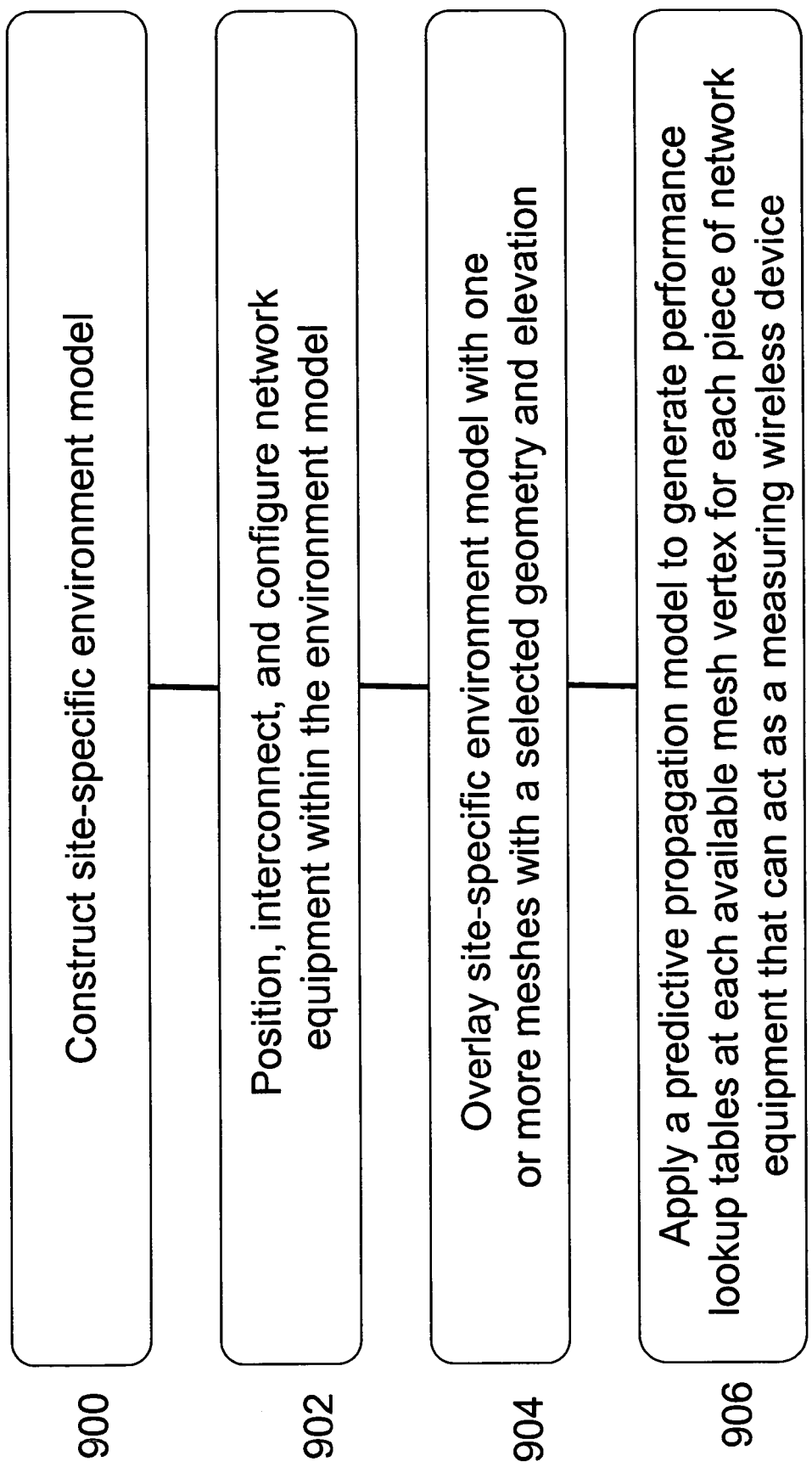
FIG. 9 depicts the preferred method for generating the performance lookup tables and correlating them to vertices within the mesh.

Referring to FIG. 9, there is shown the general method of the preferred embodiment of the invention for creating the site-specific environmental model and associating positions within the model with performance lookup tables. First, a site-specific environmental model of the desired environment is constructed 900 as discussed previously. Note that site-specific models may consist of 2-D or 3-D computerized models of a facility or region, 2-D images (e.g., bitmaps, AutoCAD files, etc.), graphical information systems (GIS) data (e.g., a street map), digital photographs, or other imagery, or any combination thereof.

Once the site-specific environmental model is available, network devices that can act as measuring network devices 101 are identified within the site-specific environmental model 902. In the preferred embodiment of the invention, this involves the identification of the location and configuration details of each measuring device of relevance within the site-specific environmental model, as well as the process by which measured RF channel characteristics can be retrieved either from each measuring device or via each measuring application. Configuration information for each device may include but is not limited to: frequency, channel, bandwidth, modulation scheme, air interface, wireless standard, communication protocol, transmit power, antenna type, antenna orientation, current state of antenna lobes or radiation pattern for electrically steered or "smart" antennas, distribution system information, noise floor, receiver sensitivity, current temperature or other environmental conditions, manufacturer, make, model, serial number, Internet address, media access control (MAC) address, or any other relevant information.

The site-specific environmental model is then overlaid with one or more meshes, where each mesh contains a set of regularly or irregularly spaced vertices corresponding to a particular position within the site-specific environmental model. In the context of the preferred embodiment of the invention, each position corresponds to an {x,y} or {x,y,z} coordinate, although any form of coordinate system or units are suitable for use in the present invention. It should be noted that the mesh may be sparsely populated, meaning that each vertex within the mesh may not be readily available for use.

Finally, at each available vertex, a radio wave propagation prediction is carried out to create one or more performance lookup tables, wherein each performance lookup table contains values relating the expected RF channel characteristics for wireless devices located at the position within the site-specific environmental model identified by the corresponding vertex, as measured by the measuring devices. That is, predictive algorithms are used to simulate wireless devices at each available vertex in each mesh; the predictive algorithms determine the RF channel characteristics that each measuring device is expected to measure for a wireless device were it to be at the corresponding position in the actual environment.

Performance lookup tables may also be created, organized, and indexed by considering other network operating conditions or states. For example, the number of users currently on the network, the time of day, the total quantity of data flow through the network, or the current power levels of the existing network equipment may all be considered an operating condition or state of the network and simulated by a predictive algorithm. Under each operating condition, the predicted RF channel characteristics at any given vertex may vary. For example, depending on the transmit power of a particular wireless device, the RF channel characteristics measured for that device may vary; however, performance lookup tables can be created that represent the varying transmit powers of the wireless device. Then, when measured RF channel characteristics are available for the wireless device, if the present invention can identify the transmit power of the wireless device in question, the appropriate performance lookup table—the table specifically for the identified transmit power of the wireless device—can be selected at each vertex and tested as a possible position for the wireless device.

Figure 10:
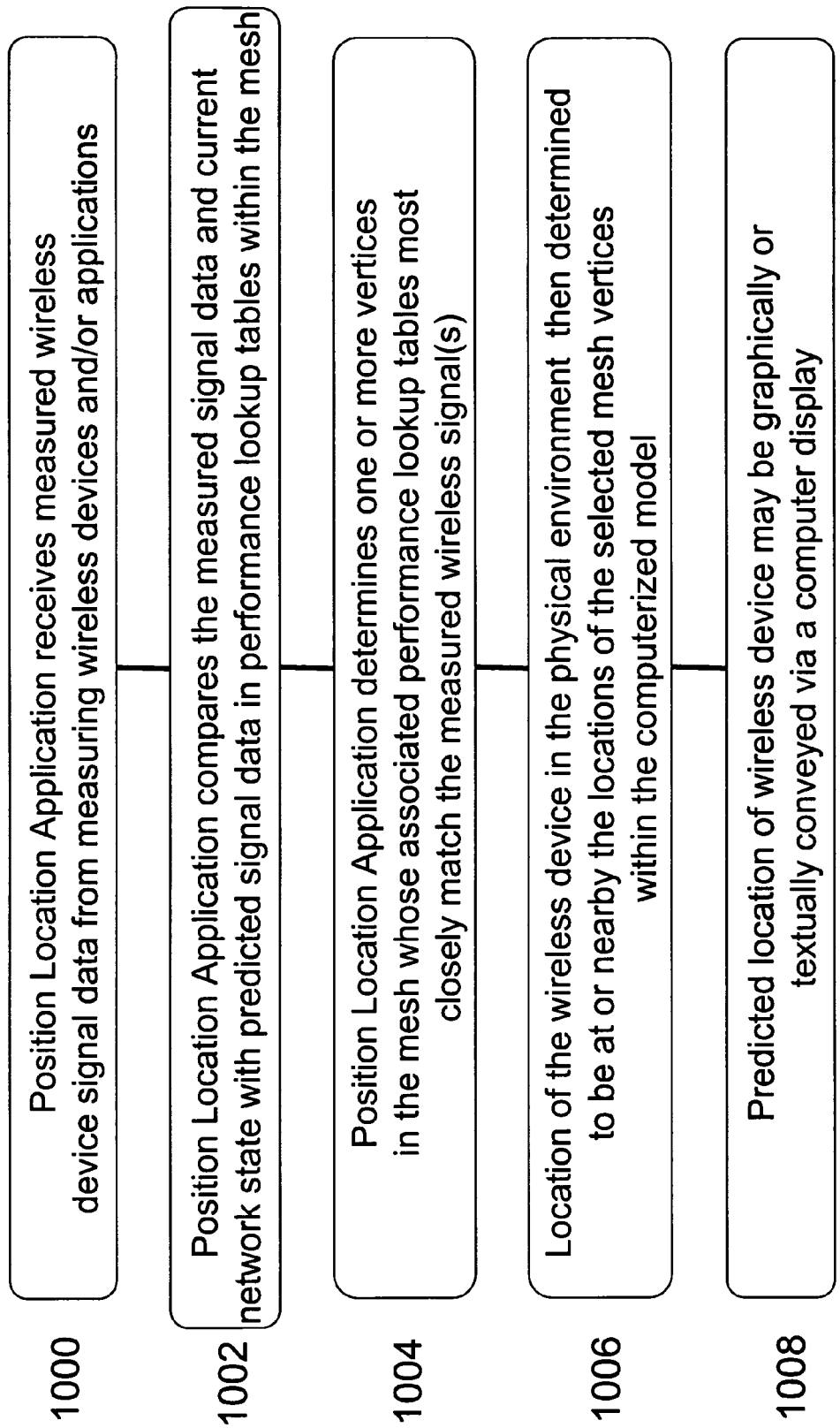
FIG. 10 depicts the preferred method for the position calculation of the present invention.

Once the site-specific environmental model 106 and performance lookup tables 107 are available, one preferred method for the position calculation application 104 is depicted in FIG. 10. Referring to FIG. 10, the position location application receives RF channel characteristics for each wireless device detected by the measuring devices within the network 1000.

The position calculation application then compares the actual measured RF channel characteristics, information on the current network operating state, and/or information on the network operating conditions with the predicted RF channel characteristics contained within the performance lookup tables associated with each available vertex of each mesh 1002. This comparison may be carried out through a variety of techniques. In the preferred embodiment of the invention, the techniques for utilizing multidimensional lookup tables to derive performance as described in pending U.S. patent application Ser. No. 10/830,446 entitled "System and Method for Predicting Network Performance and Position Location Using Multiple Table Lookups" by Rappaport et al are applied. Through this process, each lookup table accepts the measured RF channel characteristic values as indices into the table, with the output being an indication of the relative likelihood the wireless device is at the position the lookup table is associated with. For example, if the measured packet latency and RSSI for a wireless device by a particular measuring device is 10 ms and −82 dBm respectively, these would serve as the inputs into the corresponding lookup table (or lookup tables) for packet latency and RSSI for the particular measuring device at each available vertex. The output from the lookup table would be an indication of the likelihood the wireless device was at the position or positions corresponding to the lookup table 1004. The position calculation application then identifies the selected positions as the probable location of the wireless device 1006.

Given that multiple RF channel characteristics may be available, and that each available vertex of each mesh may have one or more performance lookup tables (or multidimensional lookup tables) associated with it, the process of identifying possible locations for a wireless device are complimented by prioritizing the various RF channel characteristics. Towards this end, the preferred embodiment of the invention allows users to apply their own prioritization to the various RF channel characteristics in order to further refine the position calculation process.

For example, a user may elect to prioritize access point association, RSSI, and packet latency information in that order. In this case, the position calculation application would first use the measured access point association of the wireless device. This RF channel characteristic would provide a matching of a certain subset of vertices, as certain vertices would have associated performance lookup tables that would match with a particular access point association. Next, the position calculation would use the measured RSSI values of the wireless device, and compare the measured RSSI values with the values contained in the lookup tables for the previously determined subset of vertices. This would further restrict the possible choices of matching vertices, producing an even smaller subset of possible matching vertices. Finally, the position calculation application would utilize measured packet latency to produce the final subset of matching vertices. This process could be repeated with any RF channel characteristics prioritized in any fashion to produce a suitable result within the context of the present invention, the goal being to determine the likely position of the wireless device given the set of measured RF channel characteristics.

In addition to a prioritization scheme, alternate embodiments of the present invention may instead utilize a weighting mechanism whereby the results of using certain RF channel characteristics to calculate a position using the lookup tables are weighted more heavily than others. The result is a percent likelihood per vertex that the wireless device is located at the associated position. The user may then select to have vertices whose percent likelihoods for being the actual position of the wireless device are above a certain thresholds identified in some fashion.

The mechanism for determining how closely a given set of measured RF channel characteristics matches a given set of predicted or measured performance lookup table entries may provide an assessment of the statistical confidence of the position estimate. Alternate embodiments of the present invention may use such mechanisms in order to prioritize the position estimates generated using various lookup tables, with priority given to the position estimate having the highest statistical confidence. The calculation of statistical confidence in such an alternate embodiment would depend on the mechanism used to compare the measured characteristics to the lookup table, including but not limited to the statistical likelihood that the distribution of measured values and the distribution of values in the lookup table are the same.

Note that the mechanism for determining how closely a given set of measured RF channel characteristics matches a given set of predicted or measured performance lookup tables may take many forms. In the preferred embodiment of the invention, the discrepancy between the measured RF channel characteristics and the performance lookup tables is gauged by determining the percent difference between the measurements and the tables. For example, if RSSI is the principle RF channel characteristic, a system made in accordance with the present invention may determine which set of performance lookup tables matches the given measured RF channel characteristics (RSSI) for the wireless device in question most closely; that is, with the least mean difference. One skilled in the art can see how other techniques either known now or in the future could be used within the context of the present invention.

Some embodiments of the present invention may also store historical information on prior measured RF channel characteristics and the network conditions under which the measurements were taken. That is, for each wireless device being measured, embodiments made with this capability may store individual measurements in an internal or external database. These historical RF channel characteristics may then be retrieved later and used for various purposes. For example, an embodiment of the present invention could be used to show the path a wireless device moved over time by drawing on the historical RF channel characteristics and re-calculating the wireless device position at each measurement in time.

Such historical data can also be used to further improve positioning accuracy when combined with either assumed or known information regarding the expected speed or direction of the wireless device being measured. If the current speed of the wireless device is known or assumed, an embodiment of the present invention can utilize that information to narrow the set of vertices whose performance lookup table results are then tested against measured RF channel characteristics by discarding all vertices whose positions were unattainable given the speed of the wireless device compared to the last time a set of measured RF channel characteristics was available for the wireless device. For example, if a wireless device has its RF channel characteristics measured at time zero and is determined to be traveling at 5 feet per second, if the RF channel characteristics for the wireless device are measured again five seconds later, it can be assumed that the wireless device has traveled a maximum 25 feet. Thus, by taking the measured RF channel characteristics and determining an estimated position at time zero, the system can neglect any vertices that lie more than 25 feet away from the position for the measurement 5 seconds later. Although this embodiment of the present invention identifies the storage of measured RF channel characteristics and network operating conditions, one skilled in the art can see how other methods of storing historical information could be used within the context of the present invention.

An example of the method used in the preferred embodiment of the present invention to determine the likely positions of wireless devices is detailed below. Referring to FIG. 11a, measurement information 1100 has been collected by measuring devices for a wireless device whose position is to be determined. In this example, the measured information 1100 takes the form of RSSI in dBm per measuring device, which in this example are labeled as "AP1", "AP2", "AP3", etc. Specifically, measuring device AP1 is reporting −79 dBm; measuring device AP2 is reporting −75 dBm; measuring device AP3 is reporting −100 dBm for a particular wireless device to be positioned. This measurement information is provided to the position calculation application via the mechanisms discussed previously.

The present invention then determines if the appropriate performance lookup tables exist to compare the measured information 1100 against. First, the current configuration of the measuring devices is compared against the configuration of the measuring devices for which performance lookup tables have been created. The actual, current position, transmit power, channel, antenna orientation, antenna radiating characteristics, and other configuration information of each measuring device is compared against the configuration of each measuring device used to generate the performance lookup tables. If a match is found, those performance lookup tables are selected and used for the remainder of the method. If a match is not found, new performance lookup tables corresponding to the actual, current configuration of the measuring devices involved are generated via simulation and used. Note that performance lookup tables are associated with each vertex of each mesh defined for the site-specific environment, and the tables at each vertex of each mesh need to be checked and updated accordingly.

Once the appropriate performance lookup tables have been identified that match the current configuration of the measuring devices along with the measured data (in this example, RSSI), the method proceeds to compare the measured information 1100 against each performance lookup table 1102, 1104 associated with each vertex in each grid defined for the site-specific environment. Note that although only two performance lookup tables 1102, 1104 are shown in the example, there will likely be hundreds of such tables involved depending on the number of mesh vertices defined for the environment. Referring to FIG. 11a, each performance lookup table 1102, 1104 involved in the comparison with the measured information 1100 is associated with a given vertex on a particular mesh. For example, Performance Table1 1100 corresponds to the mesh vertex located at position x=35, y=40, z=1.8, which is a location on Floor1 in the site-specific model.

The comparison between the measured information 1100 and the values in the performance lookup tables 1102, 1104 may be accomplished in numerous ways. In the preferred embodiment of the present invention the comparison step takes of the form of determining the absolute value of the error between the measured information and the performance lookup tables at each mesh vertex. For example, for Performance Table1 1102 the current method would take each measuring device as an index into the performance lookup table. So, for AP1, the measurement information 1100 for AP1 was −79 dBm; using AP1 as the index into the performance lookup table 1102, the predicted value for AP1 at the associated mesh vertex was −75 dBm. The absolute value of the error between the measured information and the performance lookup table is 4 dB. This determination of error is carried out across all measuring devices for the measured information and the performance lookup table, with the result being the total amount of error across all entries in the performance lookup table. The total error may be averaged by simply dividing by the number of entries in the performance lookup table, may be converted into a percentage error term, or a standard deviation of the error may be taken. The preferred embodiment of the invention allows the user to choose which method should be used to assign an error value or term to each performance lookup table that quantifies the overall disparity between the performance lookup table and the measured information.

Note that in some cases, measured information for a particular measuring device may not be available; for example, if a measuring device was unable to detect the wireless device in question. In such a situation, the preferred embodiment of the present invention allows the user to decide whether such missing measured information are simply ignored, meaning that the corresponding entry in the performance lookup table for the measuring device is simply ignored and not considered as part of the positioning calculation, or whether the missing measured value for the given measuring device is substituted with a value corresponding to the noise floor of the system.

In the example in FIG. 11a, the method of quantifying the overall error between the measured information 1100 and each performance lookup table 1102, 1104 is carried out for each performance lookup table. The result is that each performance lookup table—and by association, each mesh vertex—will now have an error value that identifies the disparity between the predicted and measured information at the given location. The lower the error value at each mesh vertex, the greater the likelihood that the detected wireless device is located at that corresponding position in the physical environment. The preferred embodiment of the present invention allows the user to decide how many possible locations are to be considered as likely locations for a detected wireless device. If, for example, the user selected to identify up to 12 possible positions, the twelve mesh vertices with the corresponding best error values (i.e., closest match between measured information and performance lookup tables) will be singled out.

A table of these likely positions is shown in FIG. 11b. The table ranks mesh vertices by their error value, which in this example is simply the overall mean error between the measured information 1100 and the performance lookup tables for the corresponding mesh vertex. In addition, the preferred embodiment of the present invention allows each likely position to be assigned a weighting, which is a numeric indication of the overall likelihood that the given position is indeed the actual location of the wireless device being tracked. The weighting is a numeric value, with a higher weighting value indicating that the associated position is more likely to be the actual location of the detected wireless device. The weighting values assigned are used in the next step of the calculation discussed below. This weighting system is entirely user customizable in the preferred embodiment of the present invention, and is accomplished by allowing the user to assign weighting values based on the overall error between measured information and performance lookup tables. For example, if the overall error value is less than or equal to a given threshold, a particular weighting value will be assigned. If the user chooses not to apply any form of weighting, by default a weighting value of 1 is assigned to all likely positions; by giving all positions the same weighting, the effect of the weighting values on the remainder of the positioning process is negated.

Depending on the desires of the user, it is entirely possible that the position calculation application may simply return the set of likely positions along with their rankings or perhaps simply the single most likely position determined thus far. That is, the user may elect to skip the next stage of the positioning method and simply use the set of likely positions produced by the position calculation application at this stage. Otherwise, once the set of possible positions has been identified, with the number of positions and their assigned weighting having been determined by the user as part of configuring the position calculation application, the method of determining the position of the proceeds into the next stage, which is intended to further refine the set of likely positions.

Figure 12:
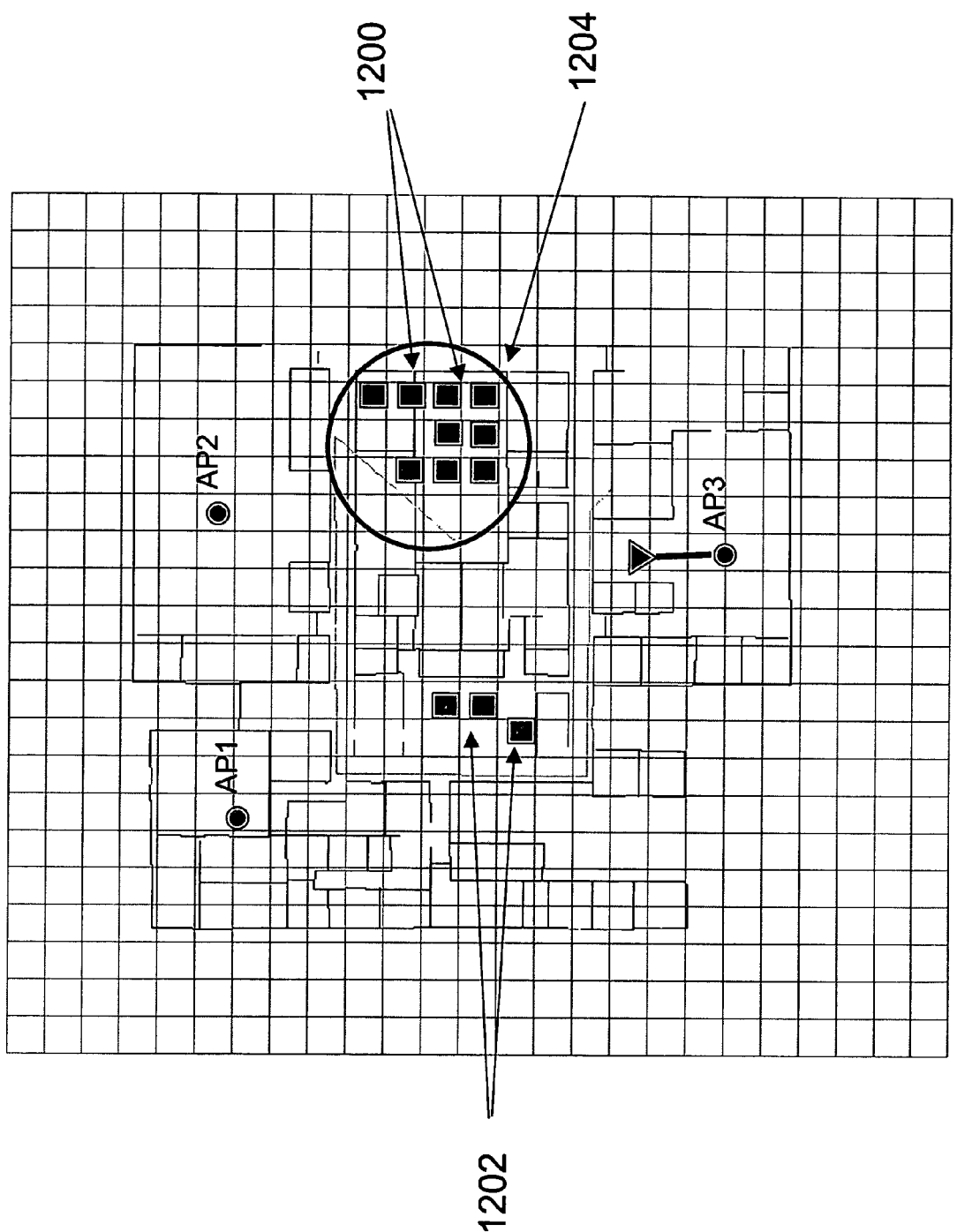
FIG. 12 depicts the preferred method for refining the set of possible positions.

Referring to FIG. 12, there is shown the site-specific environment model of the facility. The set of likely positions for the wireless device as determined thus far by the position calculation application are displayed as filled squares 1200, 1202 overlaid on the site-specific environment model, which in this example is a building floor plan. As can be seen from FIG. 12, the identified positions are spread across several possible mesh vertices. In this example, the user has elected to allow up to twelve possible positions to be used in this stage of the position calculation, and thus twelve possible positions are identified in FIG. 12. Note that the possible positions appear in two groupings, one larger grouping 1200 and one smaller grouping 1202.

The next stage in the position calculation attempts to further refine the set of identified likely positions. In the preferred embodiment of the present invention, this is accomplished through a unique application of the same algorithms used in calculating the center of mass of an object. Each identified position has a given weighting (assigned based on the overall error between measured information and the performance lookup tables at that position) and is spatially distinct from other positions. The form of the center of mass calculation is as follows:

$$X = \sum_{k=1}^{n} \frac{w_k x_k}{W}, Y = \sum_{k=1}^{n} \frac{w_k y_k}{W}, Z = \sum_{k=1}^{n} \frac{w_k z_k}{W},$$

where X, Y, and Z are the {x,y,z} position coordinates of the center of mass calculated across the likely positions, W is the sum of the weightings assigned to the likely positions; n is the number of likely positions; wk is the weighting assigned to each position; and $(x_k, y_k, z_k)$ are the individual {x,y,z} coordinates of each likely positions.

Once the position of the center of mass {X,Y,Z} has been identified, a geometric region of a user-customized size can be placed centered about the center of mass. Referring to FIG. 12, this geometric region 1204 is a circle of user-defined radius that has been centered about the {X,Y,Z} position calculated to be the center of mass for the given set of likely positions. Although a circle 1204 has been used in FIG. 12, one skilled in the art can see how other alternative geometries could also be selected within the scope of the present invention. The radius of the geometric region 1204 is typically selected by the user to be the desired tolerance of the positioning algorithm. For example, by setting the tolerance threshold to be 30 feet, a geometric region of diameter 30 feet would be used. This is an indication of how close the user wishes the approximation of calculated position to be. That is, the position calculation application will effectively only consider the positions 1200 within the geometric region 1204 as being the likely positions of the wireless device; positions 1202 outside of the geometric region will be discarded. The smaller the tolerance, the less likely that the geometric region encloses the actual position of the wireless device. However, smaller tolerances may yield more precise estimates. It should be clear to one skilled in the art of estimation, modeling, or data processing/smoothing that other approaches to the problem of calculating or estimating a particular outcome from a series of different inputs could be used. The invention does not limit itself to a particular algorithm, such as the particular embodiment described above, but rather should be interpreted broadly so that other well-known techniques (e.g., median filtering, non-linear or linear interpolation, active programming, etc.) could also be used to determine a particular outcome (e.g., center of mass in this instance).

Figure 13:
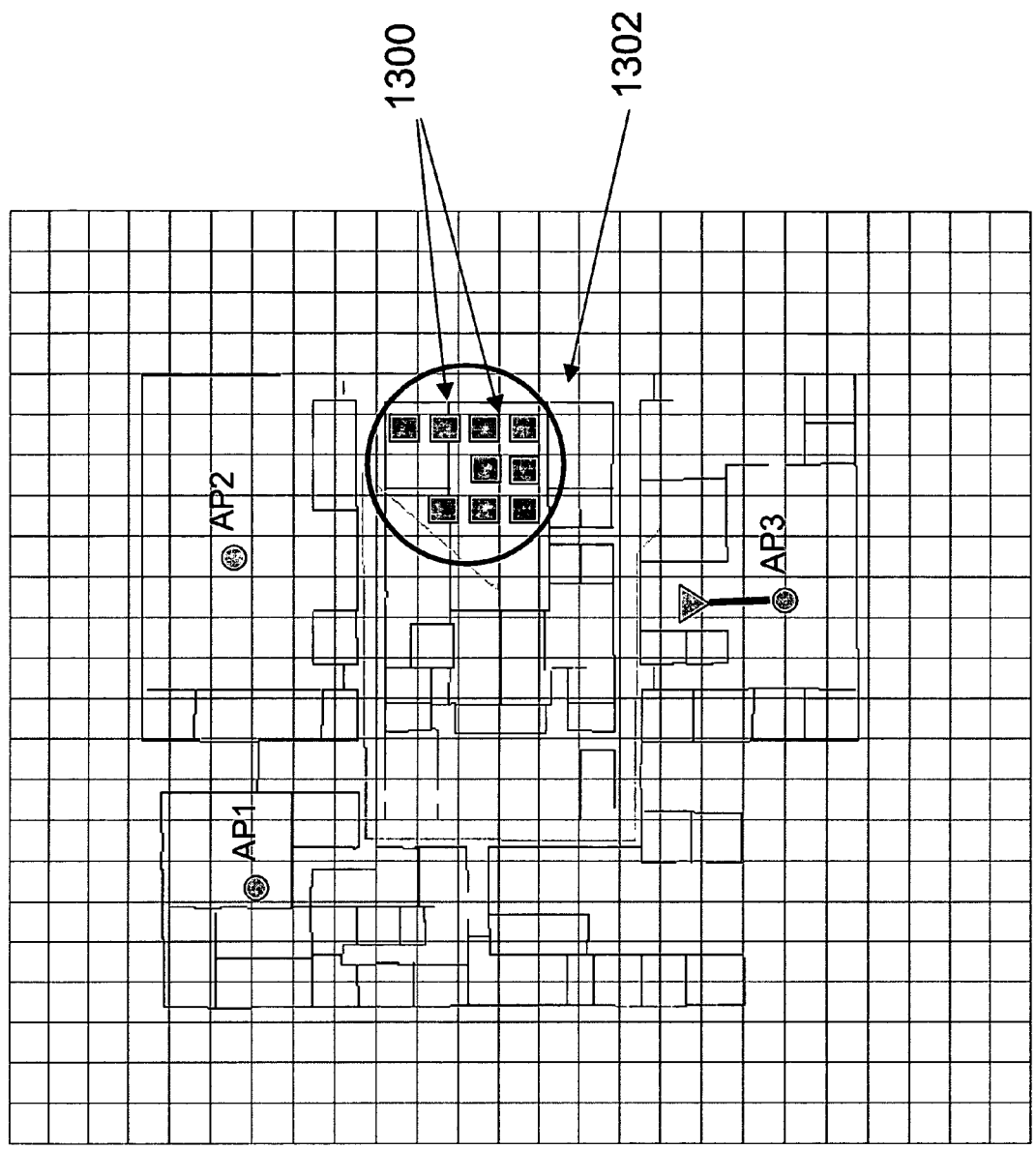
FIG. 13 depicts the preferred method for refining the set of possible positions.

Referring to FIG. 13, now only positions 1300 within the geometric region 1302 are retained; other positions that were outside of the geometric region have been discarded. In the preferred embodiment of the invention, the repetitive application of the center of mass calculation in conjunction with a geometric region of slightly decreasing dimension (i.e., slightly decreasing tolerance) is used to gradually refine the set of likely positions. For example, if the user tolerance threshold is set to 10 feet, the initial dimension of the geometric region positioned about the calculated center of mass may initially be twice the user defined tolerance. With each successive repetition of the center of mass calculation, the tolerance will be reduced by a certain fraction until the user selected tolerance of 10 feet is obtained. The amount of reduction that occurs at each stage is likewise user definable, as is the initial dimension of the geometric region. If at any stage in the repetitive center of mass calculation all likely points are discarded, the algorithm will halt and the set of likely positions from the previous stage will be restored.

Once a set of possible vertices has been identified whose corresponding performance lookup tables provide a close matching to the measured RF channel characteristics, an embodiment of the present invention provides the means of displaying, either graphically or textually, the associated positions within the site-specific environmental model 1008.

Figure 14:
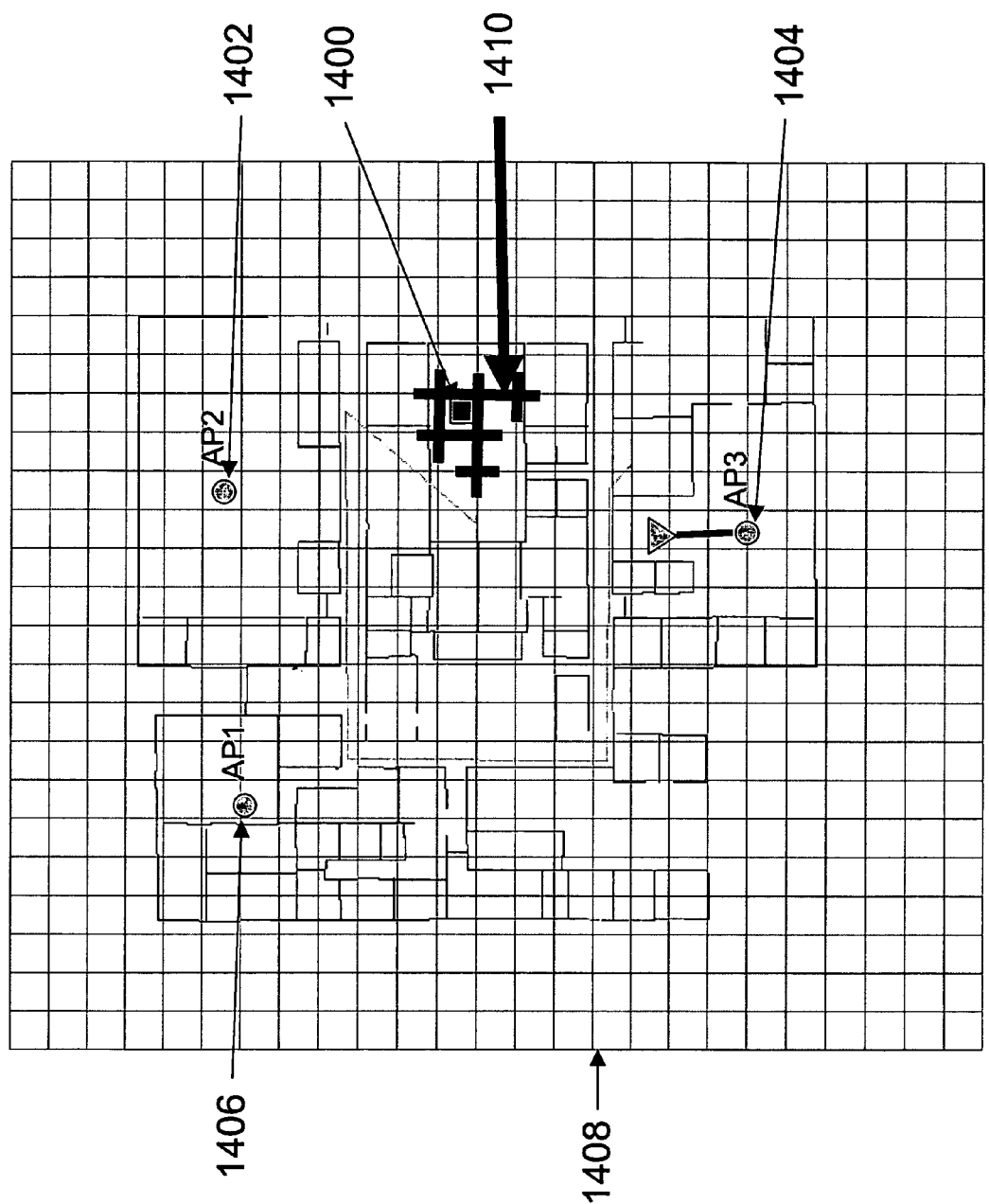
FIG. 14 depicts the display of possible positions for a detected wireless device by the present invention.

This is depicted in FIG. 14, wherein various measuring devices 1402, 1404, 1406 are positioned within a site-specific environmental model. A mesh 1408 with performance lookup tables per vertex has been calculated for the site-specific environmental model. A wireless device 1400 indicated by a colored square is present within the actual environment, and each measuring device reports RF channel characteristics for the wireless device to the position calculation application. The position calculation application compares the measured RF channel characteristics of the wireless device with the performance lookup tables associated with the vertices of the mesh to determine the set of vertices whose lookup tables most closely match the measured RF channel characteristics. The resulting set of matching vertices has their corresponding positions highlighted graphically 1410 on a computer display. Although positions are depicted as bold plus signs centered on particular vertices, one skilled in the art can see that any form of graphical display could be used to convey position information on a computer display, including colored icons, textual labels, shaded regions, shaded pixels, or other graphical rendering. The display of the site-specific model and corresponding wireless device positions may be 2-D or 3-D.

Figure 15:
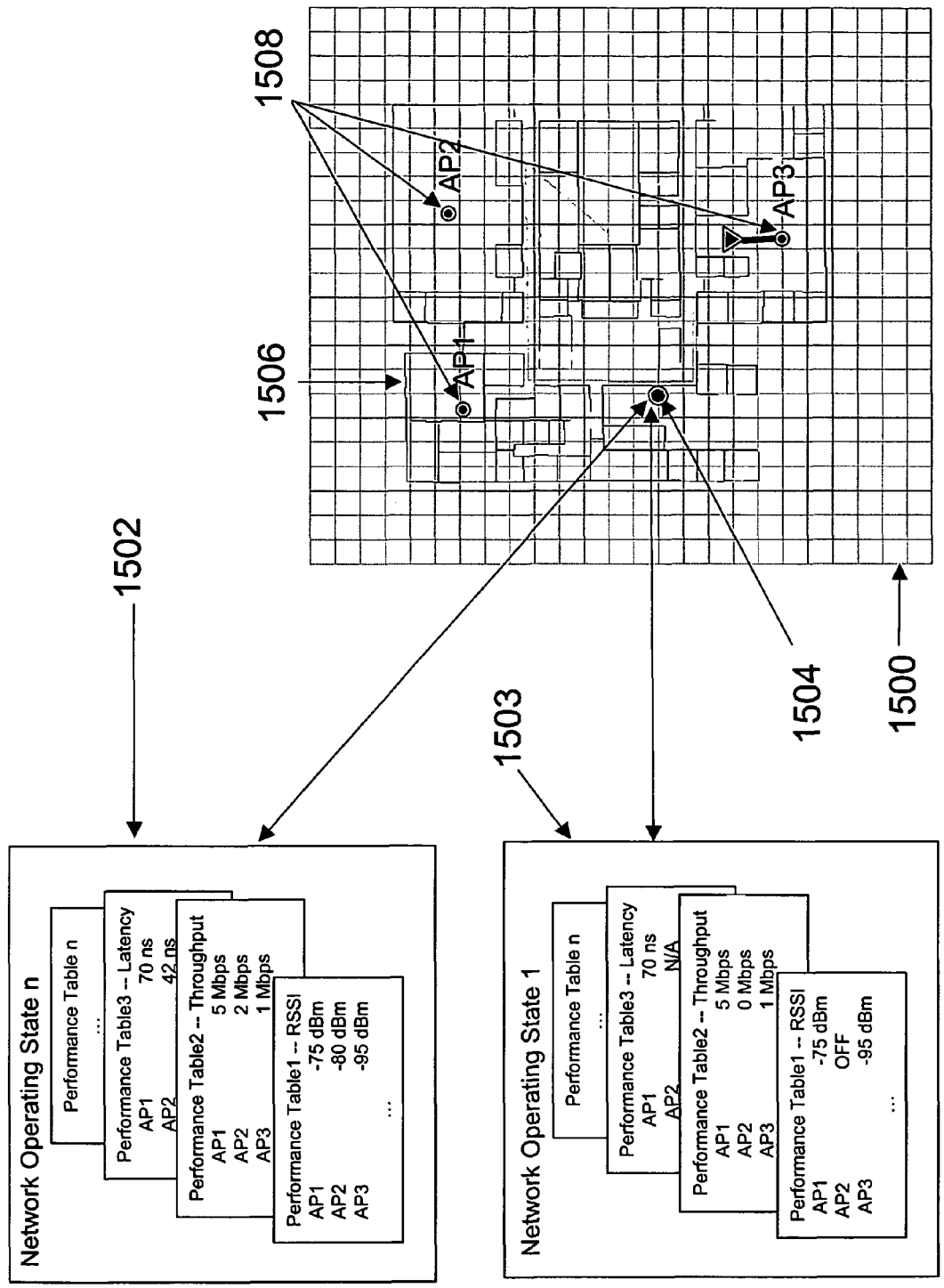
FIG. 15 depicts the correlation of one or more performance lookup tables specific to different network operating states with individual vertices within a mesh.

In FIG. 15, there is depicted the site-specific environmental model of a floor of a building 1506 with three measuring devices 1508—AP1, AP2, and AP3—identified. A mesh 1500 is defined for the site-specific environmental model. At each available vertex 1504 in the mesh, one or more performance lookup tables 1502, 1503 have been generated. Each performance lookup table 1502, 1503 contains RF channel characteristic information per measuring device 1508. Note that although the performance lookup tables shown in FIG. 15 are identified as multiple lookup tables associated with a given vertex, one embodiment of the present invention provides the means to combine the separate performance lookup tables into a single multidimensional lookup table as defined in pending U.S. patent application Ser. No. 10/830,446 entitled "System and Method for Predicting Network Performance and Position Location Using Multiple Table Lookups" filed by Skidmore et al.

In the preferred embodiment of the invention, the performance lookup tables 1502, 1503 are created by using radio wave propagation techniques discussed previously to predict what RF channel characteristics each measuring device 1504 would detect if an actual wireless device 100 were to be located at the position within the site-specific model represented by the vertex. Referring to FIG. 15, there are shown a variety of performance lookup tables 1502, 1503 giving RF channel characteristics for each measuring device 1508 in terms of RSSI, throughput, and packet latency. Other types of performance lookup tables are available as well, including but not limited to BER, PER, FER, system noise (SNR), system interference (SIR), delay spread levels, power delay profile, packet jitter, quality of service (QoS), and packet error rate. Any finite number of such performance lookup tables, or any finite number of multidimensional performance lookup tables, may be associated with any given vertex on any given mesh. Through this mechanism, any vertex within the mesh is clearly defined in terms of the expected RF channel characteristics at the corresponding position within the environment.

FIG. 15 differentiates itself from FIG. 8 in that the performance lookup tables 1502, 1503 may be further distinguished based upon the current detected network operating state or network operating conditions. That is, depending on the current state of the network one or more different performance lookup tables may be applicable. The state of the network corresponds to either the current network equipment configuration (e.g., the current power, channel, and other settings of the network devices comprising the network); the number of current wireless devices connected to, communicating with, or interfering the with the network; the current traffic or network loading, along with the configuration of the wireless devices (e.g., the current power, channel, and other settings); the detected or known positions of wireless devices or measuring devices present on the network; the time of day; the current security or encryption settings of the network; or any other hardware or software configuration or operating condition of the network.

In accordance with one embodiment of the present invention, the system provides the mechanism for the creation of performance lookup tables correlated to a particular operating state of the network. For example, referring to FIG. 15, Network Operating State 1 is representative of a particular network operating state and has performance lookup tables 1503 correlated with that particular network state; similarly, Network Operating State n is representative of a separate network operating state and also has performance lookup tables 1502 correlated with that particular network state. The performance lookup tables 1502, 1503 may be predicted or measured as described herein, or may be learned over time by the invention through analysis of historical data. These sets of performance lookup tables 1502, 1503 correlated to a particular network operating state may be associated with vertices 1504 within the mesh 1500. The position calculation application then can utilize knowledge of the present network operating state to determine the most desirable set of performance lookup tables to apply.

Specifically, FIG. 15 provides two sets of performance lookup tables 1502, 1503 which are each correlated with a particular operating state of the network. In FIG. 15, the Network Operating State 1 depicts performance lookup tables 1503 in the situation of network equipment AP1, AP2, and AP3 1508 being active and serving as measurement devices. Similarly, Network Operating State n depicts performance lookup tables 1502 in connection to the situation where AP2 is powered off. Both scenarios may provide for very different measured RF channel characteristics from a wireless device, and, therefore, if the separate operating state of the network were not accounted for through the use of performance lookup tables 1502, 1503 then an erroneous position may be calculated for the wireless device. Instead, the system can determine the operating state of the network and use the appropriate performance lookup table for the detected scenario.

Although the examples given thus far assume performance lookup tables exist prior to the reception of measured RF channel characteristics from wireless devices, the present invention allows for and promotes the ability to calculate performance lookup tables in real-time or after measured RF channel characteristics are received. For example, if the position calculation application receives measured RF channel characteristics and determines that a set of performance lookup tables corresponding to the current network operating state or the particular type of RF channel characteristics that have been measured are not available or have not been precalculated, new or updated performance lookup tables can then be generated utilizing predictive algorithms and/or measured RF channel characteristics as described herein. The newly generated lookup tables are then used by the position calculation application as described herein.

Similarly, if the current configuration of the measuring devices 101 have changed since the creation of the performance lookup tables, such as the power level, antenna orientation, or current antenna radiating characteristics have been altered, and no existing performance lookup tables match the given configuration of the measuring devices 101, new performance lookup tables for the new configuration settings can be created using the predictive techniques described herein. These tables may be created by the position calculation application or by another application, and may be created automatically as needed. These newly created performance lookup tables are then used by the position calculation application.

Although many of the examples given herein detail the process of determining the position of a wireless device 100 from the standpoint of having fixed measuring devices 101, it is entirely possible that the measuring devices 101 are themselves mobile wireless devices, such as wireless clients. In this situation, the mobile measuring devices 101 need to first gauge their own position using the methods described herein. This is done by temporarily treating the measuring device 101 as a wireless device 100 and gauging its position accordingly. Then, once the position of the mobile measuring device 101 has been accurately estimated, performance lookup tables that incorporate the new position and configuration information of the mobile measurement device 101 may be generated as described herein. Afterwards, measured RF channel information 102 received by the mobile measuring device may then be used to assist in positioning other wireless devices 100.

Figure 16:
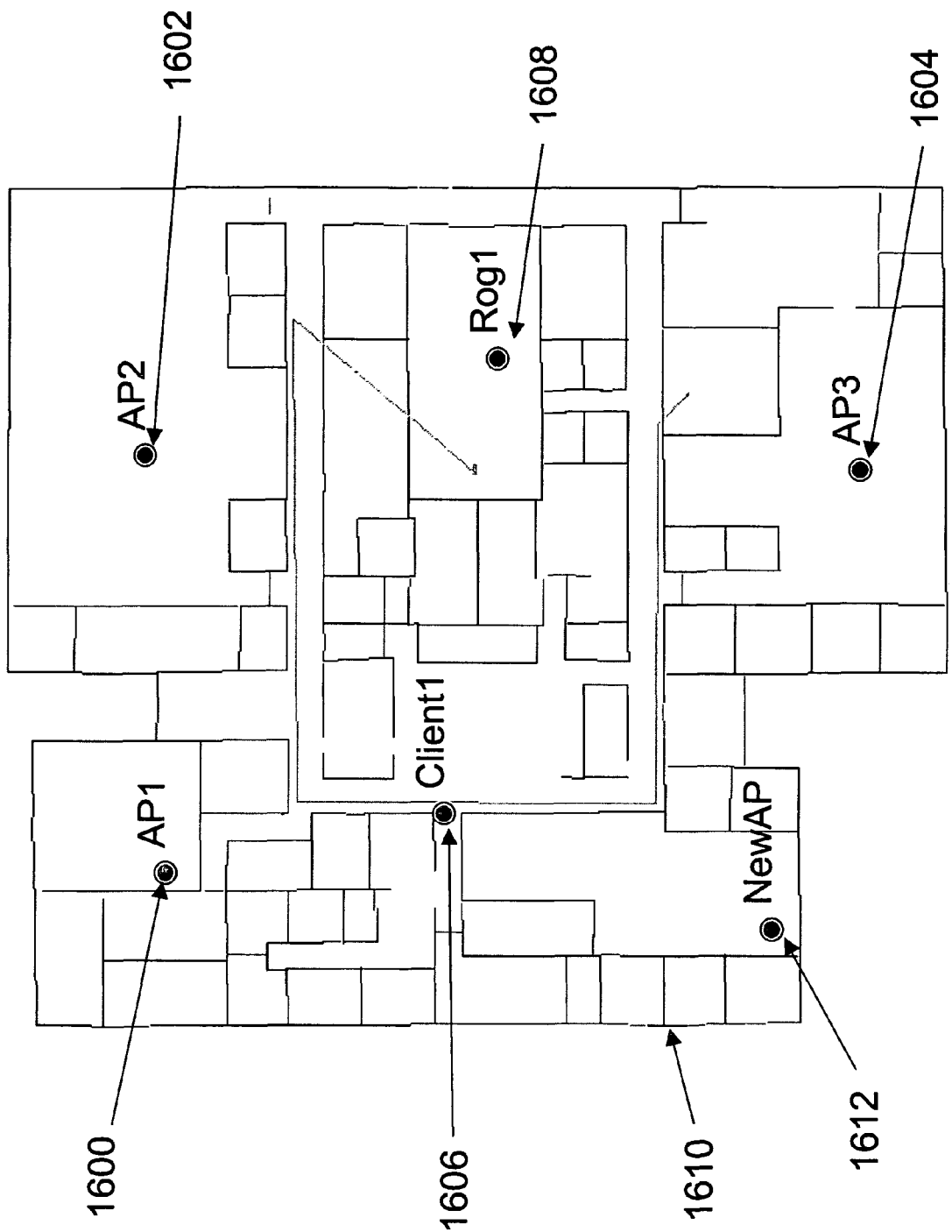
FIG. 16 depicts an environmental model of a building containing various wireless devices, measuring devices, rogue devices, and additional new hardware.

Referring to FIG. 16, there is shown the site-specific environmental model of a floor of a building 1610 with three measuring devices—AP1 1600, AP2 1602, and AP3 1604—identified. In addition a mobile wireless device Client1 1608 is present on the network. The three measuring devices 1600, 1602, 1604 are measuring the RF channel and configuration characteristics from the mobile wireless device 1606; the measured RF channel characteristics are then utilized by the invention as described previously in a position calculation application 104 to determine the position of the mobile wireless device 1608. Once the position of the mobile wireless device 1606 has been established, the present invention then allows the mobile wireless device 1606 itself to become a measuring device 101. Performance tables 107 are generated as described previously for the mobile wireless device 1606 given its now known position and configuration characteristics, and stored at mesh vertices throughout the site-specific environmental model.

At this point, the mobile wireless device 1606 in FIG. 16 is a mobile measuring device capable of measuring the RF channel characteristics of other wireless devices 100 on the network. Measured RF channel characteristics recorded by the mobile measuring device 1606 can then be reported back to one or more position calculation applications 104. This reporting of RF channel characteristics is most commonly done via a wireless connection between the mobile measuring device 1606 and one or more network transceivers, which may include the measuring devices 1600, 1602, 1604. However, other means of communicating the measured RF channel characteristics can also be used within the scope of the current invention. It is also possible that the mobile wireless device 1606 itself hosts a position calculation application 104. As the mobile measuring device 1606 itself moves within the environment, its movement is detected by measuring devices, and its new position and corresponding performance lookup tables are updated accordingly. Through this process, any wireless device capable of communicating over the network to a position calculation application can be converted into a measuring device. For example, if a rogue transceiver Rog1 1608 is introduced into the environment, the measuring devices 1600, 1602, 1604 may or may not be able to detect it, whereas the mobile wireless device 1606 may be able to do so. When the mobile wireless device 1606 has been converted into a mobile measuring device, detailed RF channel characteristics for the rogue transceiver 1608 may be measured by the mobile measuring device and reported to one or more position calculation applications. Through this means the mobile measuring device can be used to assist in the determination of the positions of other wireless devices within the network.

The present embodiment of the invention supports having the position calculation application 104, site-specific environment model 106, performance lookup tables 107, and measuring device 101 and/or measuring application 103 on a mobile computing platform. This situation is commonly referred to as client-side positioning, where a client device is determining its own location based on measured RF channel characteristics from a serving or detectable wireless network. In this situation, a mobile client device is the measuring device 101 while the wireless devices 100 being measured are network devices, such as access points, antennas, or base stations. The method for determining the position of the mobile client device is otherwise identical to that described herein. In this embodiment of the present invention, because each wireless device is calculating its own position and sharing this information with other devices or applications, the network overhead for calculating position information is minimized. There is no need for network bandwidth to be taken up with measured RF channel 105 information to be communicated between measuring devices 101, measuring applications 103, and position calculation applications 104, which frees bandwidth to be used for other applications or services. This allows the total number of wireless devices being tracked in terms of their position without dramatically increasing the overall network overhead being used strictly for this purpose. The RF channel characteristic data used by the invention as a basis for position estimation might easily be several orders of magnitude larger in volume than the resulting position estimate data.

For example, referring to FIG. 16, the mobile measuring device Client1 1606 may also host a measuring application 103 and position calculation application 104, allowing it to measuring RF channel characteristics from other wireless devices, such as the transceivers 1600, 1602, 1604 shown, and determine its own position within the site-specific environmental model 1610 using the techniques described previously. If the mobile measuring device 1606 does not already have the appropriate site-specific environment database 106, this database may be manually or automatically downloaded to the mobile measuring device from some other location on the network. For example, the mobile measuring device may instantiate a communication path to a network server containing the site-specific environment database or the database may be stored or embedded at one or more transceivers 1600, 1602, 1604 and shared with the mobile measuring device 1606. Performance tables may likewise be downloaded or shared with mobile measuring devices, or the mobile measuring device may have the means of recalculating or updating the required performance tables itself using techniques described herein.

The present embodiment of the invention also supports having multiple position calculation applications 104 independently determining the position of one or more wireless devices 100. In this situation, it may be possible that different estimates of the position of the wireless devices are available. For example, if the different position calculation applications are utilizing RF channel information from different measuring devices 101, the differences in the measured information may result in slight discrepancies in the predicted position arrived at by each position calculation engine. The most likely scenario in which this situation will occur is when a given network uses both network-side and client-side positioning, where each client is determining its own position. Simultaneously, one or more position calculation applications 104 connected to measuring devices 101 that are part of the network infrastructure are likewise calculating the position of wireless devices 100, some of which may be the client devices themselves. This may be advantageous as it enables the various position estimates for a given device to be aggregated at one location and compared or averaged to provide improved confidence in the position estimate.

The present invention supports embodiments wherein the measuring devices 101, measuring application 103, position calculation application 104, site-specific environment model 106, and performance lookup tables 107 are co-located on the same computing platform in an embedded form. That is, instead of being instantiated as computer applications executing on a computer platform, each may instead be instantiated as software instructions being executed by a chipset or may even be instantiated directly in the circuitry of a custom developed chipset that is embedded within a wireless device or other computing platform. In this situation, each may be a separate portion of the same chipset or separate chipsets interconnected to one another with communication pathways.

As new wireless devices 100, measuring devices 101, or measuring applications 103 are connected to the network, their position can be automatically determined through the methods described herein. This position information along with the site-specific environment model and/or the performance lookup tables can be provided to the new devices and applications depending on their authorization to receive it. In this situation, new devices connected to the network can automatically receive information on their current position as well as the position and configuration information for nearby wireless equipment. This allows the device to make very accurate decisions regarding what its own configuration should be, based on its location, or for the existing network devices to determine the appropriate configuration of the new device and provide those details accordingly. Through this mechanism, new wireless equipment introduced to the network can be seamlessly and automatically integrated into the wireless network with minimal effort.

The communication or sharing of site-specific information along with position data between instantiations of the present invention, whether executing as an application or embedded application on a personal computer, server, base station, switch, router, hub, access point, client or portable computing device, radio, modem, web portal or interface, home to media gateway, operating system or other device or application capable of interacting with other devices through some form of communication network (on-site, locally or remotely), may be accomplished through any form of communication protocol or interface that allows for the transfer for data across a medium.

For instance, if a portable handheld device, such as a personal digital assistant (PDA) or cellular phone, that was hosting the present invention in application or embedded form were to enter the service area of a wireless network also hosting the present invention, data such as the calculated position of the portable handheld device, map of the area serviced by the wireless network, device or network configuration information, security or encryption settings to use, authorization codes or keys, instructions, financial data, or any other information may be transferred between the portable handheld device and the wireless network per the present invention. This transfer of information may occur directly over the wired or wireless network, and may occur automatically without any user interaction, or may require the user to enter a security clearance, password, user identification, authorization, or simply request the transfer to occur. The data transfer may occur immediately upon the portable device entering the network or may occur continually, with the information being constantly or regularly refreshed or modified over time. Although a portable handheld device is used in this example, one skilled in the art can see that any computing device capable of exchanging information over a communication network can also be used within the context of the present invention.

For example, referring to FIG. 16 there is shown the site-specific environmental model of a floor of a building 1610 with three non-mobile measuring devices—AP1 1600, AP2 1602, and AP3 1604—and a mobile measuring device—Client1 1606—identified. If a new network wireless device, such as a transceiver or client, NewAP 1612 is introduced into the network, the present invention utilizes the measured RF channel characteristics of the new wireless device from the measuring devices to determine the position of the new device.

This position information can be used by the invention to calculate the configuration settings, including transmit power level, antenna radiation characteristics, channel, bandwidth, throughput, priority level, and other configuration settings know now or in the future, for the new wireless device 1612 in order for the new device to work properly on the network. For example, if the new wireless device 1612 is a network transceiver, knowledge of the position and the measured RF channel characteristics of the new wireless device allows the invention to know the channel settings the new wireless device should have in order to minimize intra-network interference. Once the new wireless device 1612 implements the reconfiguration, future position estimation for that device may use a different set of lookup tables due to the altered configuration settings.

Note that the present invention supports embodiments where the configuration information for new wireless devices is determined by either the device itself given knowledge of its environment and its position within the environment, or through a centralized or distributed application executing on a separate platform that communicates the desired configuration information to the new wireless device through some form of communication protocol. An example of a mechanism for determining the configuration of network devices is given in pending U.S. patent application Ser. No. 10/714,929 entitled "System and Method for Automated Placement or Configuration of Equipment for Obtaining Desired Network Performance Objectives and for Security, RF Tags, and Bandwidth Provisioning;" Once position coordinates 111 have been calculated, this information can be used for any number of possible applications. In addition to visualizing the position of wireless devices on a computerized display, one preferred embodiment of the present invention supports the use of wireless device position to help improve the overall performance of the wireless network or the overall quality of service provided to wireless users. For example, if the locations of rogue transmitters or interference sources are accurately known, their location can be incorporated into predictive algorithms and methods that can use that information to reconfigure network devices such that any security threat or interference problems are minimized. The preferred embodiment utilizes methods for reconfiguring network devices to account for security issues or interference sources are provided in co-pending U.S. patent application Ser. No. 10/714,929 entitled "System and Method for Automated Placement or Configuration of Equipment for Obtaining Desired Network Performance Objectives and for Security, RF Tags, and Bandwidth Provisioning," by Rappaport et al, hereby incorporated by reference.

For example, referring to FIG. 16, there is shown the site-specific environmental model of a floor of a building 1610 with three non-mobile measuring devices—AP1 1600, AP2 1602, and AP3 1604—and a mobile measuring device—Client1 1606—identified. If a rogue transceiver 1608 is introduced into the network environment, where a rogue transceiver is defined to be any undesirable device that may potentially interrupt, disrupt, interfere with, detect or interpret signals from, or other interact with an existing wireless network. If the rogue transceiver is detectable by one or more of the measuring devices, the present invention can accurately determine the location of the rogue transceiver 1608 as described herein.

Once the position of the rogue transceiver 1608 is determined, the combination of this position data with the measured RF channel characteristics from the rogue transceiver can be used by the present invention to determine what action, if any, to take in order to minimize the negative impact, if any, the rogue transceiver is having or will have on the wireless network. For example, if both the rogue transceiver 1608 and measuring device 1604 are transmitting on channel 6, the rogue transceiver 1608 may be disrupting network service from the measuring device 1604. The present invention can detect this and determine that the measuring device 1604 should move to a different channel in order to avoid being interfered with from the rogue transceiver 1608. As another example, if the rogue transceiver 1608 posed a security threat to the network, the present invention could detect the position of the rogue transceiver within the facility and deactivate network equipment close to the rogue transceiver, such as measuring devices 1602, 1604 and the mobile wireless device 1606, in order to prevent the rogue transceiver from reading confidential transmissions over the wireless network.

In addition to mitigating interference or security threats posed by detectable wireless devices whose positions are known, position estimates produced by the present invention may also be used for more advanced network resource provisioning such as bandwidth shaping, user prioritization, and load or traffic balancing. Once the locations of wireless clients is known along with the relative priority levels and requested bandwidth of each client, a system and method such as that described in co-pending U.S. patent application Ser. No. 10/714,929 can use this information to accurately determine the bandwidth allocated to each wireless user in addition to being better able to carry out load balancing by moving user associations between serving sites, cells, access points, switches, routers, web portals, or base stations. Incorporating actual user positions into those calculations provides for an improved understanding of the site-specific bandwidth utilization on the network.

Figure 17:
FIG. 17 depicts an environmental model of building containing various wireless devices and their service areas along with the depiction of a wireless client device interacting with the service areas.

For example, referring to FIG. 17, there is shown the site-specific environmental model of a floor of a building 1710 containing a WLAN. Two access points 1700, 1702 are identified in the figure, as is a network client 1708. One access point 1700 has a service area identified simply with the elliptical region 1704, while the other access point 1702 has a service area identified simply with a separate elliptical region 1706. The service areas 1704, 1706 for the two access points 1700, 1702 overlap in the area in which the network client 1708 is currently positioned. The present invention allows for the determination of the position of the network client 1708 as described herein. The present invention can therefore determine that the network client 1708 is within the overlapping service areas 1704, 1706, and can use this information to improve overall network performance in a variety of ways.

For instance, if one of the access points 1700 is experiencing heavy traffic flow or reduced network performance, knowledge of this combined with the position of the network client 1708 can be used to determine that the network client should connect to the second access point 1702, which may not be experiencing the same degraded service levels. Likewise, if the network client 1708 is mobile, the present invention can use the position and trajectory of the network client to determine the best access points which the network client should connect with at any given time. For example, if the network client is moving towards the lower side of the building floor plan shown in FIG. 17, then a connection to the upper left access point 1700 is probably more desirable since its service zone 1704 extends further than its counterpart. However, if the network client 1708 is moving towards the upper right, then perhaps the other access point 1702 would be the preferred service provider. It is only through combining knowledge of the present location of the network clients, the current configuration and service areas of the network equipment, and the current state of the network in terms of traffic flow and loading that decisions regarding best serving network transceivers can be made efficiently.

As another example, as a mobile wireless client 1708 roams through a network, the position calculation application can continually determine the position of the client within the site-specific environment. The mobile wireless client 1708 may have bandwidth requirements due to particular applications being accessed, such as voice over IP (VoIP) or streaming video, in addition to have an assigned user priority level regarding access to network services or bandwidth. By continually tracking the location of the wireless client 1708, the position calculation application can provide accurate information to a network management system (NMS), the preferred embodiment of which is given in co-pending application Ser. No. 10/714,929, that will allow the NMS to accurately gauge how to allocate bandwidth across nearby portions of the network in order to prepare for the likely movement of the mobile wireless client into those areas. Historical record keeping can assist further by allowing the present invention to determine the current trajectory and most likely future position of the mobile wireless device, thus allowing the NMS to pre-allocate network resources at the most likely future location of the mobile wireless client to prevent any loss or deterioration of service delivered to the client. This may include actually moving users connected at the destination to other nearby serving network devices or even removing them from the network depending on relative user priority.

Further, with modern computing technology it is possible to compute expected changes in the RF channel environment as a mobile wireless device moves through a given environment such that a known or expected trajectory of the wireless device can be used to predict not only the future position of the mobile wireless device but also the RF channel environment the wireless device will encounter at that point in time and the overall impact that will have on the wireless network as a whole. This allows for the pre-allocation of network resources or the adjustment of network equipment in anticipation of wireless device locations and service requirements in the near future.

For example, referring again to FIG. 17, there is shown the site-specific environmental model of a floor of a building 1710 containing a WLAN. Two access points 1700, 1702 are identified in the figure, as is a mobile network client 1708. One access point 1700 has a service area identified simply with the elliptical region 1704, while the other access point 1702 has a service area identified simply with a separate elliptical region 1706. There is no network service on the lower side of the building or in any areas not within the elliptical regions. For example, if the present invention detects that the mobile network client 1708 is moving toward the lower side of the building as shown in the figure, it is obvious that the network client will be entering areas where service does not exist. With this information, the present invention can determine what action can be taken, if any.

For example, the present invention can determine whether it is possible to increase or change the service areas 1704, 1706 of the given access points 1700, 1702 by raising or lowering their power levels, channel or frequency settings, bandwidth, steering antennas either physically or electronically, or altering any other configurable parameter in order to maintain a connection to the mobile network client 1708, or whether a warning message should be sent to one or more users or displayed or announced to the mobile network client to notify the user of the client device that they are possibly going to leave the service area. The preferred means of determining changes to equipment configuration to affect changes in the network service area is given in pending U.S. patent application Ser. No. 10/714,929 entitled "System and Method for Automated Placement or Configuration of Equipment for Obtaining Desired Network Performance Objectives and for Security, RF Tags, and Bandwidth Provisioning;"

For example, the present invention can calculate the position of the mobile network client 1708 using the techniques described herein. Given the known position of the mobile network client 1708 and with knowledge of the physical environment 1710 and the service areas 1704, 1706 of the equipment 1700, 1702 comprising the network, the present invention can determine that the mobile network client is close to the edge of the service area 1706 for one of the access points 1702. The present invention could decide to increase the transmit power of the access point 1702 in order to extend its service area 1706. Alternately, the present invention could decide to handoff the mobile network client 1708 such that the other access point 1700, whose service area 1704 is much larger in the area the client is currently located, becomes the serving access point for the client. One can see that many other factors may affect these decisions, such as current network traffic and loading, user priority levels, security settings, current interference or noise levels, applications being used, or many other data that are readily available to the present invention through its monitoring of the network. In addition, other decisions or actions than those listed above may be analyzed and determined by the present invention. New configuration settings for network devices 1700, 1702 or network clients 1708 are communicated from the present invention using some form of communication protocol and command set understood by the receiving devices and clients.

Another embodiment of the current invention includes a mobile wireless client that can identify its position within the environment, and therefore knows a priori the service regions within which it is roaming. That is, the site-specific environment model will indicate the areas within the environment that have certain wireless service types or applications being provided to them. The client then knows what networks or network devices it should be able to see and what services those networks or network devices offer. Therefore, the continual scanning and updating tables of available networks is not required. Instead, the client can utilize site-specific data and knowledge of its position as determined through methods detailed herein to calculate both the best available wireless service capable of handling its desired application type or throughput needs as well as the minimum transmit power required to communicate with desirable networks or network devices to maintain a certain quality of service. Clients can even schedule their own data transmissions to occur within favorable areas of service or at favorable times as the client moves from location to location.

Client-side knowledge of the client's position in a site-specific environmental model negates the need for mobile clients to utilize maximum power levels during association, and allows clients to more intelligently regulate their transmit power levels. Furthermore, clients can utilize site-specific data and knowledge of position to more intelligently initiate or participate in handoffs. Clients can also detect if they are actually within a significant coverage region of a given network or network device or simply with a sliver coverage zone. This allows mobile wireless devices to conserve battery power by minimizing the need to scan across multiple wireless services and by minimizing the transmit power used to maintain a reliable connection with the servicing network.

For example, referring again to FIG. 17, there is shown the site-specific environmental model of a floor of a building 1710 containing a WLAN. Two access points 1700, 1702 are identified in the figure, as is a mobile network client 1708. One access point 1700 has a service area identified simply with the elliptical region 1704, while the other access point 1702 has a service area identified simply with a separate elliptical region 1706. The present invention can determine the position of the mobile network client 1708 as discussed herein, and can use that position information along with knowledge of the predicted or measured service areas 1704, 1706 of the network devices 1700, 1702. The present invention can then determine the correct transmit power level and other configuration settings that the mobile network client 1708 should use in order to communicate with one or more of the network devices 1700, 1702. If the mobile network client 1708 is currently transmitting at a certain power level, the present invention can determine, using predicted, iterative, or interpolating algorithms, techniques, adjustments, or manipulations, that the power level should be increased in order for the desired quality of service to be maintained.

For example, the present invention could use the position of the mobile network client 1708, the position of the serving network equipment 1700, 1702, the structure of the physical environment 1710, and the current configuration, operating state, and operating condition of the devices 1700, 1702, 1708 to predict the RF channel characteristics that the mobile network client 1708 experiences. Through simulation, by iteratively or deterministically changing the configuration or operating state of the network devices 1700, 1702, and 1708, the present invention can predict the expected RF channel characteristics that the mobile network client 1708 would experience were the network devices to actually assume the configuration. When more desirable RF channel characteristics for the mobile network client 1708 are derived through simulation, the present invention can then communicate the new configuration or operating state information to the network devices 1700, 1702, 1708 using some form of communication protocol. The present invention may effect this communication of new configuration or operating state information automatically or manually. The present invention may also display or notify a human observer or network administrator or technician using a computerized display or audible alert of the desirable configuration or operating state information.

This allows the mobile network client to configure itself much more efficiently for its desired level of network performance and interaction without wasting battery life. For example, the mobile network client can determine location using either an NMS installed on itself or by receipt of position-location or other data from a server, switch, access point, web portal, etc. which is part of, enables or assists the NMS. Once the location is determined, the mobile network client can then adjust power, channels, or other settings.

Figure 18:
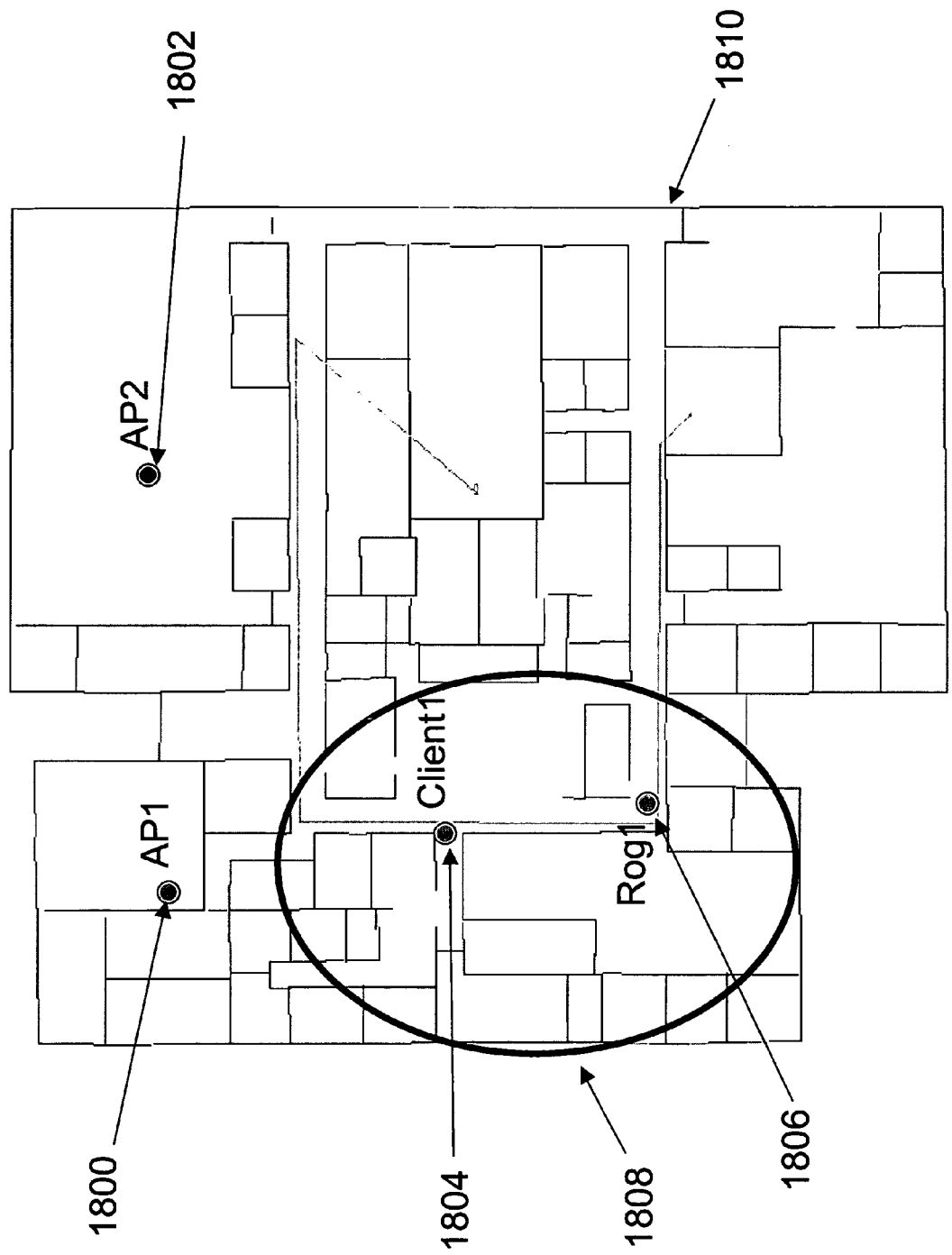
FIG. 18 depicts the solution to the "hidden node" interference and security problem present in many wireless networks.

As a particular example of the capabilities of the present invention, the classic "hidden node" problem describes a situation in which network devices are attempting to communicate while a third entity is interfering with or listening to the communication. Referring to FIG. 18, there is shown the site-specific environmental model of a floor of a building 1810 containing a WLAN. Two access points 1800, 1802 are identified in the figure along with a mobile network client 1804. The mobile network client 1804 is communicating with the access points 1800, 1802 to exchange data over the network. Also shown in the figure is a rogue wireless device 1806. The rogue wireless device 1806 is not part of the same network as the access points 1800, 1802 that the mobile client 1804 is communicating with. The rogue wireless device 1806 is transmitting wireless signals that can be detected within the region 1808 shown in FIG. 18. Note that the region 1808 affected by the rogue wireless device 1806 does not include the access points 1800, 1802, indicating that neither of the network access points can measure the RF channel characteristics of the rogue wireless device 1804.

As the mobile network client 1804 moves closer to the rogue wireless device 1806 and enters the region 1808 that is covered by signals from the rogue wireless device, the rogue wireless device can begin disrupting the communication between the mobile client and the network access points 1800, 1802. For example, if the rogue wireless device 1806 is on the same channel as that being used by the mobile client 1804, as the mobile client moves closer to the rogue wireless device 1806, signals from the rogue wireless device will begin interfering with signals from the network access points 1800 and 1802. When this situation occurs and the network access points 1800, 1802 are unable to detect the signals from the rogue wireless device 1806 and are thus unable to detect the interference that the mobile client 1804 is experiencing, it is commonly referred to as the "hidden node" problem.

The present invention can mitigate the negative effect of the "hidden node" problem on a network in several ways. In one instantiation, the present invention may be executing on a server computer, network switch, access point, or other device connected to the network. Referring to FIG. 18, the present invention allows for the mobile client 1804 to measure the interference it is receiving from the rogue wireless device 1806 and report this interference to the server computer via its communication link through the network access points 1800, 1802. Likewise, the present invention can calculate the location of the mobile client 1804 using techniques described herein. The present invention can then combine knowledge of the mobile client's position with the current interference being received by the mobile client to calculate the power levels or channel settings for the network access points 1800, 1802 to have in order to eliminate or overcome the interfering signals from the rogue wireless device 1806 at the location of mobile client 1804. These new configuration settings for the network access points 1800, 1802 can then be automatically by the present invention, or sent or displayed to an authorized network administrator for further action. As described earlier, the user may observe, edit, or confirm the configuration locally or remotely via web portal or other communication mechanism or protocol via the internet or other communication medium.

In another instantiation, the present invention may be embedded and executing on the access points 1800, 1802. The mobile client 1804 reports the interference it is receiving from the rogue wireless device 1806 to the network access points 1800, 1802. The present invention, executing on the network access points 1800, 1802, can calculate the position of mobile client 1804 using techniques discussed herein as well as, or in addition to, the power levels or channel settings that each access point 1800, 1802 should have in order to eliminate or overcome the interfering signals from the rogue wireless device 1806 at the location of mobile client 1804. Each network access point 1800, 1802 hosting the present invention is therefore capable of determining the configuration settings it should use in order to best resolve or mitigate the degraded quality of service the mobile network client 1804 is experiencing. This decision is made with knowledge of the physical environment and possibly also knowing the location of the mobile network client.

In yet another instantiation, the present invention may be embedded or executing on the mobile network client 1804 itself. In this instance, the present invention can calculate the current location of the mobile network client 1804 using techniques described herein. The present invention can determine different power levels or channel settings that the mobile client 1804 should use to possibly overcome or mitigate the interference being received from the rogue wireless device 1806. For example, if the rogue wireless device 1806 is transmitting on the same channel as the network access point 1800 but not on the same channel as the second access point 1802, the present invention could determine that the mobile client 1804 should shift from communicating with network access point 1800 to access point 1802 in order to effect a channel change that would avoid interference from the rogue wireless device 1806. In addition, any combination of the various instantiations of the present invention may be present. For example, the present invention may be instantiated on a server computer on the network, on access points 1800, 1802, and on mobile network clients 1804 in any combination. The preferred means of determining changes to equipment configuration to affect changes in the network service area is given in pending U.S. patent application Ser. No. 10/714,929 entitled "System and Method for Automated Placement or Configuration of Equipment for Obtaining Desired Network Performance Objectives and for Security, RF Tags, and Bandwidth Provisioning;"

As described previously, the present invention allows device configuration to occur automatically on the basis of position and existing devices' configurations as new devices are introduced into an area being serviced by a network hosting the present invention in some form. In addition to using position information to determine device configuration, the present invention can also use position information to exchange other information between devices on a network. This information exchange occurs between instantiations of the present invention being hosted and executed in some fashion, whether as a software application or embedded software instructions, on a computing platform capable of interacting and exchanging data with other computing platforms on a communication network.

Furthermore, as mentioned previously each vertex in the mesh may have additional information associated with it in addition to performance lookup tables. This additional information may include, but is not limited to: digital media (such as digital pictures, scanned images, raster images, vector images, video, audio, etc.), computerized file data or databases, advertising or marketing information, security privileges, configuration information, instructions, alerts or errors that have been or should be triggered, connection to an external database located somewhere on the network or Internet, reaction triggers that spawn third party applications or processes that may take further action or processing, historical information related to other previous visits by other wireless devices, counters incremented or decremented based on the number of times one or more wireless devices have been at the given position, or other textual, visual, audio, or tactile information or processes known now or in the future. Such media or information may be used for any number of purposes, including being sent to the mobile wireless device for possible display on a computer screen or further processing.

Figure 19:
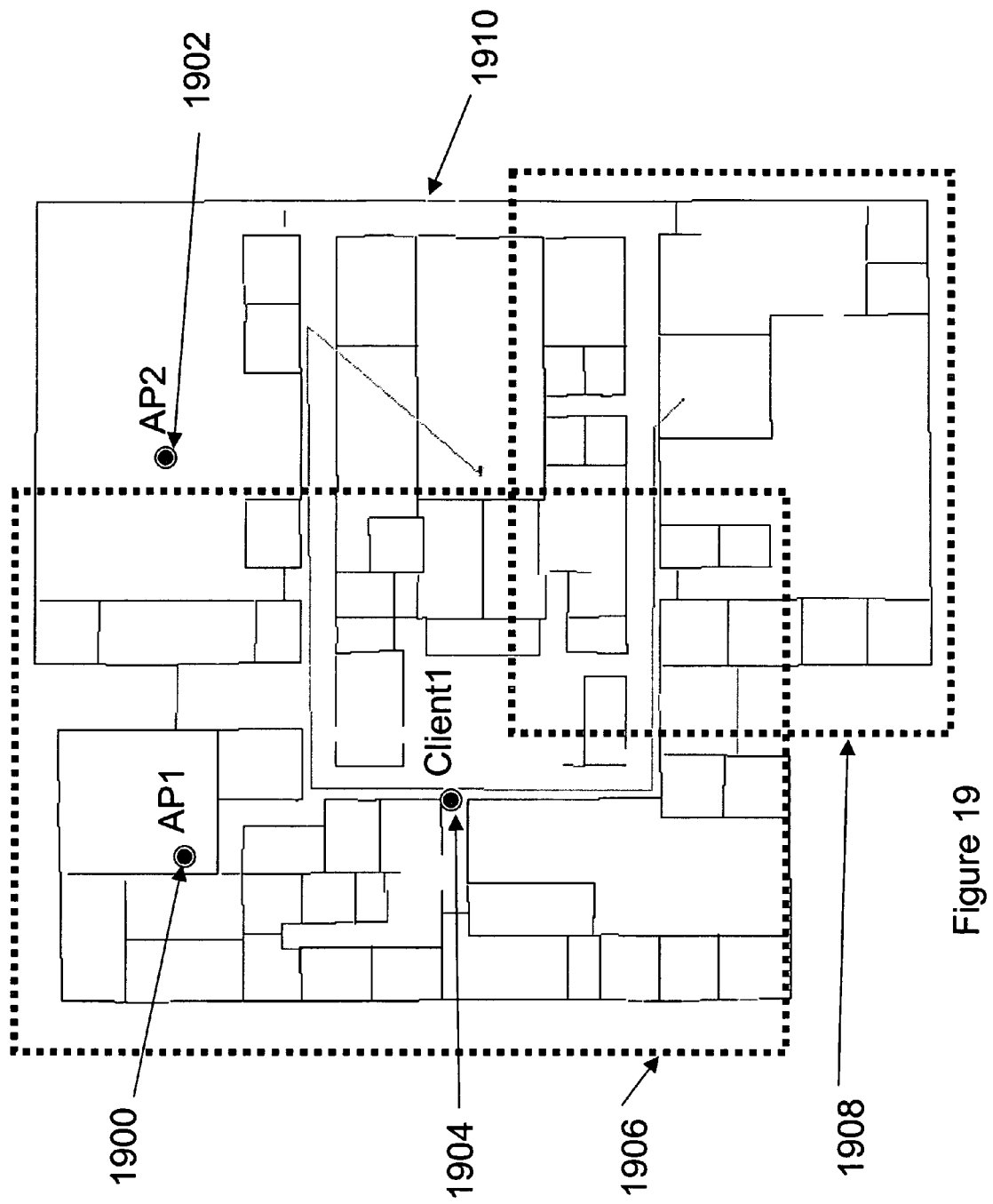
FIG. 19 shows a site specific model of a floor of a building illustrating operations as a mobile network client moves within the area.

Referring to FIG. 19, there is there is shown the site-specific environmental model of a floor of a building 1910 containing a communications network. Two transceivers 1900, 1902 are identified in the figure along with a mobile network client 1904. The mobile network client 1904 is communicating with the transceivers 1900, 1902 to exchange data over the network. Two regions 1906, 1908 are also shown in FIG. 19; note that the two regions 1906, 1908 overlap slightly. The two regions 1906, 1908 are indicative of locations within the site-specific environmental model 1910 wherein the mesh vertices within the regions have additional information, such as those described above, correlated to them. By calculating the position of the wireless devices 1900, 1902, 1904 in terms of the nearest mesh vertex or vertices, the present invention can take further action based on the information associated with the mesh vertices. This may include transmitting additional information associated with the mesh vertices to the wireless device, performing some additional calculation or analysis step, such as calculating configuration information, or performing some other action such as sending an alarm or alert message to a third wireless device or separate user, on the basis of the additional information associated with the mesh vertices.

For example, referring to FIG. 19, as the mobile network client 1904 moves within the area 1906, the present invention may use information associated with the mesh vertices within the area 1906 to perform one or more actions as described above. If the mobile network client 1904 were to move to a different area 1908, the present invention would calculate the changing position of the client and begin taking additional actions based on the additional information associated with the mesh vertices within the new area 1908.

Figure 20:
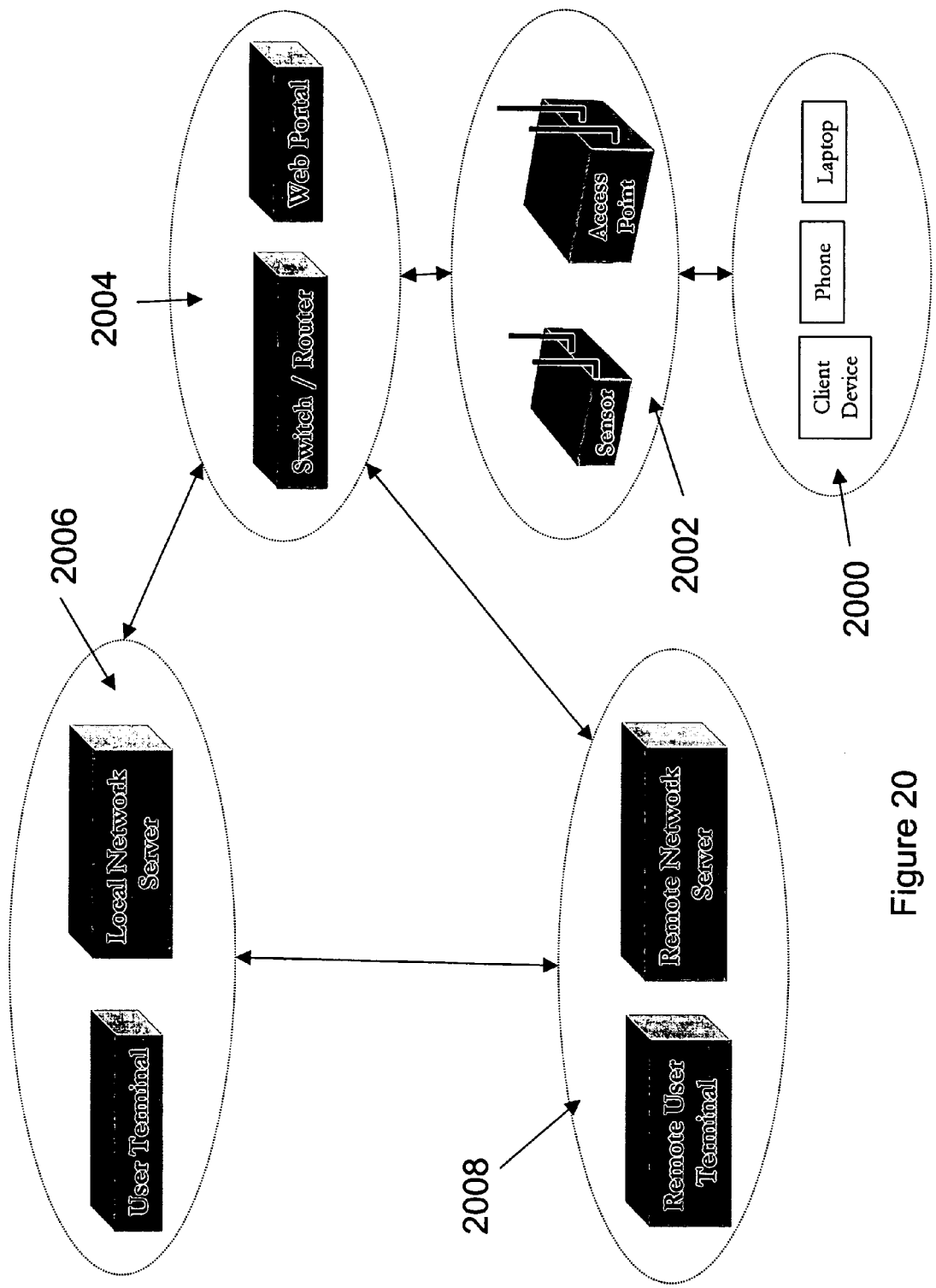
FIG. 20 is a schematic showing the communication or interaction between various network devices.

As described herein, the present invention may be instantiated, hosted, or executed on any device capable of interacting with other devices comprising a communications network, where such interaction with a communications network may involve any combination of transmitting, receiving, measuring, monitoring, listening to, interfering with, or otherwise manipulating messages or signals across the communications network. Referring to FIG. 20, there is shown a logical, hierarchical diagram depicting the interaction of various network devices. Network client devices 2000, such as WLAN client cards, radio modems, cellular/PCS/3G phone handsets, personal digital assistants (PDAs), personal computers (portable and otherwise), network-enabled appliances, network-enabled manufacturing equipment, and any other form of such network device, may communicate or interact with one another in an organized or ad hoc manner, or may communicate or interact with other network equipment 2002. Network equipment 2002 such as access points, mesh nodes, sensors, and other transceivers may likewise communicate or interact with one another or may communicate or interact with network communication hubs and switches 2004. Network equipment 2004 such as network switches, routers, hubs, gateways, web portals, and other such transceivers may likewise communicate or interact with one another or may communicate or interact with local computing devices 2006 and remote computing devices 2008. Local computing devices 2006, such as personal computers, network servers, and network terminals, may likewise communicate or interact with one another or may also communicate or interact with remote computing devices 2008. Remote computing devices 2008, such as personal computers, network servers, and network terminals may likewise communicate or interact with one another.

The communication or interaction between the various network devices depicted in FIG. 20 occurs through some form of communication protocol and mechanism, such as a wireless connection or Internet connection. While the present invention utilizes Internet-based (IP-based) protocols for communication between software modules and with hardware devices, it should be apparent to one skilled in the art that other communication protocols may also be supported by the present inventions. It should be noted that the hierarchical network depicted in FIG. 20 provides an example communications network. One skilled in the art should recognized that other network topologies, architectures, hierarchies, and interconnections exist and are supported by the present invention. Likewise, one skilled in the art should recognize that communication between the various levels in the network hierarchy as depicted in FIG. 20 are also just for the purposes of an example. It may be that, for example, the local 2006 or remote 2008 network devices communicate directly with the client devices 2000 or other network infrastructure 2002, and, if so, the present invention supports such a paradigm.

Referring to FIG. 20, the present invention may be instantiated, hosted, or executed, in whole or in part, on any device 2000, 2002, 2004, 2006, 2008 or on any combination of multiple devices across the network. Any device having a partial or whole implementation of the present invention shares in the capabilities of the invention and is enabled to participate in one or more of the capabilities of the invention described herein, including but not limited to: position determination, monitoring, measurement collection, device configuration planning or determination, network resource allocation planning, security, asset tracking or management, sharing of site-specific information and network data, and network management.

As one example, a mobile network client 2000 executing the present invention is capable of determining its own position within the network, calculating the transmit power setting it should use, and monitoring rogue transmitters within range. This information may be sent to, or also determined by, access points 2002 executing the present invention in embedded. The access points may forward this information to network switches 2004 executing the present invention, which aggregate the information and further analyze it. Local servers 2006 executing the present invention may communicate with the network switches 2004 to monitor the information, while a user sitting at a network terminal 2006 communicating with the local server views the information in graphical or textual form and interacts with the present invention. Simultaneously, a separate user using a remote terminal 2008 somewhere else on the Internet views the same information and also interacts with the present invention. One skilled in the art can easily see how the myriad other combinations and examples of using the present invention given the wide range of computing devices capable of communicating or interacting with a network, all of which are supported by the present invention.

While the invention has been described in terms of its preferred embodiments, those skilled in the art will recognize that the invention can be practiced with considerable modification within the spirit and scope of the appended claims.

The invention claimed is:

1. A system for locating a position of one or more wireless communications devices within a physical environment, comprising:
    a plurality of wireless or optical communications devices deployed within said physical environment;
    one or more measuring devices positioned or positionable at one or more locations within said physical environment, said one or more measuring devices measuring RF channel characteristics or the performance metrics of the plurality of wireless or optical devices;
    a computer comprising:
        a computer controller which identifies the one or more locations of the one or more wireless or optical communication devices within said physical environment in response to measurements taken by the measurement device in conjunction with a site specific environmental model of the physical environment along with a plurality of tables, the plurality of tables having stored RF channel characteristics or stored performance metrics; and wherein
        the computer controller providing:
            the site specific environmental model of said physical environment including representations of the plurality of wireless or optical communications devices deployed within said physical environment;
            the plurality of tables, each associated with a specific point in the physical environment modeled by said site specific environmental model, and each containing one or more RF channel characteristics or performance metrics of at least one wireless or optical device, wherein each of the plurality of tables stores a correlation between said one or more RF channel characteristics, the performance metrics, and one or more locations within said site specific environmental model; and
            the computer controller identifying the one or more locations of the one or more wireless or optical communications devices within said physical environment based on one or more closest matching tables of said plurality of tables to said RF channel characteristics or the performance metrics measured with said one or more measuring devices, and further based on the position of the specific point in the physical environment modeled by the site specific environmental model associated with said one or more closest matching tables, wherein the one or more locations are correlated locations, and the correlated locations are identified based on a comparison between the one or more measured RF channel characteristics or the measured performance metrics with the RF channel characteristics and the performance metrics values within the plurality of tables.

2. The system of claim 1 wherein said site specific environmental model is two dimensional.

3. The system of claim 1 wherein said site specific environmental model is three dimensional.

4. The system of claim 1 wherein said computer controller provides signals to one or more devices or users in a network or receives signals from said one or more devices or users in said network.

5. The system of claim 1 wherein said site specific environmental model includes a plurality of alternative configurations of networks of components deployed or deployable within said physical environment, and wherein said plurality of tables includes different tables of said one or more RF channel characteristics or the performance metrics of the at least one wireless or optical device, each of which is associated with said specific point and which depend on a configuration of a network of components of said plurality of alternative configurations of networks of components deployed or deployable within said physical environment.

6. The system of claim 5 wherein said computer controller compares said RF channel characteristics or the performance metrics to a subset of said plurality of tables based on said configuration of said network of components.

7. The system of claim 1 wherein said one or more RF channel characteristics or the performance metrics of at least one wireless or optical device in the each of said plurality of tables is determined by a performance prediction based on attributes of one or more wireless communication components deployed or deployable within said physical environment.

8. The system of claim 7 wherein said site specific environmental model includes attribute information of one or more objects within said physical environment which affect wireless communication performance metrics, but which are not wireless communication components.

9. The system of claim 8 wherein said attribute information includes one or more of physical, electrical, electromagnetic, mechanical, or aesthetic characteristics.

10. The system of claim 7 wherein said one or more RF channel characteristics or the performance metrics of at least one wireless or optical device in the each of said plurality of tables are updatable.

11. The system of claim 1 wherein at least one measuring device of said one or more measuring devices is associated with a wireless or optical communication component of said plurality of wireless or optical communication components.

12. The system of claim 1 further comprising at least one measuring application which obtains said measured RF channel characteristics or the performance metrics from said one or more measuring devices, said computer controller obtaining said measured RF channel characteristics or the performance metrics from said at least one measuring application.

13. The system of claim 1 wherein said at least one measuring device is at least one of the access point, a sensor, a probe, a wireless network client, or another receiving or listening device which can detect transmissions.

14. The system of claim 1 wherein at least one of said wireless or optical communications components is selected from the group consisting of antennas, base stations, base station controllers, amplifiers, cables, RF ID tags, RF ID readers, mobile or portable transmitter, receiver or transceiver devices, splitters, attenuators, repeaters, wireless access points, couplers, connectors, connection boxes, splicers, switches, routers, hubs, sensors, transducers, translators, power cables, twisted pair cables, optical fiber cables, and MIMO systems.

15. The system of claim 1 wherein said computer controller is distributed amongst a plurality of computers.

16. The system of claim 1 wherein said site specific environmental model and said plurality of tables are managed within a single software, hardware or firmware component.

17. The system of claim 1 wherein either or both said site specific environmental model and said plurality of tables are combined with said computer controller.

18. The system of claim 1 further comprising a display which displays a two dimensional or three dimensional representation of said physical environment together with said one or more locations identified with said computer controller.

19. The system of claim 1 wherein said one or more locations identified with said computer controller are communicated to an another device as position coordinates.

20. The system of claim 19 wherein said position coordinates include x, y, and z coordinates.

21. The system of claim 1 wherein each specific point is an intersection point of a mesh.

22. The system of claim 21 wherein attributes of the mesh are adjustable.

23. The system of claim 21 wherein said plurality of tables step includes tables for each intersection point of said mesh.

24. The system of claim 1 wherein said plurality of tables includes one or more tables which include both predicted and said measured RF channel characteristics.

25. The system of claim 1 wherein said one or more wireless or optical communications components within said physical environment includes one or more client computers, each of which is configured to allow determining whether to initiate or participate in handoffs depending on said one or more locations identified by said computer controller.

26. The system of claim 1 wherein said computer controller is configured to control network resource provisioning which is based on said one or more locations which are identified.

27. The system of claim 1 further comprising a stand alone or distributed network management system which is loaded wholly or partially on one or more of a personal computer, server, base station, switch, router, hub, access point, client or portable computing device, radio, modem, web portal or interface, home to media gateway, operating system or other device or application capable of interacting locally or remotely with other devices through a communication network.

28. The system of claim 27 wherein said network management system allows exchanging data between a plurality of computing platforms.

29. The system of claim 1 further comprising one or more devices for remotely accessing, displaying or controlling one or more of a personal computer, server, base station, switch, router, hub, access point, client or portable computing device, radio, modem, web portal or interface, home to media gateway, operating system or other device or application capable of interacting locally or remotely with other devices through a communication network.

* * * * *

UNITED STATES PATENT AND TRADEMARK OFFICE
CERTIFICATE OF CORRECTION

| | | |
|---|---|---|
| PATENT NO. | : 8,019,352 B2 | |
| APPLICATION NO. | : 11/186929 | |
| DATED | : September 13, 2011 | |
| INVENTOR(S) | : Rappaport et al. | |

It is certified that error appears in the above-identified patent and that said Letters Patent is hereby corrected as shown below:

On the Title Page:

Item (56), under "OTHER PUBLICATIONS", in Column 1, Line 1, delete "V. Padmanabhon and A. Balachnandran," and insert -- V. Padmanabhan and A. Balachandran, --, therefor.

On Page 2, in Item (56), under "U.S. PATENT DOCUMENTS", in Column 1, Line 8, delete "6,661,925" and insert -- 6,664,925 --, therefor.

On Page 2, in Item (56), under "OTHER PUBLICATIONS", in Column 1, Line 14, delete "R. Sidmore, et al.," and insert -- R. Skidmore, et al., --, therefor.

Signed and Sealed this
Eleventh Day of December, 2012

David J. Kappos
*Director of the United States Patent and Trademark Office*